US011897155B2

(12) United States Patent
Yamakose et al.

(10) Patent No.: US 11,897,155 B2
(45) Date of Patent: Feb. 13, 2024

(54) RAZOR

(71) Applicant: KAI R&D CENTER CO., LTD., Seki (JP)

(72) Inventors: Hiroshi Yamakose, Seki (JP); Mai Kadokura, Seki (JP); Shunsuke Shioya, Seki (JP); Toshiki Takagi, Seki-shi (JP)

(73) Assignee: KAI R&D CENTER CO., LTD., Seki (JP)

( * ) Notice: Subject to any disclaimer, the term of this patent is extended or adjusted under 35 U.S.C. 154(b) by 0 days.

(21) Appl. No.: 17/773,300

(22) PCT Filed: Nov. 4, 2020

(86) PCT No.: PCT/JP2020/041257
§ 371 (c)(1),
(2) Date: Apr. 29, 2022

(87) PCT Pub. No.: WO2022/091425
PCT Pub. Date: May 5, 2022

(65) Prior Publication Data

US 2022/0297324 A1 Sep. 22, 2022

(30) Foreign Application Priority Data

Oct. 30, 2020 (JP) ................................ 2020-183138

(51) Int. Cl.
*B26B 21/52* (2006.01)
*B26B 21/06* (2006.01)

(52) U.S. Cl.
CPC ........... *B26B 21/523* (2013.01); *B26B 21/06* (2013.01)

(58) Field of Classification Search
CPC ..... B26B 21/52; B26B 21/521; B26B 21/522; B26B 21/523; B26B 21/528
USPC ................................ 30/32, 47–51, 526–536
See application file for complete search history.

(56) References Cited

U.S. PATENT DOCUMENTS

| | | | | |
|---|---|---|---|---|
| 375,592 A * | 12/1887 | Aloe | B26B 21/52 30/47 |
| 1,480,031 A * | 1/1924 | Statham | B26B 21/52 30/47 |
| 1,875,990 A | 9/1932 | Burton | |
| 1,975,365 A * | 10/1934 | Levitt et al. | B26B 21/06 30/47 |
| 1,985,132 A | 12/1934 | Woods et al. | |
| 1,991,290 A | 2/1935 | McGirr et al. | |

(Continued)

FOREIGN PATENT DOCUMENTS

| | | |
|---|---|---|
| CN | 101848794 A | 9/2010 |
| GB | 2260927 A | 5/1993 |

(Continued)

*Primary Examiner* — Jason Daniel Prone
(74) *Attorney, Agent, or Firm* — STERNE, KESSLER, GOLDSTEIN & FOX P.L.L.C.

(57) ABSTRACT

A razor assembled by folding includes a holding part that is held by a user, a head supporting part that is formed integrally with the holding part, and a razor head that is provided on the head supporting part. The entire of the holding part and the head supporting part is formed of paper. The entire of the razor head is formed of metal, and the razor head includes a blade body and a frame body housing the blade body.

7 Claims, 28 Drawing Sheets

(56) References Cited

U.S. PATENT DOCUMENTS

| | | | | | |
|---|---|---|---|---|---|
| 2,075,007 | A * | 3/1937 | Christmas | B26B 21/00 | 30/526 |
| 2,407,516 | A * | 9/1946 | Roberts | B26B 21/16 | 30/47 |
| 2,445,528 | A * | 7/1948 | Keogh, Jr. | B26B 21/00 | 30/535 |
| 2,589,327 | A * | 3/1952 | Biggs | B26B 21/06 | 30/47 |
| 2,694,857 | A * | 11/1954 | Koval | B26B 21/06 | 30/47 |
| 2,699,602 | A * | 1/1955 | Finley | B26B 21/06 | 30/47 |
| 2,716,810 | A * | 9/1955 | Koval | B26B 21/06 | 30/535 |
| 2,871,560 | A * | 2/1959 | Eberbaugh | B26B 21/06 | 30/47 |
| 3,340,609 | A * | 9/1967 | Sacharow | B26B 21/14 | 30/526 |
| 3,492,723 | A * | 2/1970 | Mollica et al. | B26B 21/06 | 30/47 |
| 3,660,893 | A * | 5/1972 | Welsh | B26B 21/54 | 30/50 |
| 3,750,280 | A * | 8/1973 | LePaliscot | B26B 21/523 | 30/526 |
| 3,795,979 | A * | 3/1974 | Perry | B26B 21/521 | 30/526 |
| 4,425,705 | A * | 1/1984 | Chen | B26B 21/24 | 30/527 |
| 4,439,920 | A * | 4/1984 | Nauheimer | B26B 21/523 | 30/47 |
| D281,025 | S * | 10/1985 | Hindson | D28/46 | |
| 4,554,735 | A * | 11/1985 | Chen | B26B 21/06 | 30/47 |
| 4,641,429 | A * | 2/1987 | Abatemarco | B26B 21/4012 | 30/50 |
| 4,712,301 | A * | 12/1987 | Saito | B26B 21/523 | 30/47 |
| D306,495 | S * | 3/1990 | Kihara | D28/46 | |
| 4,985,994 | A * | 1/1991 | Tavolieri | B26B 21/523 | 30/526 |
| 4,993,153 | A * | 2/1991 | Henry | B26B 21/52 | 30/32 |
| 5,027,510 | A * | 7/1991 | Bodtke | B26B 21/523 | 30/32 |
| 5,033,191 | A * | 7/1991 | Nauheimer | B26B 21/523 | 30/47 |
| 5,274,922 | A * | 1/1994 | Elliott | B26B 21/523 | 30/47 |
| 5,384,961 | A * | 1/1995 | Gregory | B26B 21/44 | 30/41 |
| 5,819,413 | A * | 10/1998 | Kerbrat | B26B 21/523 | 30/526 |
| 6,082,006 | A * | 7/2000 | Cahan | B26B 21/523 | 30/47 |
| 6,263,576 | B1 * | 7/2001 | Drapak | B26B 21/14 | 30/50 |
| 6,571,476 | B1 * | 6/2003 | Bickers | B26B 21/14 | 30/526 |
| 8,671,577 | B2 * | 3/2014 | Brown | B26B 21/521 | 30/526 |
| 2015/0352737 | A1 | 12/2015 | Hickam | | |
| 2022/0339809 | A1 * | 10/2022 | Ochiai | B26B 21/52 | |

FOREIGN PATENT DOCUMENTS

| | | | |
|---|---|---|---|
| JP | S52000564 | A | 1/1977 |
| JP | 5919071 | U1 | 2/1984 |
| JP | 62109069 | U1 | 7/1987 |
| JP | H01015086 | A | 1/1989 |
| JP | S64-015086 | A | 1/1989 |
| JP | H03-128065 | U | 12/1991 |
| JP | 3018821 | U | 11/1995 |
| JP | H07047091 | Y | 11/1995 |
| JP | 2000157763 | A | 6/2000 |
| JP | 2000334184 | A | 12/2000 |
| JP | 2006263048 | A | 10/2006 |
| JP | 2010-131228 | A | 6/2010 |
| JP | 2017520317 | A | 7/2017 |
| JP | 2018503454 | A | 2/2018 |
| JP | 2019518570 | A | 7/2019 |
| JP | 2019-532731 | A | 11/2019 |
| KR | 20-0478256 | | 9/2015 |
| WO | 2010-100634 | A1 | 9/2010 |

* cited by examiner

RAZOR

CROSS-REFERENCE TO RELATED APPLICATION

The present application is a U.S. National Phase of International Application No. PCT/JP2020/041257, filed Nov. 4, 2020, the disclosures of which are hereby incorporated in their entirety by reference.

TECHNICAL FIELD

One aspect of the present invention relates to a ready-to-assemble razor.

BACKGROUND ART

A conventional razor is generally composed of a body with a head and a handle integral with each other, and a razor head with a metal blade housed in a resin case. In many cases, the body is formed of resin or metal and requires a large housing capacity, causing the need of ensuring housing space for storage or causing inconvenience of carriage.

In recent years, the 3R has been proposed that is a collective term of 3Rs including Reduce intended to use things with case and reduce waste, Reuse intended to use available things repeatedly, and Recycle intended to use waste again as resources. While conventional razors are formed of resin and metal as described above, replacement thereof with easy to recycle materials is also required. For example, a razor including a body formed of paper as a replacement for resin is available as an environmentally responsible razor for contributing to a recycling-oriented society. Also, the 17 goals of the Sustainable Development Goals (SDGs) adopted by the United Nations summit include those to ensure sustainable consumption and production patterns requiring significant reduction in waste production, etc. Under these circumstances, in the field of razors, there is also demand for promoting development of environmentally-friendly razors satisfying the 3R. For example, a razor with a body formed of an easily-recyclable material such as paper is promising as an environmentally-friendly technique satisfying the 3R. Such razors formed of paper, for example, are disclosed in Patent Documents 1 to 12, for example.

CITATION LIST

Patent Document

Patent Document 1: British Patent Application Publication No. GB 2260927
Patent Document 2: US Patent Publication No. 5033191
Patent Document 3: Japanese Patent Application Publication No. S52-564
Patent Document 4: Japanese Patent Application Publication No. H1-15086
Patent Document 5: Japanese Registered Utility Model Publication No. 3018821
Patent Document 6: Japanese Patent Application Publication No. 2006-263048
Patent Document 7: Japanese Patent Application Publication No. 2000-157763
Patent Document 8: US Patent Publication No. 5027510
Patent Document 9: US Patent Publication No. 5274922
Patent Document 10: Translation of PCT Application Publication No. 2017-520317

Patent Document 11: Japanese Utility Model Application Publication No. H3-128065
Patent Document 12: Japanese Patent Application Publication No. 2000-334184

SUMMARY

Technical Problem

While the razors disclosed in Patent Documents 1 to 12 include bodies formed of paper, for example, to form environmentally-responsible configurations, they have the following problems. Patent Documents 1 to 7 each disclose a razor with a body having a substantially rectangular sheet-like shape in a state before assembly. In these razors, the sheet forming the body before assembly has a substantially rectangular shape to make the razors easily formable. However, limitation is imposed on a degree of freedom of design and the size of the body becomes larger than is necessary. Such a configuration with the body larger than is necessary increases the amount of use of a material such as paper to form the body and is far from environmentally friendly. In each of the razors disclosed in Patent Documents 8 to 11, while the shape of the body is not substantially rectangular in a state before assembly, the body has a configuration including a sheet of a simple shape combined with a substantially rectangular sheet. Thus, these razors cannot be said to achieve sufficient reduction in the amount of use of a material such as paper to form the body. Regarding the razor disclosed in Patent Document 12, a lower portion of the holder part 6 is substantially rectangular so this razor cannot be said to achieve sufficient reduction in the amount of use of a constituting material such as paper.

The razors disclosed in Patent Documents 1 to 12 mentioned above each have a configuration assembled by causing a user to fold the sheet-like body several times. This requires many steps for the assembly and involves a complicated method of the assembly. Thus, the user is required to perform burdensome operation for making the razor ready to use, failing to provide an easy to assemble configuration.

Regarding each of the conventional razors disclosed in the patent documents mentioned above including Patent Documents 11 and 12, while the shape of the entire body is not a substantially rectangular sheet-like shape in a state before assembly, the lower end of a handle (main piece 1 or holder part 6) is formed into a linear shape in a state after assembly. When a user picks up these razors, a finger of the user may touch this linear lower end, for example. In another case, the user may unintentionally grasp this linear lower end depending on a way in which the user holds the razor. Grasping or touching such a linear portion formed of paper or the like by the user may cause a feel of discomfort of the user. As described above, in some conventional razors, consideration is not given sufficiently to providing a configuration of avoiding a feel of discomfort of the user.

One of objects of using a razor with a body formed of paper is to recycle materials. In recycling the used razor, the razor may be required to be separated according to materials such as paper, resin, metal, etc. Regarding the conventional razor, however, even if the body is formed of paper entirely, consideration is not given to detachment of a razor head from the body and the body and the razor head are firmly adhered to each other. This makes it difficult to separate the body and the razor head from each other and trying to separate the body and the razor head may break the razor head. Even if the body and the razor head are separated successfully, use of a resin material and a metal material forming the razor head results in inclusion of the resin material and the metal material in the razor head to cause a mixture of a plurality of materials. While allowing recycling to be done in a simple and economical way is required to promote recycling of materials, keeping a state with a mixture of materials makes it difficult to achieve simple and economical recycling. A conventional razor head such as that described above cannot be separated sufficiently into materials during disposal and cannot be said to give consideration to ease of separation into materials, making it difficult to recycle this razor effectively after use.

As another example, in the conventional razor disclosed in Patent Document 12, a surface of the rectangular piece 8 to which the razor blade 7 is fixedly attached forms an angle together with the outer surface 33 of a loose arc-like shape forming a head. This makes it difficult for a user to operate a handle and to press a blade of the razor against a skin at an angle at which the blade comes into surface contact with the skin. Furthermore, if external force is applied to the blade, the blade or a razor head may come off an end of the head formed of paper or the body may be broken partially with the external force. Such a configuration is common to the patent documents mentioned above other than Patent Document 12, so that it becomes a problem common to conventional razors including bodies formed of paper.

The present invention is intended to provide a razor that can solve the above-described problem.

Solution to Problem

To solve the above-described problem, the present invention provides a razor having a configuration as follows. In the following description, to facilitate understanding of the invention, signs, etc. in the drawings will be added in parentheses. However, each constituting element of the present invention should not be limited to such a specific configuration but should be interpreted widely to cover a range graspable by a person skilled in the art.

One means of the present invention is intended for a razor that is assembled by folding, the razor comprising:

a holding part that is held by a user; a head supporting part that is formed integrally with the holding part; and a razor head that is provided on the head supporting part, wherein the entire of the holding part and the head supporting part is formed of paper, the entire of the razor head is formed of metal, and the razor head includes a blade body and a frame body housing the blade body, the head supporting part includes a both end supporting portion that supports at least both ends in a width direction of the razor head, and the frame body is formed at least at a part of a periphery portion from a side facing the head supporting part, and includes a cut-out portion through which body hairs cut by the blade body can pass and that has a force point portion for removing the razor head from the head supporting part.

According to the razor having the above-described configuration, the razor head formed of metal can be removed easily from the holding part and the head supporting part formed of paper. This facilitates sorting for a user to facilitate recycling. In particular, in the above-described configuration, by the provision of the cut-out portion having both the function of facilitating removal and the function of causing cut body hairs to pass for preventing these body hairs from remaining in the razor head, it becomes possible to provide a razor that facilitates recycling through sorted disposal in a relatively simple configuration, and at the same time, can be used cleanly and comfortably.

Preferably, in the above-described razor, the head supporting part is not positioned at least at a part of a position facing the cut-out portion.

The razor having the above-described configuration causes a user to touch the cut-out portion easily in removing the razor head from the head supporting part, thereby facilitating sorted disposal further. Additionally, as cut body hairs are caused to pass through the cut-out portion easily, it becomes possible to reduce the likelihood further that body hairs will remain in the razor head. As a result, the razor can be used more cleanly and more comfortably.

Preferably, in the above-described razor, the razor head includes an opening portion through which body hairs cut by the blade body can pass, and the opening portion is provided on a surface facing the head supporting part and a position on the surface not faced by the head supporting part.

The razor having the above-described configuration causes cut body hairs to pass further through the opening portion. This makes it possible to reduce the likelihood further that body hairs will remain in the razor head. As a result, the razor can be used more cleanly and more comfortably.

Preferably, in the above-described razor, the razor head is adhered to the head supporting part on a side closer to an edge portion on an opposite side of an edge portion having the cut-out portion.

The razor having the above-described configuration achieves a configuration where, when a user applies force to the cut-out portion with the intention of removing the razor head from the head supporting part, the force acting for removing the razor head from the head supporting part is transmitted easily. This makes it possible to facilitate sorted disposal further.

Preferably, in the above-described razor, the frame body includes a front case having the opening portion from which the blade body is exposed and the cut-out portion, and a rear case, the front case has a box shape that is open on a side facing the rear case, the rear case has a box shape that is open on a side facing the front case, the front case is arranged to cover the rear case, and a distance between an edge portion of the front case having the cut-out portion and an edge portion of the rear case facing the edge portion of the front case is not smaller than 0.5 mm and not larger than 3 mm.

The razor having the above-described configuration causes a user to touch the cut-out portion more easily in removing the razor head from the head supporting part, thereby facilitating sorted disposal further.

Preferably, in the above-described razor, the razor head is directly adhered to the both end supporting portion in an adhesive region other than an adhesion prohibited region that is provided in a given range from the periphery portion of the frame body.

According to the razor having the above-described configuration, as the periphery portion of the razor head is not adhered to the head supporting part, the razor head can be configured to be removed easily from the head supporting part.

Preferably, in the above-described razor, at least a part of the adhesive region of the frame body is planar According to the razor having the above-described configuration, even if the adhesive region is relatively small, it is still possible to adhere the razor head to the head supporting part stably to achieve a configuration that can be used comfortably while being sorted easily.

Preferably, in the above-described razor, the head supporting part further includes a triangular triangle part that is formed between the both end supporting portion and the holding part, in a state before assembly, the head supporting part and the holding part are planar, the holding part is formed to extend in a longitudinal direction crossing the width direction, is symmetrical relative to a center line extending in the longitudinal direction, is connected to the triangle part of the head supporting part, branches along a connection part with the triangle part to be tapered, includes a narrow portion formed to be narrow in the width direction in a vicinity of a vertex of the triangle part crossing the center line, is formed to be expanded in the width direction from the narrow portion toward an end on the opposite side of the connection part, includes the end that is curved, has a center fold along the center line from the vertex to the end, and has a connection fold along the connection part, the razor head includes, in each vicinity of both ends in the width direction, a rectangular and planar rectangular-planar part, and the rectangular-planar part is adhered to a front surface of the both end supporting portion, a folding part is formed to project outward along the edge portion of the holding part and to be foldable to the side of the center line, the folding part has a width smaller than a width of the holding part, in assembly, the user folds the holding part along the connection fold and the center fold, so that the head supporting part is inclined to a back surface side relative to the center line, in a state after assembly, a part of the center line of the holding part is a back part and the edge portion of the holding part is a belly part, and the head supporting part continuous from the back part is bent toward the side of the belly part.

One means of the present invention is intended for a razor that is assembled by folding, the razor comprising: a holding part that is held by a user; a head supporting part that is formed integrally with the holding part; and a razor head that is provided on the head supporting part, wherein the entire of the holding part and the head supporting part is formed of paper, the entire of the razor head is formed of metal, in a state before assembly, the head supporting part and the holding part are planar, the head supporting part includes a both end supporting portion that supports at least both ends in a width direction of the razor head, and a triangular triangle part that is formed between the both end supporting portion and the holding part, the holding part is formed to extend in a longitudinal direction crossing the width direction, is symmetrical relative to a center line extending in the longitudinal direction, is connected to the triangle part of the head supporting part, branches along a connection part with the triangle part to be tapered, includes a narrow portion formed to be narrow in the width direction in a vicinity of a vertex of the triangle part crossing the center line, is formed to be expanded in the width direction from the narrow portion toward an end on the opposite side of the connection part, includes the end that is curved, has a center fold along the center line from the vertex to the end, and has a connection fold along the connection part, the razor head includes, in each vicinity of both ends in the width direction, a rectangular and substantially planar rectangular-planar part, and the rectangular-planar part is adhered to a front surface of the both end supporting portion, a folding part is formed to project outward along the edge portion of the holding part and to be foldable to the side of the center line, the folding part has a width smaller than a width of the holding part, in assembly, the user folds the holding part along the connection fold and the center fold, so that the head supporting part is inclined to a back surface side relative to the center line, in a state after assembly, a part of the center line of the holding part is a back part and the edge portion of the holding part is a belly part, and the head supporting part continuous from the back part is bent toward the side of the belly part.

According to the razor having the above-described configuration where the holding part includes the narrow portion and the razor is formed to be expanded in the width direction from the narrow portion toward the end on the opposite side of the head supporting part, the outer shape of the planar razor is not formed into a rectangular but can be formed into a shape with rounded corners. This achieves reduction in the amount of use of paper. Avoiding a rectangular shape as the outer shape of the razor increases a degree of freedom of design to achieve the compact body. Furthermore, while an index finger and a thumb of a user are to be located in the vicinity of the narrow portion when the user uses the razor, the presence of the narrow portion can form a configuration that prevents the finger of the user from coming off the razor downward.

According to the above-described configuration where the center fold is formed along the center line from the vertex to the end, the connection fold is formed along the connection part, and a user makes folding along the connection fold and the center fold in assembly, folding the holding part along the center fold naturally achieves folding along the connection fold further continuous with the center fold. Likewise, in assembly, folding the holding part along the connection fold naturally achieves folding along the center fold further continuous with the connection fold. Specifically, this allows the user to assemble the razor through a single touch, for example, thereby reducing the number of steps required for assembling the razor to facilitate assembly of the razor. This achieves a configuration that eliminates the burdensome operation for the user to make the razor ready to use. In folding along the connection fold, the head supporting part can be bent smoothly toward the side of the belly part.

According to the razor having the above-described configuration where the end on the opposite side of the head supporting part is curved, the end and its vicinity are not formed into a linear shape but can be rounded in a state after assembly. By doing so, if a finger of a user touches the end and its vicinity or if the user unintentionally grasps the end and its vicinity depending on a way in which the user holds the razor, for example, it is possible to lessen a feel of discomfort of the user. Specifically, a razor avoiding giving of a feel of discomfort to the user can be provided.

According to the above-described configuration where the razor head includes, in the vicinities of both ends in the width direction, the rectangular and substantially planar rectangular-planar parts, and these two rectangular-planar parts are adhered to a front surface of the both end supporting portion, it is possible to adhere the razor head and the both end supporting portion to each other with appropriate strength while consideration is given to ease of stripping. This makes it possible to separate the body and the razor head from each other easily without damaging the razor head. This reduces the likelihood that the blade of the razor will be exposed during the separation, making it possible to provide a razor giving consideration to safety.

According to the above-described configuration where the head supporting part continuous from the back part is bent toward the side of the belly part and the razor head is arranged at a surface of the both end supporting portion closer to the back part in a state after assembly, it is possible to arrange the razor head and the surface of the both end supporting portion close to the back part substantially parallel to each other. This allows a user to press the blade of the razor head against a skin at an angle at which the blade comes into surface contact with the skin in operating the holding part. Furthermore, if external force is applied to the blade, unlike in the conventional configuration where the external force is received in a direction substantially orthogonal to the surface of the both end supporting portion closer to the back part, the external force can be received along this surface. This can reduce the likelihood that the razor head will come off the head supporting part or the body will be damaged partially due to the external force.

According to the above-described configuration where the folding part is formed to project outward along the edge portion of the holding part and to be foldable to the side of the center line, and the folding part has a width smaller than a width of the holding part, as a result of the provision of the folding part, the belly part of the holding part is given a rounded shape to make the shape of the holding part easy to hold for a user. Furthermore, the belly part to which a finger of a user is likely to abut on is not given a sharp portion, making it possible to provide a razor giving consideration to safety.

Preferably, the above-described razor further comprises: the head fixing part provided on the opposite side of the holding part relative to the head supporting part, and folded to be fitted to the holding part or the head supporting part.

According to the razor having the above-described configuration, as a result of the fit to the head fixing part, the rigidity of the holding part or the head supporting part can be increased. This makes it possible to stabilize the position of the razor head. Thus, while the razor is formed of paper, the razor can be used with an operational feeling similar to that provided by a different high-rigidity razor using resin or metal, for example, for forming a part corresponding to the holding part or the head supporting part.

Preferably, in the above-described razor,
the holding part is assembled in such a manner that a section taken at a plane intersecting the longitudinal direction is fixed in a polygonal shape.

The razor having the above-described configuration suppresses change in the shape of the holding part occurring when the holding part is held, making it possible to stabilize the shape of the holding part. This makes the holding part easy to grip. Furthermore, while the razor is formed of paper, the razor can be used with an operational feeling similar to that provided by a different high-rigidity razor using resin or metal, for example, for forming a part corresponding to the holding part or the head supporting part.

Preferably, in the above-described razor,
the holding part includes a long hole part extending in the longitudinal direction in a state before assembly.

According to the razor having the above-described configuration, when a side of a finger of a user is placed on the long hole part, friction is generated between the edge of the long hole part and the finger of the user, thereby forming a part on which the user is to hook the finger. This allows the razor to be held more easily while suppressing slippage.

Preferably, in the above-described razor,
a part of the razor head closer to the holding part projects from the both end supporting portion toward the holding part, and
the razor head is removable from the head supporting part after use.

In a configuration where a blade is attached directly to a body like in the razors disclosed in Patent Documents 3 to 5 of the patent documents listed above, sorted disposal becomes possible if the blade formed of metal is removable from the body formed of paper. However, consideration is not given to recycling in this configuration so the blade is exposed. Furthermore, as the blade is firmly adhered to the body in this configuration, consideration is not given to safety of a user trying to separate the body and the razor head from each other for recycling. While such razors include a razor giving consideration to safety by folding a paper body in half and wrapping a blade, consideration to recycling is still missing in this razor.

In the above-described configuration, a part of the razor head closer to the holding part projects from the both end supporting portion toward the holding part and the razor head is removable from the head supporting part after use. Thus, during folding along the connection fold in assembly, a tapered part of the holding part branching along the connection fold goes farther from the part closer to the holding to allow the part of the razor head closer to the holding part to be exposed. As a result, it is possible to form a part at the razor head on which a user can hook a finger easily, so that the user can remove the razor head from the razor supporting part safely with a finger hooked on the part closer to the holding part. According to the configuration where, after the removal, the razor head is entirely formed of metal and the holding part and the head supporting part are integrally formed of paper, it is possible to separate the razor after use into the metal material and the paper material through a single operation of removing the razor head from the razor. This facilitates separation between materials and achieves implementation of recycling in a simple and economical way. Specifically, it is possible to provide a razor giving consideration to the safety of a user trying to remove the body and the razor head from each other for recycling and improving the effectiveness of recycling.

According to the configuration where the part of the razor head closer to the holding part is adhered to the both end supporting portion of the head supporting part in such a manner as to project from the both end supporting portion toward the holding part, the razor head can be located near the vertex of the triangle part. When external force acting in a bending direction is applied to the head supporting part, the amount of deformation is reduced in the vicinity of the vertex of the triangle part. Thus, in a state after assembly, flexure of the head supporting part in the bending direction bent toward the belly part is restricted appropriately, so that the position of the razor head in the bending direction can be stabilized.

Preferably, in the above-described razor,
the head supporting part and the holding part are configured to be elastically deformed in such a manner that the razor head is biased toward a skin of a user when the user makes the razor head touch the skin.

The razor having the above-described configuration provides appropriate elasticity to the head supporting part and the holding part formed of paper to prevent application of excessive pressure to the skin.

Preferably, in the above-described razor, the holding part includes: an insertion part formed on one side relative to the center line and deformed by being pressed; and an insertion hole part formed at a position on the opposite side relative to the center line at which the insertion hole part faces the insertion part in a state after assembly, and deformed by being pressed, and in a state after assembly, the insertion part is inserted into and fitted to the insertion hole part to fix the holding part in a state of being folded along the center fold.

According to the razor having the above-described configuration, in a state after assembly, the fit between the insertion part and the insertion hole part makes it possible to reduce the likelihood that the holding part will unintentionally stretch on the belly side in response to the elasticity of paper around the center fold, so that the holding part can be retained in a shape easy to hold for a user. It is also possible to reduce the likelihood that the bending of the head supporting part will unintentionally return toward the back part to allow the head supporting part to be retained in a state bent appropriately relative to the holding part.

Preferably, in the above-described razor, in a state after assembly, the holding part includes a cut portion formed in such a manner as to extend from the back part toward the belly part, and the holding part is fixed in a state of being folded along the center fold by folding the cut portion.

According to the razor having the above-described configuration, in a state after assembly, it is possible to reduce the likelihood that the holding part will unintentionally stretch on the belly side in response to the elasticity of paper around the center fold, so that the holding part can be retained in a shape easy to hold for a user. It is also possible to reduce the likelihood that the bending of the head supporting part will unintentionally return toward the back part to allow the head supporting part to be retained in a state bent appropriately relative to the holding part.

Preferably, the above-described razor further comprises:

a projection formed in such a manner as to protrude outward from one edge portion that is one of the two edge portions of the holding part in a state before assembly; and a cut-out portion formed at the other edge portion, and in a state after assembly, the projection is inserted into and fitted to the cut-out portion to fix the holding part in a state of being folded along the center fold.

According to the razor having the above-described configuration, in a state after assembly, it is possible to reduce the likelihood that the holding part will unintentionally stretch on the belly side in response to the elasticity of paper around the center fold, so that the holding part can be retained in a shape easy to hold for a user. It is also possible to reduce the likelihood that the bending of the head supporting part will unintentionally return toward the back part to allow the head supporting part to be retained in a state bent appropriately relative to the holding part.

DESCRIPTION OF EMBODIMENTS

Figure 1:
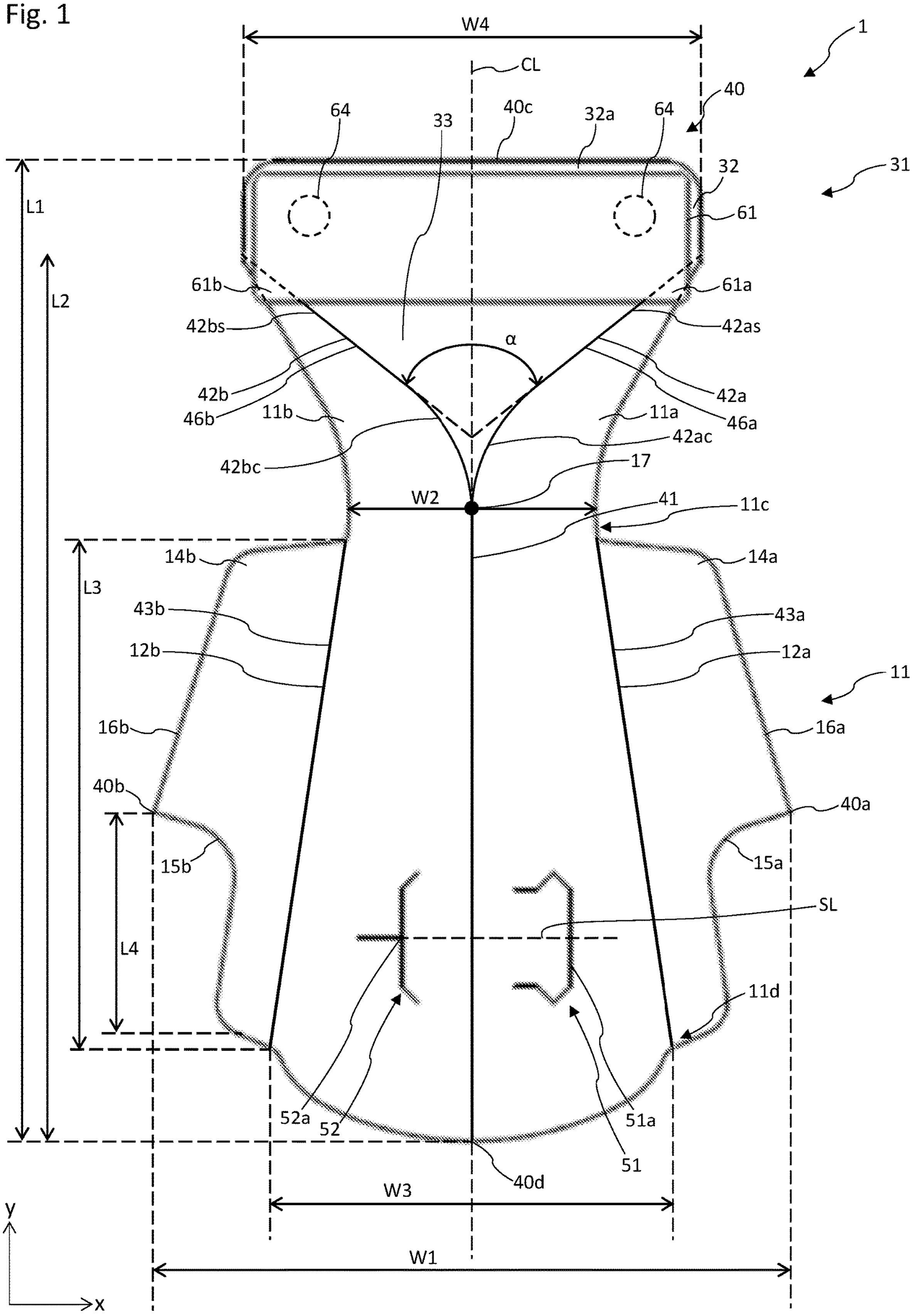
FIG. 1 is a plan view from a front side showing a razor being manufactured according to an embodiment.

One of features of a razor according to one embodiment of the present invention is that, in order to contribute to fulfilment of the goals of the SDGs, the razor has an environmentally-friendly configuration satisfying the 3R.

The razor of the present invention will be described in detail by referring to the drawings. However, embodiments and examples described below are merely examples of the present invention and are not intended to make the present invention interpreted in a limited technical range. Furthermore, explanation given by presenting a numerical value or a numerical value range for a specific size is merely an example and the present invention should not be limited to such a numerical value or a numerical value range. In each of the drawings, corresponding constituting elements are given the same sign and the explanation thereof may be omitted.

1. Embodiment

<(1) Configuration of Razor 1>

Figure 2:
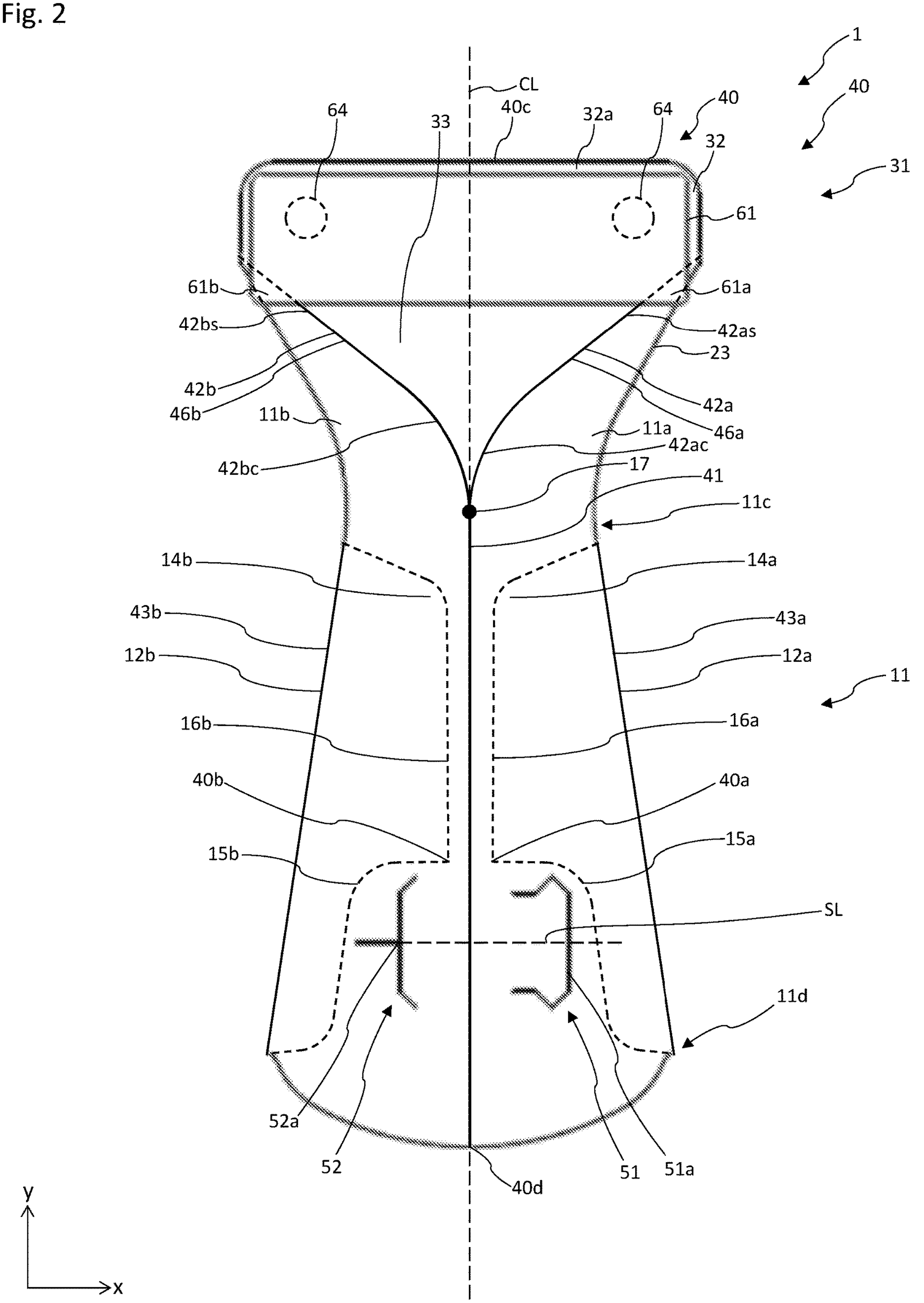
FIG. 2 is a plan view from a front side showing the razor at completion of manufacture according to the embodiment.
Figure 3:
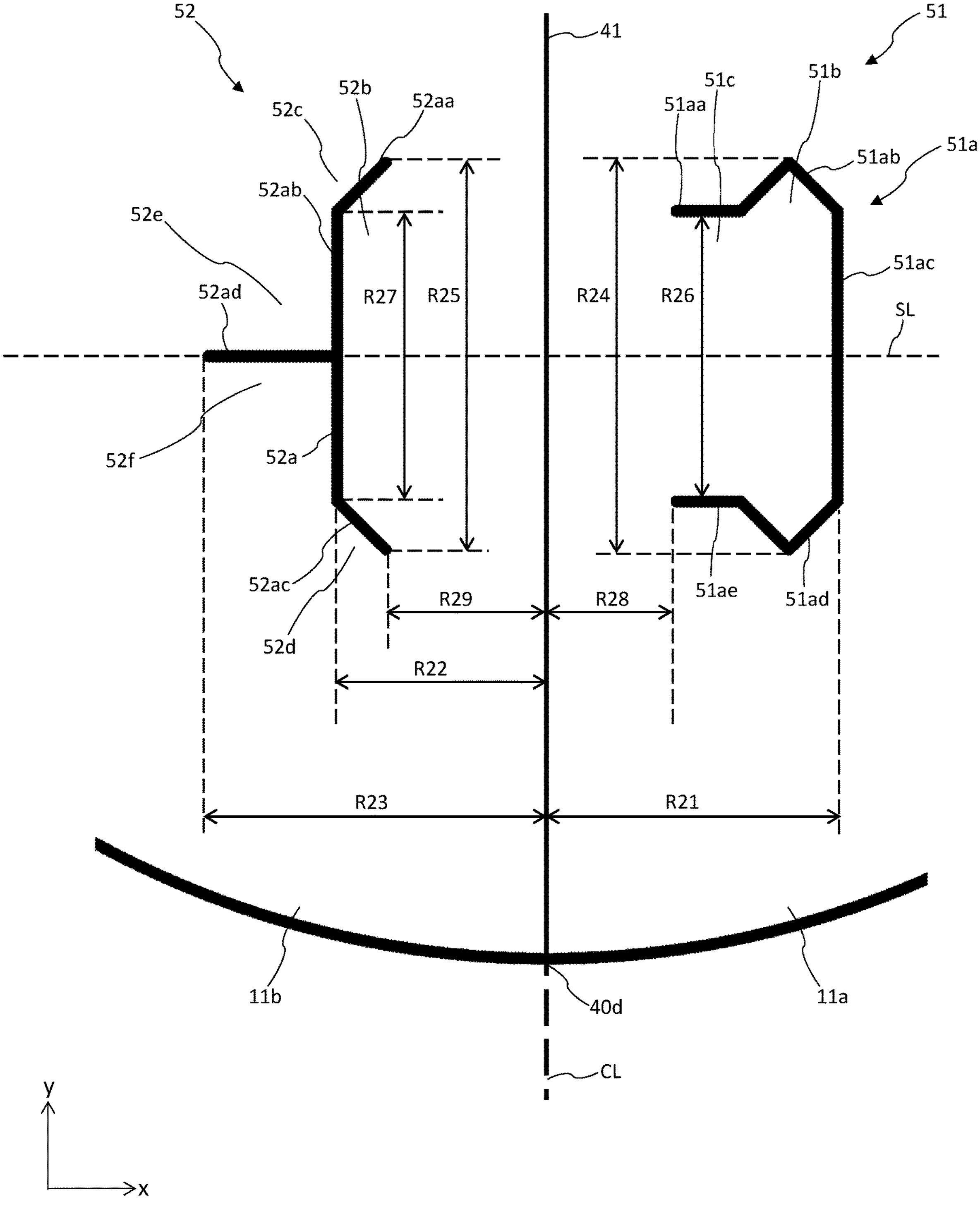
FIG. 3 is an enlarged view showing an insertion part, an insertion hole part, and their vicinities of the razor shown in FIG. 1.
Figure 4:
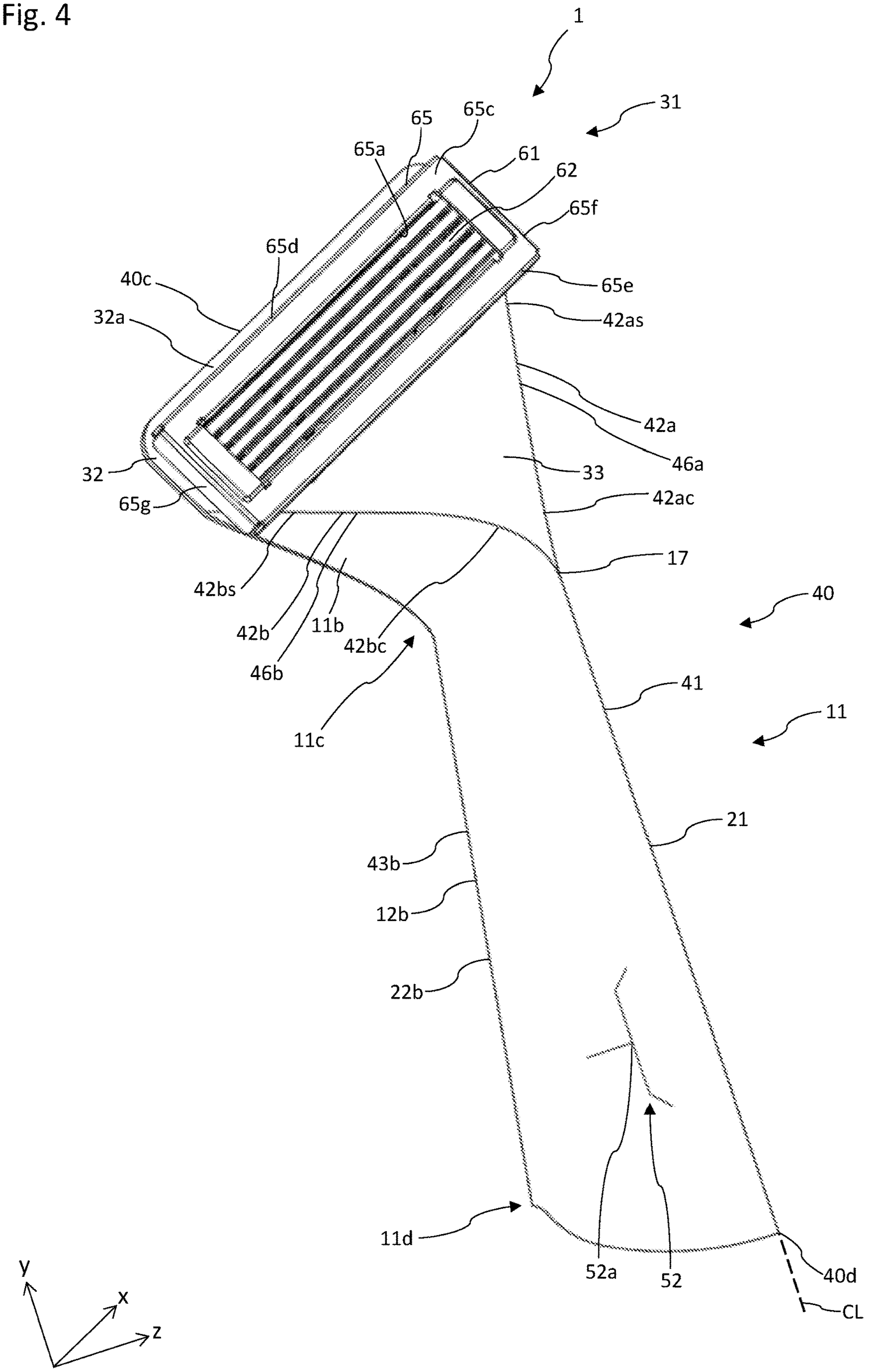
FIG. 4 is a perspective view showing the razor in a state after assembly according to the embodiment.
Figure 5:
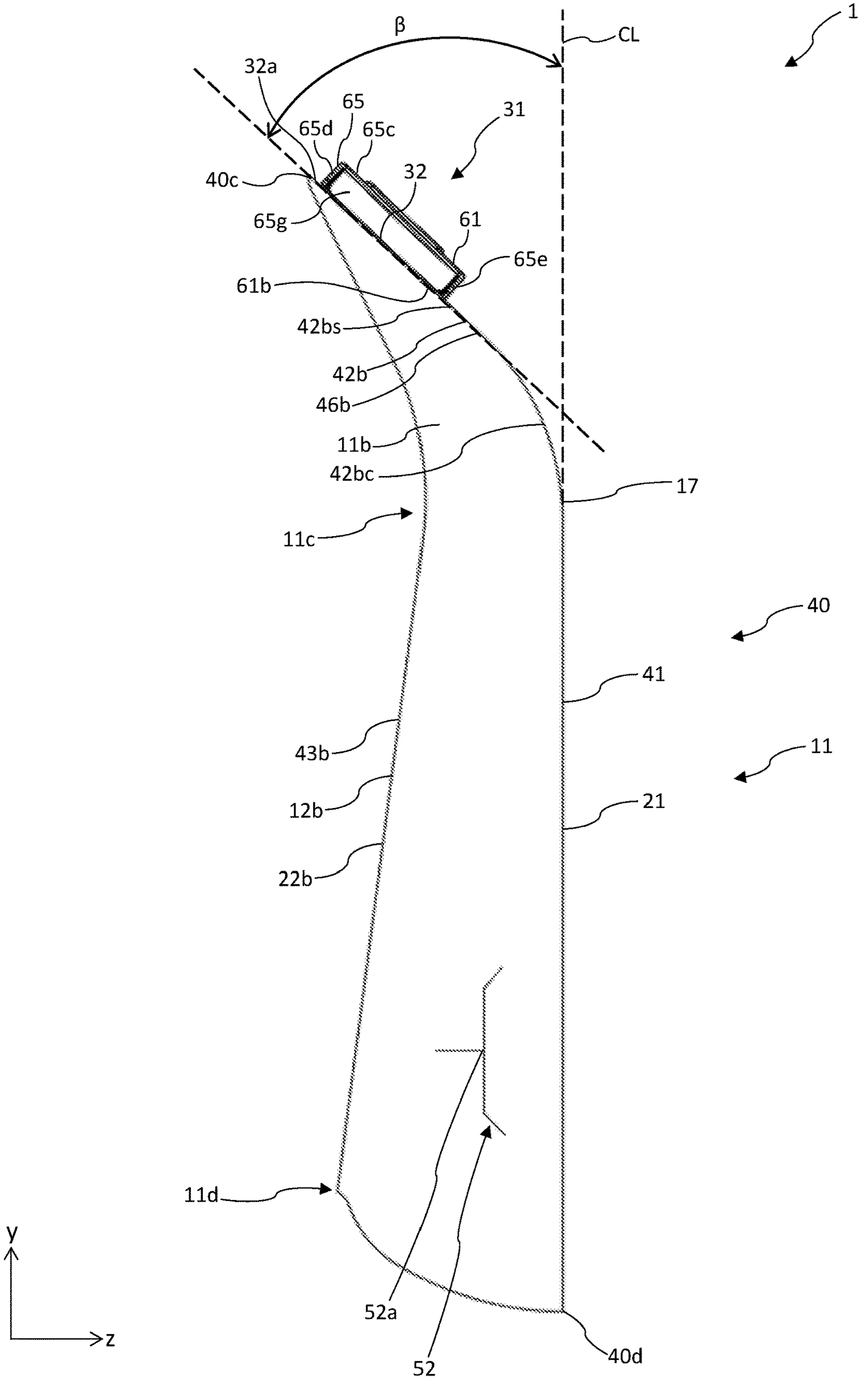
FIG. 5 is a plan view from a width direction showing the razor in a state after assembly according to the embodiment.
Figure 6:
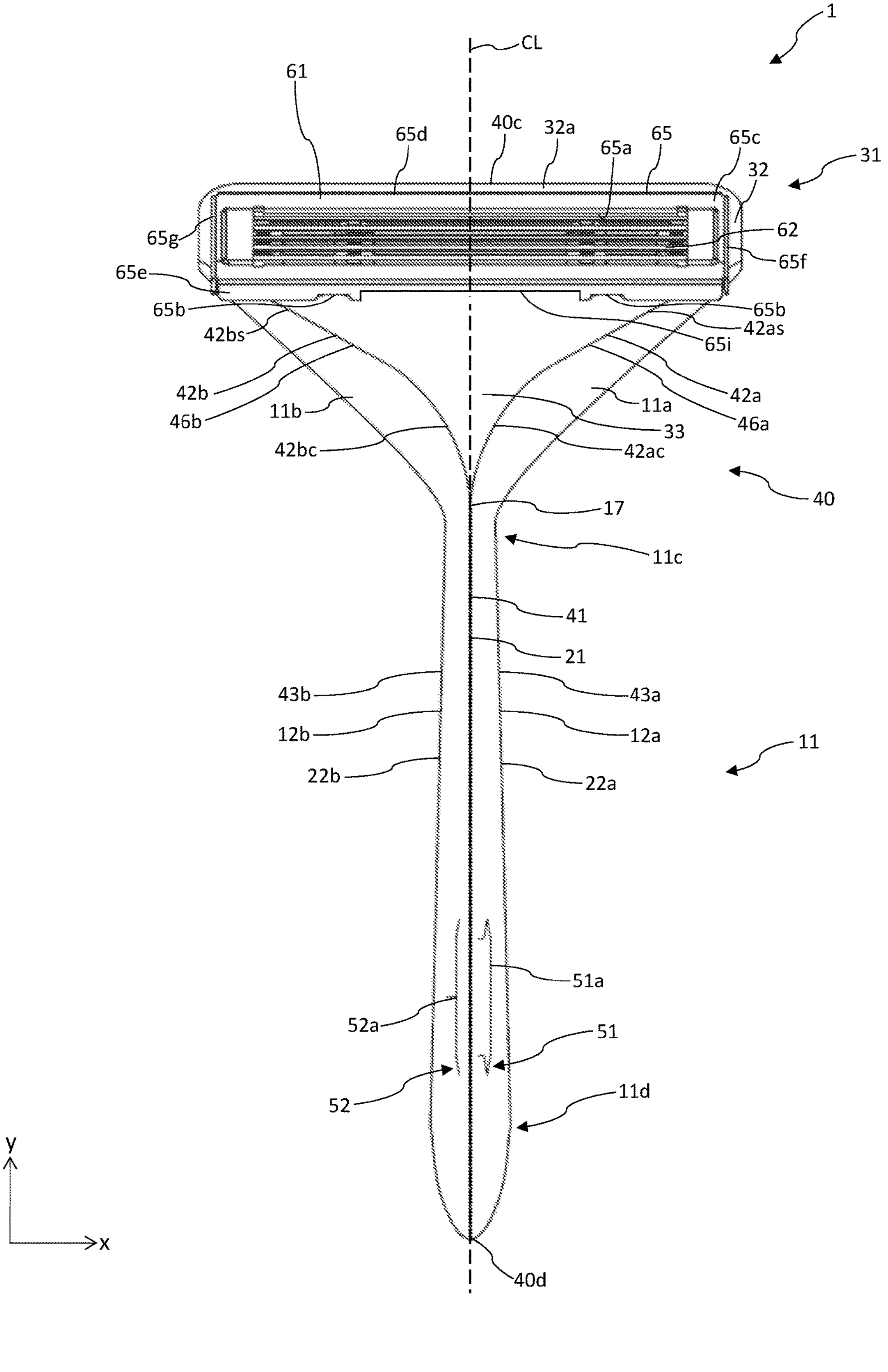
FIG. 6 is a plan view from a front side showing the razor in a state after assembly according to the embodiment.
Figure 7:
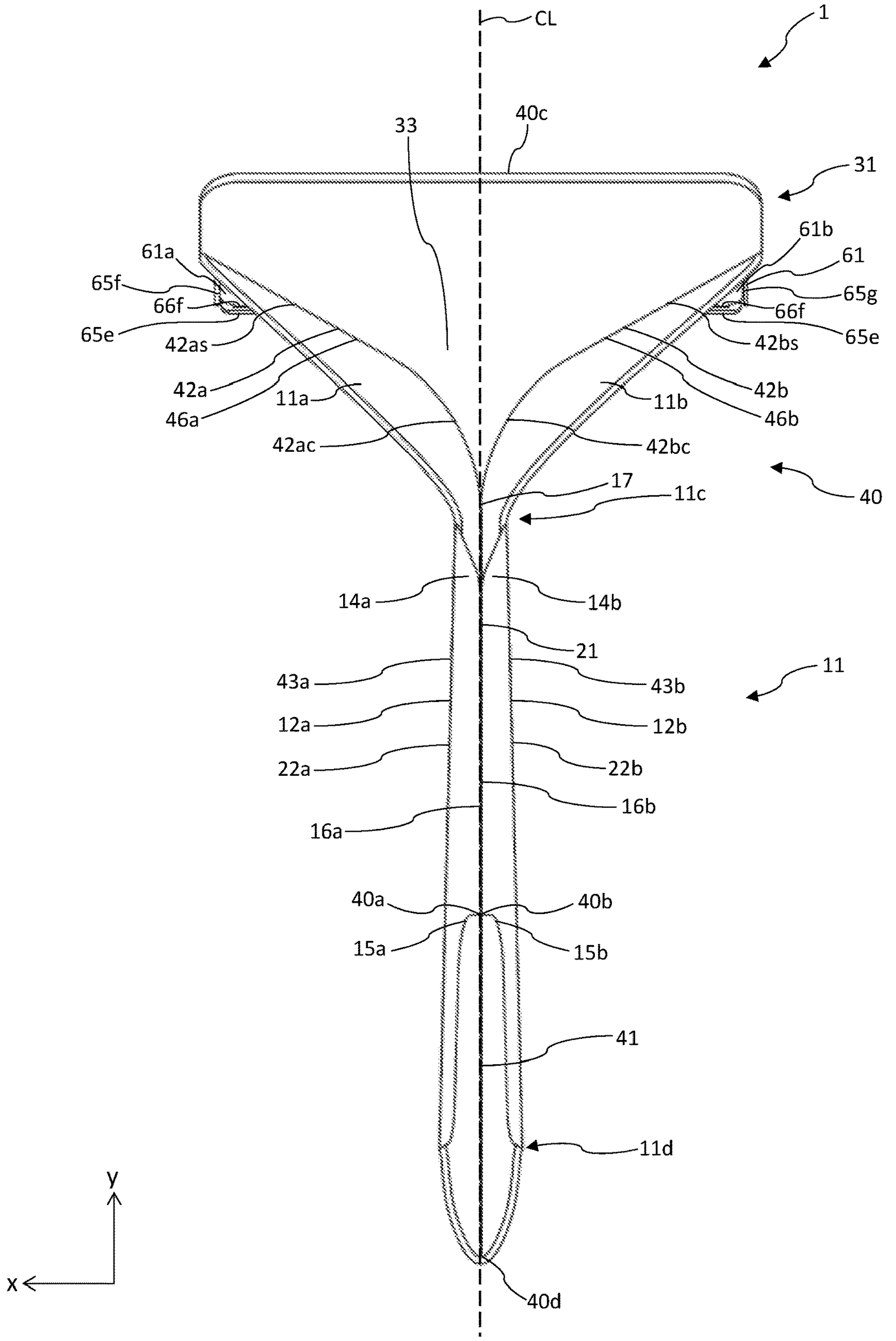
FIG. 7 is a plan view from a back side showing the razor in a state after assembly according to the embodiment.
Figure 8:
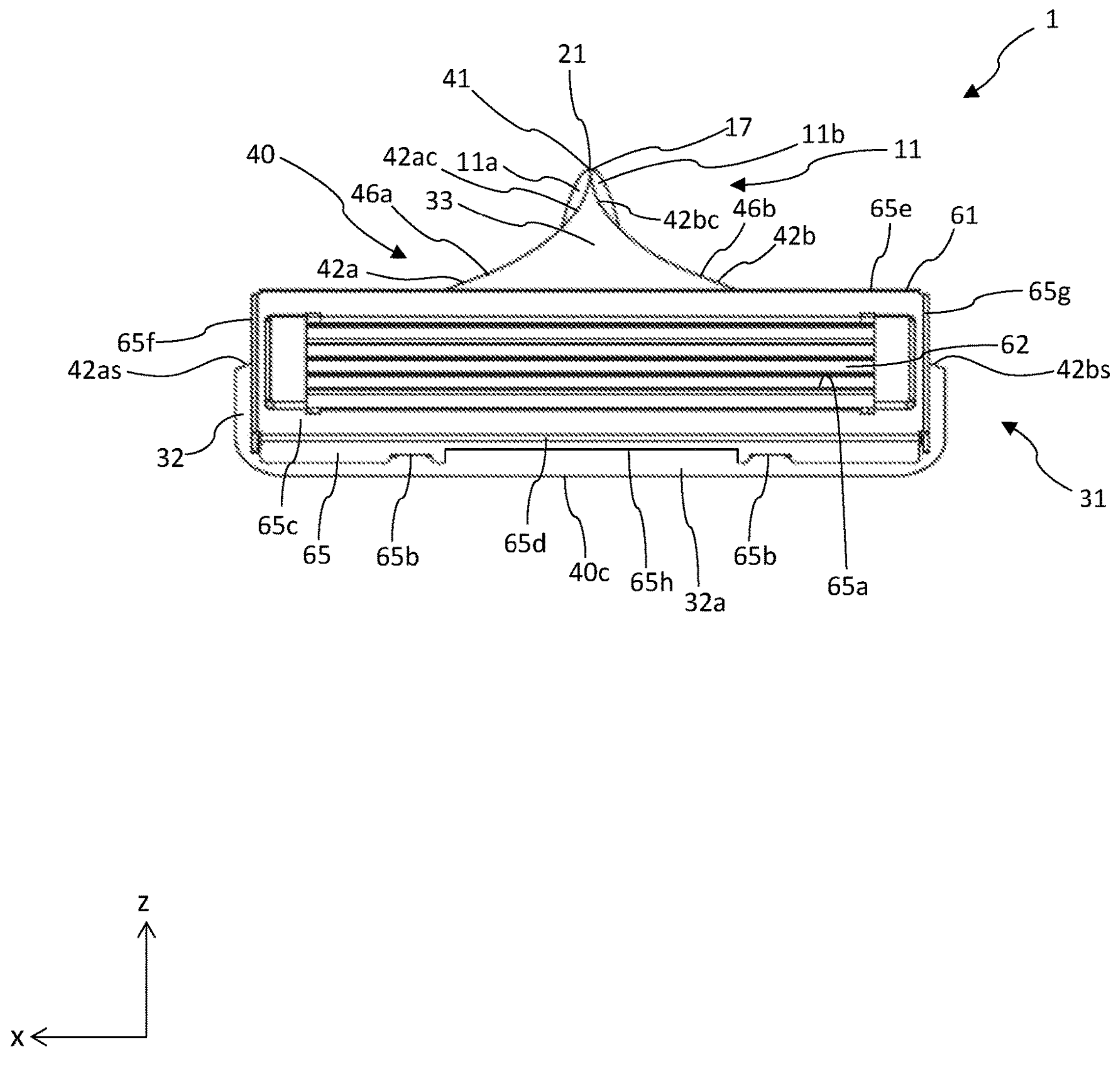
FIG. 8 is a plan view from above showing the razor in a state after assembly according to the embodiment.
Figure 9:
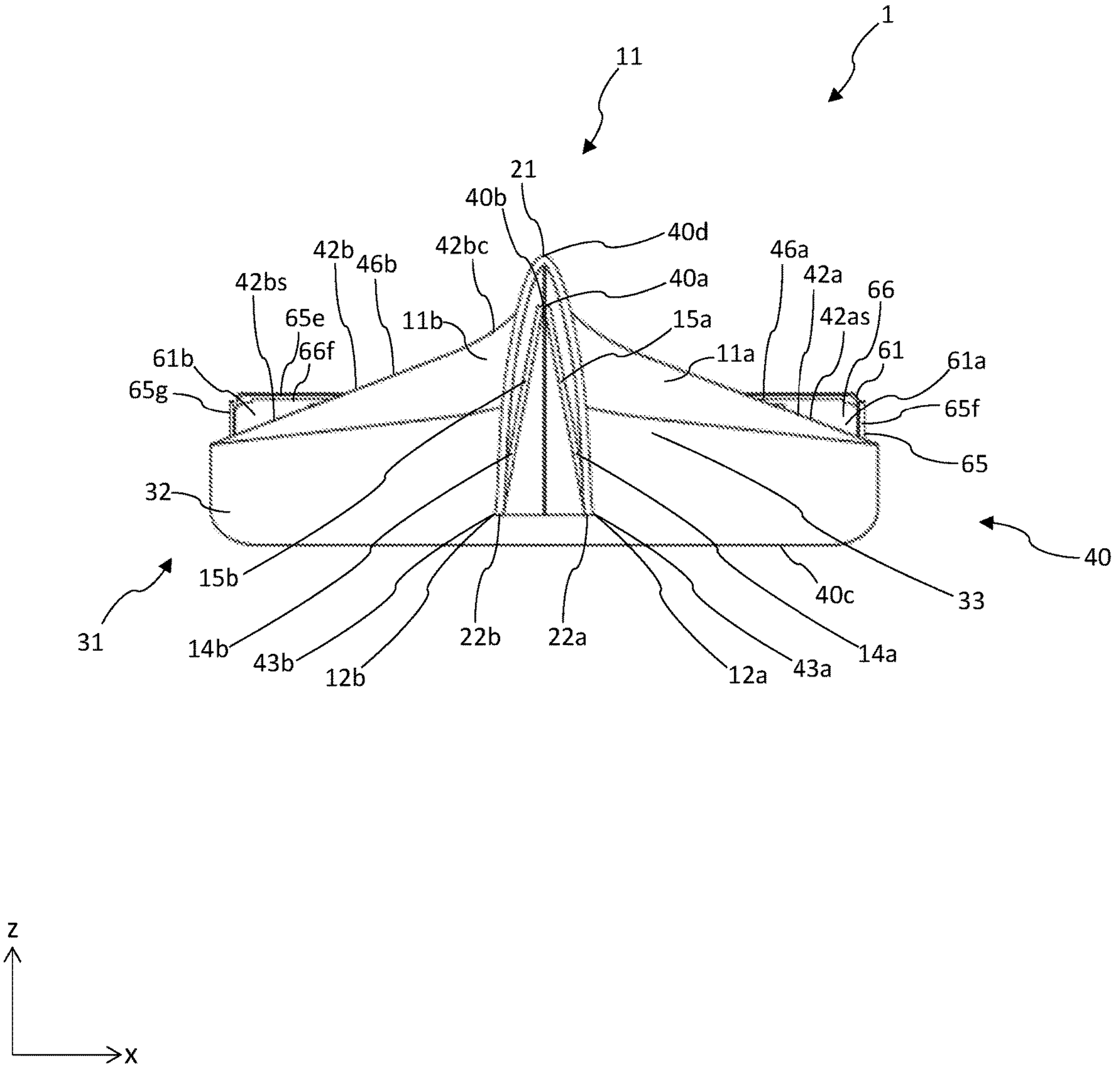
FIG. 9 is a plan view from below showing the razor in a state after assembly according to the embodiment.
Figure 10:
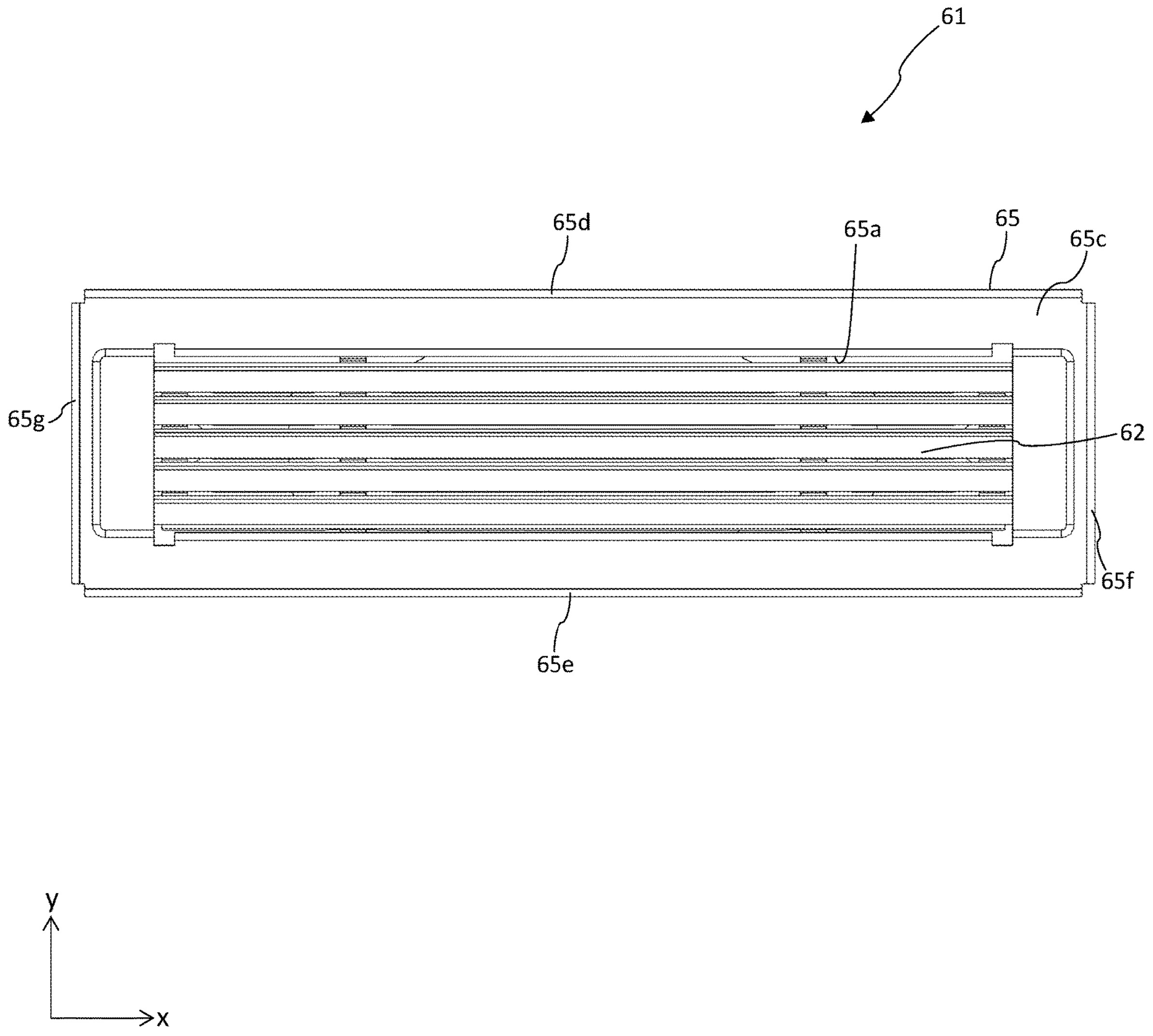
FIG. 10 is a plan view from a front side showing a razor head according to the embodiment.
Figure 11:
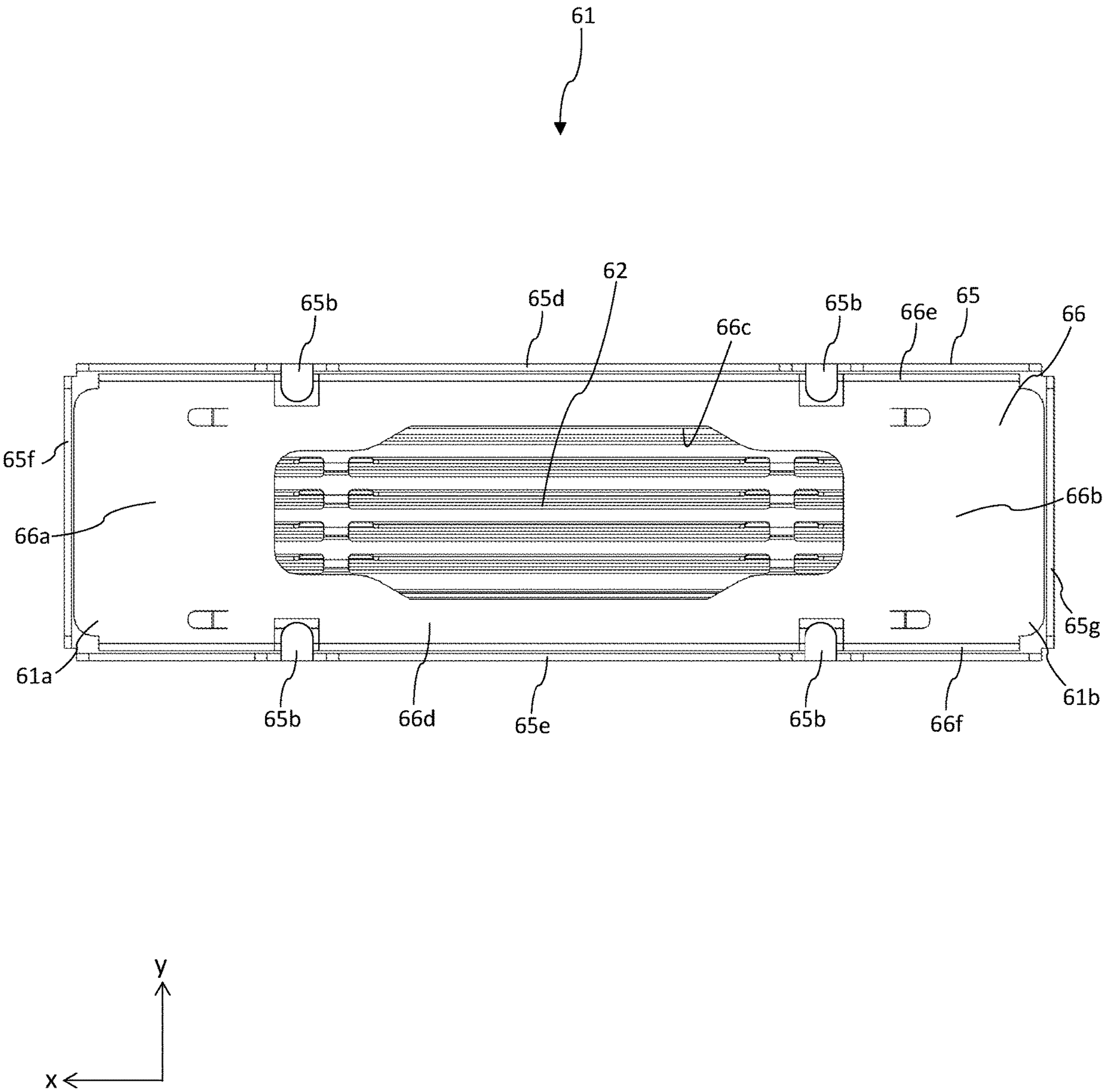
FIG. 11 is a plan view from a back side showing the razor head according to the embodiment.

FIG. 1 is a plan view from a front side showing a razor being manufactured according to an embodiment. FIG. 2 is a plan view from a front side showing the razor at completion of manufacture according to the embodiment. FIG. 3 is an enlarged view showing an insertion part, an insertion hole part, and their vicinities of the razor shown in FIG. 1. FIG. 4 is a perspective view showing the razor in a state after assembly according to the embodiment. FIG. 5 is a plan view from a width direction showing the razor in a state after assembly according to the embodiment. FIG. 6 is a plan view from a front side showing the razor in a state after assembly according to the embodiment. FIG. 7 is a plan view from a back side showing the razor in a state after assembly according to the embodiment. FIG. 8 is a plan view from above showing the razor in a state after assembly according to the embodiment. FIG. 9 is a plan view from below showing the razor in a state after assembly according to the embodiment. FIG. 10 is a plan view from a front side showing a razor head according to the embodiment. FIG. 11 is a plan view from a back side showing the razor head according to the embodiment.

An x axis, a y axis, and a z axis are shown in each of the drawings. An axis pointed toward a direction vertical to a sheet of paper on a plane forming the razor is defined as the "z axis." An axis vertical to the z axis is defined as the "y axis." An axis vertical to both the y axis and the z axis is defined as the "x axis." Here, the x axis, the y axis, and the z axis form right-handed 3D orthogonal coordinates. In the below, a direction of an arrow of the z axis may be called a z axis+side, and a direction opposite the arrow may be called a z axis−side. This also applies to the other axes. The z axis+side and the z axis−side may be called a "front side" and a "back side" respectively. An x axis+side and an x axis−side may be called a "right side" and a "left side" respectively. A y axis+side and a y axis−side may be called an "upper side" and a "lower side" respectively. The upper side and the lower side may be tilted mainly toward the z axis with respect to the y axis. The y axis direction may be called a longitudinal direction. The x axis direction may be called a width direction. The z axis direction may be called a thickness direction.

As shown in FIGS. 1 to 11, a razor 1 of the embodiment has a configuration including a razor head 61 and a body 40. The body 40 has a configuration including a holding part 11, a folding part 14_a_, a folding part 14_b_, and a head supporting part 31.

According to a method of manufacturing the razor 1 of the embodiment at a factory, the body 40 of a planar shape and the razor head 61 are manufactured separately, for example. The razor 1 shown in FIG. 1 is manufactured by connecting the body 40 and the razor head 61 manufactured separately. Then, the folding parts 14_a_ and 14_b_ of the body 40 are each folded to the back side to manufacture the razor 1 as a finished good shown in FIG. 2. Namely, the razor 1 shown in FIG. 1 is the razor 1 in a state being manufactured, and the razor 1 shown in FIG. 2 is the razor 1 in a state at completion of manufacture at a factory. The razor 1 shown in FIG. 2 at completion of manufacture is assembled to become the razor 1 having a stereoscopic shape shown in FIGS. 4 to 9.

<Body 40>

As shown in FIG. 1, the body 40 is integrally formed of paper. Preferably, the body is formed of a paper material having water resistance or a paper material having a surface with water-resistant coating. In the embodiment, the body 40 is formed into a planar shape by cutting paper along the contour of the body 40. The body 40 has a thickness of about 1 mm, for example. The body 40 extends parallel to the xy plane and has an outer shape bilaterally symmetrical with respect to a center line CL parallel to the y axis. Here, a right end, a left end, an upper end, and a lower end of the planar body 40 are defined as a right end 40_a_, a left end 40_b_, an upper end 40_c_, and a lower end 40_d_ respectively. In the embodiment, an entire width W1 from the right end 40_a_ to the left end 40_b_ is about 57 mm. An entire length L1 from the upper end 40_c_ to the lower end 40_d_ is about 89 mm.

<Fold>

The body 40 is provided with a center fold 41, a connection fold 42_a_, a connection fold 42_b_, an inversion fold 43_a_, and an inversion fold 43 to facilitate folding during manufacture and assembly of the razor 1. The folds are creases or perforations formed on paper, for example. The center fold 41 is formed to extend upward along the center line CL from the lower end 40_d_ of the body 40. The center fold 41 branches upward from a vertex 17 located on the center line CL into the connection fold 42_a_ and the connection fold 42_b_.

The connection fold 42_b_ is formed to extend upward and leftward from the vertex 17 to the left end of the body 40. The connection fold 42_b_ has a configuration including a curved fold 42_bc_ and a linear fold 42_bs_. The curved fold 42_bc_ is connected to the vertex 17 and is curved in such a manner as to be convex rightward. The linear fold 42_bs_ is connected to the curved fold 42_bc_ on the left side of the curved fold 42_bc_ and extends substantially linearly to the left end of the body 40.

The connection fold 42_a_ is formed to extend upward and rightward from the vertex 17 to the right end of the body 40 in such a manner as to be bilaterally symmetrical to the connection fold 42_b_ with respect to the center line CL. The connection fold 42_a_ has a configuration including a curved fold 42_ac_ and a linear fold 42_as_. The curved fold 42_ac_ has a shape bilaterally symmetrical to the curved fold 42_bc_ with respect to the center line CL. The linear fold 42_as_ has a shape bilaterally symmetrical to the linear fold 42_bs_ with respect to the center line CL.

In the planar body 40, the connection folds 42_a_ and 42_b_ form a boundary between the holding part 11 and the head supporting part 31. In the embodiment, a part on the lower side of each of the connection folds 42_a_ and 42_b_ is the holding part 11, and a part on the upper side of each of the connection folds 42*a* and 42*b* is the head supporting part 31. In the following, in the planar body 40, a part along the connection fold 42*a* and a part along the connection fold 42*b* may be called a connection part 46*a* and a connection part 46*b* respectively. Specifically, the connection parts 46*a* and 46*b* connect the holding part 11 and the head supporting part 31 to each other.

In the planar body 40, the inversion fold 43*a* is formed at a boundary between a holding part 11*a* and the folding part 14*a* described later. Specifically, the inversion fold 43*a* does not intersect the center fold 41 and the connection folds 42*a* and 42*b* but is formed to extend upward while approaching the center fold 41 on the right side of the center fold 41. In the planar body 40, the inversion fold 43*b* is formed at a boundary between a holding part 11*b* and the folding part 14*b* described later. Specifically, the inversion fold 43*b* is formed to be bilaterally symmetrical to the inversion fold 43*a* with respect to the center line CL. In the embodiment, a part on the left side of the inversion fold 43*a* is the holding part 11 and a part on the right side of the inversion fold 43*a* is the folding part 14*a*. A part on the right side of the inversion fold 43*b* is the holding part 11 and a part on the left side of the inversion fold 43*b* is the folding part 14*b*. The inversion folds 43*a* and 43*b* are each formed into a linear shape.

<Head Supporting Part 31>

The head supporting part 31 has a configuration including a rectangular part 32 and a triangle part 33. The rectangular part 32 has a substantially rectangular shape extending in the width direction, namely, in the x axis direction. The rectangular part 32 supports the razor head 61 at least at its both ends and is an example of a "both end supporting portion" of the present invention. The rectangular part 32 has a width W4 in the x axis direction that is about 42 mm. The rectangular part 32 has a flat bonding surface 32*a* formed on the z axis+side, namely, on the front side thereof. The bonding surface 32*a* is coated with an adhesive 64 applied to each of the both ends and its vicinity thereof in the width direction to be adhered to the razor head 61.

The triangle part 33 is formed between the rectangular part 32 and the holding part 11 and has a substantially triangular shape downwardly sharpened. The lower vertex 17 of the triangle part 33 is located on the center line CL. The triangle part 33 is curved in such a manner as to be tapered toward the vertex 17.

In a plan view of the planar body 40 from a front side, of two sides of the triangle part 33 adjacent to each other across the vertex 17, a direction in which a part of one of these sides closer to the rectangular part 32 extends and a direction in which a part of the other side closer to the rectangular part 32 extends form an angle α that is from 80° to 120°. Preferably, the angle α is from 90° to 110°. In the embodiment, an extension line extending from the linear fold 42*as* toward the vertex 17 and an extension line extending from the linear fold 42*bs* toward the vertex 17 form the angle α of about 102°.

<Holding Part 11>

The holding part 11 is formed to extend in the y axis direction and to be held by a user, for example. The holding part 11 is formed bilaterally symmetrical with respect to the center line CL and includes a narrow portion 11*c* formed to be narrow in the width direction in the vicinity of the vertex 17. In the embodiment, the narrow portion 11*c* has a width W2 in the x axis direction that is about 22 mm.

The holding part 11 includes a wide portion 11*d* formed on the lower side of the narrow portion 11*c* to be wide in the width direction from the narrow portion 11*c* toward the lower end 40*d*. In the embodiment, the wide portion 11*d* has a width W3 in the x axis direction that is about 36 mm.

The holding part 11 has a curved shape at a lower end and its vicinity. In the embodiment, the holding part 11 is bilaterally symmetrical with respect to the center line CL in a range from the left end of the wide portion 11*d* to the right end of the wide portion 11*d* through the lower end 40*d* and is curved in such a manner as to be convex downward.

The holding part 11 has a configuration including the holding part 11*a* located on the right side of the center fold 41, and the holding part 11*b* located on the left side of the center fold 41 and having a shape bilaterally symmetrical to the holding part 11*a* with respect to the center line CL. The holding part 11 branches along a connection part 46*a* and a connection part 46*b* with the triangle part 33 to be tapered on the upper side of the vertex 17. More specifically, the holding part 11*b* is connected to the left side of the triangle part 33 of the head supporting part 31 through the connection part 46*b*. The holding part 11*b* has a shape extending upward and leftward while a left edge portion 12*b* and the connection fold 42*b* approach each other. The holding part 11*b* has an upper end connected to the lower left corner of the rectangular part 32 of the head supporting part 31. Likewise, the holding part 11*a* is connected to the right side of the triangle part 33 of the head supporting part 31 through the connection part 46*a*. The holding part 11*a* has a shape extending upward and rightward while a right edge portion 12*a* and the connection fold 42*a* approach each other. The holding part 11*a* has an upper end connected to the lower right corner of the rectangular part 32 of the head supporting part 31.

<Insertion Part 51 and Insertion Hole Part 52>

The holding part 11 has a configuration including an insertion part 51 and an insertion hole part 52. The insertion part 51 is formed on one side relative to the center line CL and is deformed by being pressed. The insertion hole part 52 is formed at a position on the opposite side relative to the center line CL at which the insertion hole part 52 faces the insertion part 51 in a state after assembly, and is deformed by being pressed. In the embodiment, the insertion part 51 and the insertion hole part 52 are formed at the holding parts 11*a* and 11*b* respectively. Alternatively, the insertion part 51 and the insertion hole part 52 may be formed at the holding parts 11*b* and 11*a* respectively. The specific configurations of the insertion part 51 and the insertion hole part 52 are shown mainly in the enlarged view of FIG. 3.

The insertion part 51 has a shape vertically symmetrical with respect to a line of symmetry SL parallel to the x axis, and has a configuration including the wide portion 51*b* and a root portion 51*c*. The root portion 51*c* is vertically symmetrical with respect to the line of symmetry SL and has a rectangular shape extending long in the y axis direction. The wide portion 51*b* is vertically symmetrical with respect to the line of symmetry SL and is located on the right side of the root portion 51*c*. An upper side and a lower side of the wide portion 51*b* have shapes projecting upward and downward respectively in triangular shapes.

In the embodiment, the insertion part 51 is formed of a cut 51*a* vertically symmetrical with respect to the line of symmetry SL. The cut 51*a* is formed at the holding part 11*a* and has a configuration including an upper portion 51*aa*, an upper projection 51*ab*, a right portion 51*ac*, a lower projection 51*ad*, and a lower portion 51*ae* in a plan view of the planar holding part 11*a* from a front side.

The upper portion 51*aa* functions as an upper boundary (side) of the root portion 51*c* and is a cut extending parallel to the x axis. The lower portion 51*ae* functions as a lower boundary (side) of the root portion 51*c* and is a cut vertically symmetrical to the upper portion 51*aa* with respect to the line of symmetry SL. The upper projection 51*ab* functions as an upper boundary of the wide portion 51*b* and is a cut continuous with the right end of the upper portion 51*aa*. The lower projection 51*ad* functions as a lower boundary of the wide portion 51*b* and is a cut continuous with the right end of the lower portion 51*ae*. The right portion 51*ac* functions as a right boundary (side) of the wide portion 51*b* and is a cut extending parallel to the y axis. The upper end and the lower end of the right portion 51*ac* are continuous with the right end of the upper projection 51*ab* and with the right end of the lower projection 51*ad* respectively.

The insertion hole part 52 is formed of a cut 52*a* vertically symmetrical with respect to the line of symmetry SL. The cut 52*a* is formed at the holding part 11*b* and has a configuration including an upper portion 52*aa*, a vertically-long portion 52*ab*, a lower portion 52*ac*, and a horizontally-long portion 52*ad* in a plan view of the planar holding part 11*b* from a front side. The vertically-long portion 52*ab* is a cut extending parallel to the y axis in such a manner as to be vertically symmetrical with respect to the line of symmetry SL. The upper portion 52*aa* is a cut continuous with the upper end of the vertically-long portion 52*ab* and extending upward and rightward. The lower portion 52*ac* is a cut continuous with the lower end of the vertically-long portion 52*ab* and extending downward and rightward while being vertically symmetrical to the upper portion 52*aa* with respect to the line of symmetry SL. The horizontally-long portion 52*ad* is a cut connected to a midpoint of the vertically-long portion 52*ab* and extending leftward along the line of symmetry SL.

A range surrounded by the right end and the left end of the upper portion 52*aa* and the right end and the left end of the lower portion 52*ac* is defined as a trapezoidal portion 52*b*. A region on the upper side of the upper portion 52*aa* is defined as an engagement region 52*c*. A region on the lower side of the lower portion 52*ac* is defined as an engagement region 52*d*. A region on the left side of the vertically-long portion 52*ab* and on the upper side of the horizontally-long portion 52*ad* is defined as an upper rectangular portion 52*e*. A region on the left side of the vertically-long portion 52*ab* and on the lower side of the horizontally-long portion 52*ad* is defined as a lower rectangular portion 52*f*.

The insertion part 51 and the insertion part 52 are located closer to the lower end 40*d* with respect to the center of the holding part 11 in the y axis direction in a plan view of the planar holding part 11 from a front side. More specifically, the line of symmetry SL of each of the insertion part 51 and the insertion hole part 52 is located above the lower end 40*d* and separated from the lower end 40*d* by 19 mm.

A distance R24 at the insertion part 51 between the upper end of the upper projection 51*ab* and the lower end of the lower projection 51*ad* is substantially the same as a distance R25 at the insertion hole part 52 between the upper end of the upper portion 52*aa* and the lower end of the lower portion 52*ac*. In the embodiment, the distances R24 and R25 are both about 12 mm.

A distance R26 at the insertion part 51 between the upper portion 51*aa* and the lower portion 51*ae* is substantially the same as a distance R27 at the insertion hole part 52 between the upper end and the lower end of the vertically-long portion 52*ab* and is less than the distances R24 and R25. In the embodiment, the distances R26 and R27 are both about 9 mm.

A distance R21 between the center line CL and the right portion 51*ac* of the insertion part 51 is greater than a distance R22 between the center line CL and the vertically-long portion 52*ab* of the insertion hole part 52 and is less than a distance R23 between the center line CL and the left end of the horizontally-long portion 52*ad* of the insertion hole part 52. In the embodiment, the distances R21, R22, and R23 are about 8.5 mm, about 6 mm, and about 11 mm respectively.

A distance R28 at the insertion part 51 between the center line CL and the left end of the lower portion 51*ae* is less than a distance R29 at the insertion hole part 52 between the center line CL and the right end of the lower portion 52*ac*. In the embodiment, the distances R28 and R29 are about 3 mm and about 5 mm respectively.

<Folding Parts 14*a* and 14*b*>

As shown in FIGS. 1 and 2, the folding part 14*b* is formed to project outward along the left edge portion 12*b* of the holding part 11*b*. The folding part 14*b* has a length in the width direction less than the length of the holding part 11 in the width direction. In a plan view of the planar body 40 from a front side, a value obtained by dividing the length of the folding part 14*b* in the y axis direction (hereinafter may be called a folding part length L3) by the length of the holding part 11*b* in the y axis direction (hereinafter may be called a holding part length L2) is equal to or greater than 0.25. In the embodiment, the folding part length L3 and the holding part length L2 are about 46 mm and about 80 mm respectively. A value obtained by dividing the folding part length L3 by the holding part length L2 is about 0.58.

The folding part 14*b* is folded to the side of the center line CL. In the embodiment, the folding part 14*b* is folded along the inversion fold 43*b* in such a manner that the folding part 14*b* becomes located on the back side of the holding part 11*b*. The folding part 14*a* has a shape bilaterally symmetrical to the folding part 14*b* with respect to the center line CL. Like the folding part 14*b*, the folding part 14*a* is folded along the inversion fold 43*a* in such a manner that the folding part 14*a* becomes located on the back side of the holding part 11*b*.

As described above, with the folding parts 14*a* and 14*b* both in a folded state (hereinafter may be called a "manufacture completed state"), the razor 1 is shipped from a factory (see FIG. 2). In a plan view of the razor 1 in the manufacture completed state from a front side, an outer edge 16*b* of the folding part 14*b* is substantially parallel to the center line CL and is located on the left side of the center line CL while being separated from the center line CL by a distance with which the edge 16*b* does not hinder folding of the holding part 11 along the center fold 41. An outer edge 16*a* of the folding part 14*a* is bilaterally symmetrical to the edge 16*b* with respect to the center line CL.

The folding part 14*b* includes a cut-out portion 15*b* formed at a part where the insertion part 51 and the insertion hole part 52 are fitted to each other in a state after assembly. A value obtained by dividing the length of the cut-out portion 15*b* in the y axis direction (hereinafter may be called a cut-out portion length L4) by the folding part length L3 is equal to or greater than 0.26 (see FIG. 1). In the embodiment, the cut-out portion length L4 is about 18 mm. A value obtained by dividing the cut-out portion length L4 by the folding part length L3 is about 0.39. The folding part 14*a* includes a cut-out portion 15*a* bilaterally symmetrical to the cut-out portion 15*b* with respect to the center line CL.

When the folding part 14*b* is folded, overlap between the folding part 14*b* and the insertion hole part 52 is avoided by the presence of the cut-out portion 15*b* formed at the folding part 14*b* (see FIG. 2). Likewise, when the folding part 14*a* is folded, overlap between the folding part 14*a* and the insertion part 51 is avoided by the presence of the cut-out portion 15*a* formed at the folding part 14*a* (see FIG. 2). As a result, in a state where the holding part 11 is folded along the center fold 41, it becomes possible to fit the insertion part 51 and the insertion hole part 52 to each other without physical obstruction.

<Razor Head 61>

As shown in FIGS. 10 and 11, the entire of the razor head 61 is formed of metal, and has a configuration including a frame body and a blade body 62. The frame body has a configuration including a front case 65 and a rear case 66. The front case 65 and the rear case 66 are connected to each other to form the frame body into a box shape in which internal space is formed. The blade body 62 is housed in this internal space.

In the embodiment, the blade body 62 has a configuration including five blades extending in the x axis direction, and an elastic member (not shown in the drawings) biasing the five blades toward the z axis direction. The blade body 62 is formed of stainless steel that is an alloy of iron and chromium or an alloy of chromium and nickel, for example. The blade body 62 may be coated. The blade body 62 may have a configuration including four or less, or six or more blades. The blade body 62 may have a configuration formed of metal other than stainless steel.

The front case 65 and the rear case 66 form the frame body together housing the blade body 62. The front case 65 and the rear case 66 are formed of a tinplate prepared by surface treating iron with tin, for example. The front case 65 and the rear case 66 may be surface treated with other metal or may be formed of metal not surface treated. As the blade body 62, the front case 65, and the rear case 66 are formed of metal mainly containing iron as described above, the razor head 61 can be recycled or disposed of under the category of "iron."

The front case 65 is formed into a box shape having an opening portion 65*a* formed at a front-side surface and an open back side. The blade body 62 is exposed from the opening portion 65*a*. The front case 65 has a configuration including a main plate 65*c*, a long-side plate 65*d*, a long-side plate 65*e*, a short-side plate 65*f*, and a short-side plate 65*g*. The main plate 65*c* extends substantially parallel to the xy plane and has a substantially rectangular surface extending long in the x axis direction. The substantially rectangular opening portion 65*a* extending long in the x axis direction is formed at a substantially central position at a surface of the main plate 65*c*. The long-side plates 65*d* and 65*e* are plates extending backward in the z axis direction (thickness direction) from the upper end and the lower end of the main plate 65*c* respectively. Each of the long-side plates 65*d* and 65*e* includes two projections 65*b* projecting from back-side ends. Namely, four projections 65*b* are formed at the front case 65. The short-side plates 65*f* and 65*g* are plates extending backward from the right end and the left end of the main plate 65*c* respectively.

The main plate 65*c*, the long-side plates 65*d* and 65*e*, and the short-side plates 65*f* and 65*g* are formed integrally into a planar shape, for example. The front case 65 is formed into a shape with space formed on the back side of the main plate 65*c*, enclosed at the left, right, top, and bottom, and allowing the rear case 66 to be housed therein by folding the long-side plates 65*d* and 65*e* and the short-side plates 65*f* and 65*g* relative to the main plate 65*c*, for example.

The long-side plates 65*d* and 65*e* are provided with a cut-out portion 65*h* and a cut-out portion 65*i* respectively (see FIGS. 6 and 8). The cut-out portions 65*h* and 65*i* are formed at positions including central positions of the long-side plates 65*d* and 65*e* in the x axis direction (long-axis direction) respectively, have fixed lengths in the x axis direction, and are formed in such a manner as to extend frontward from their back-side ends. These cut-out portions 65*h* and 65*i* have the function of causing body hairs cut by the blade body 62 to pass to reduce the likelihood that such body hairs will remain in the razor head 61. The cut-out portions 65*h* and 65*i* each include a force point portion as a force point on which a user hooks a finger, a nail, or a jig for removing the razor head 61 from the head supporting part 31. Specifically, each of the cut-out portions 65*h* and 65*i* has both the function of facilitating recycling through sorted disposal and the function of allowing a razor to be used cleanly and comfortably by preventing cut body hairs from remaining in the razor head 61.

The rear case 66 has a configuration including a bottom plate 66*d*, and a long-side plate 66*e* and a long-side plate 66*f*. The bottom plate 66*d* extends substantially parallel to the xy plane and faces the main plate 65*c* of the front case 65. The bottom plate 66*d* has a substantially rectangular surface extending long in the x axis direction. The bottom plate 66*d* has a rear-side surface provided with a rectangular-planar part 66*a* and a rectangular-planar part 66*b* both rectangular and substantially planar and formed in the vicinities of both ends in the x axis direction. More specifically, a substantially rectangular opening portion 66*c* extending long in the x axis direction is formed at a substantially central position at the rear-side surface of the bottom plate 66*d*. A rectangular-planar part 66*a* and a rectangular-planar part 66*b* to be coated with the adhesive 64 are formed on the right side and on the left side of the opening portion 66*c* respectively. A region in the vicinity of the lower right corner on the back side of the bottom plate 66*d* is defined as a protrusion 61*a*. A region in the vicinity of the lower left corner on the back side of the bottom plate 66*d* is defined as a protrusion 61*b*. At least one of the rectangular-planar parts 66*a* and 66*b* may be provided with a recess of an extent not to cause hindrance to adhesion between the razor head 61 and the rectangular part 32.

The long-side plates 66*e* and 66*f* are plates extending frontward from the upper end and the lower end of the bottom plate 66*d* respectively in the z axis direction (thickness direction). The bottom plate 66*d* and the long-side plates 66*e* and 66*f* are formed integrally, for example. Space for housing the blade body 62 is formed between the long-side plate 66*e* and the long-side plate 66*f*.

With the blade body 62 housed in the space between the long-side plate 66*e* and the long-side plate 66*f*, the rear case 66 is connected to the front case 65. Then, the two protrusions 65*b* of the long-side plate 65*d* and the two protrusions 65*b* of the long-side plate 65*e* of the front case 65 are folded toward the opening portion 66*c* of the rear case 66 of the front case 65, thereby fixing the rear case 66 to the front case 65.

As shown in FIGS. 1 and 2, the rectangular-planar parts 66*a* and 66*b* of the rear case 66 are adhered to the rectangular part 32 in such a manner that a part of the razor head 61 closer to the holding part 11 projects from the rectangular part 32 toward the holding part 11. More specifically, the rectangular-planar parts 66*a* and 66*b* of the rear case 66 and the bonding surface 32*a* of the rectangular part 32 are adhered to each other with the adhesive 64 in such a manner that the protrusion 61*a* of the razor head 61 is located on the lower side of the connection fold 42*a* and the protrusion 61*b* of the razor head 61 is located on the lower side of the connection fold 42*b*.

At the razor head 61, a region in which the adhesive 64 is provided for adhesion to the rectangular part 32 of the head supporting part 31 is an adhesive region, and a region other than the adhesive region is an adhesion prohibited region. The adhesive region is provided at a position closer to the upper end of the razor head 61, not at a central position in the y axis direction. This achieves a configuration where, when a user applies force to the cut-out portion 65*i* with the intention of removing the razor head 61 from the head supporting part 31, the force acting for the removal is transmitted easily. The adhesion prohibited region is provided as a given region other than the adhesive region such as a region of not smaller than 0.5 mm and not larger than 1 mm, for example, from a periphery portion of the rear case 66 forming the frame body. Providing this adhesion prohibited region prevents the periphery portion of the razor head 61 from being adhered to the head supporting part 31, thereby achieving a configuration of facilitating removal of the razor head from the head supporting part. The adhesion prohibited region may be not smaller than 0.5 mm and not larger than 3 mm, for example, from the periphery portion of the rear case 66.

In one configuration, a user may apply force to the cut-out portion 65*h* in removing the razor head 61 from the head supporting part 31. In this case, the adhesive region may be provided at a position closer to the lower end of the razor head 61, not to the upper end. In a configuration where the razor head 61 includes both the cut-out portions 65*h* and 65*i*, the adhesive region may be provided at a position closer to either the upper end or the lower end.

As the adhesive region of the rear case 66 has a planar shape, even if the adhesive region is relatively small, it is still possible to adhere the razor head 61 to the head supporting part 31 stably to achieve a configuration that can be used comfortably while being sorted easily. Even if the adhesive region is planar not entirely but partially, certain effect is still fulfilled.

<Assembly>

In assembly, the razor 1 in the manufacture completed state shown in FIG. 2 is folded by a user along the center fold 41 and the connection folds 42*a* and 42*b* in such a manner that the front side becomes convex. As a specific example, in assembly of the razor 1, the user folds the holding part 11 along the center fold 41. The holding part 11 can be folded with one hand, for example. By folding the holding part 11, folding along the connection folds 42*a* and 42*b* proceed naturally. As the folding parts 14*a* and 14*b* have already been folded at completion of manufacture, the user can assemble the razor 1 with one hand.

As shown in FIGS. 4 to 9, in a state after assembly, a part of the center line CL of the holding part 11 is a back part 21 and the edge portions 12*a* and 12*b* of the holding part 11 are a belly part 22*a* and a belly part 22*b* respectively. By doing so, the head supporting part 31 continuous from the back part 21 is inclined to the back surface relative to the center line CL. Specifically, the head supporting part 31 is bent toward the sides of the belly parts 22*a* and 22*b*. The razor head 61 is arranged at the bonding surface 32*a* of the rectangular part 32 closer to the back part 21.

As shown in FIG. 5, in a plan view of the razor 1 in a state after assembly in the x axis direction, a direction in which the bonding surface 32*a* of the rectangular part 32 extends and a direction in which the center line CL extends form an angle β that is from 35° to 55°. Preferably, the angle β is from 40° to 50°. In the embodiment, the angle β is about 45°.

As shown in FIGS. 3 and 4, in a state after assembly, the insertion part 51 is inserted into and fitted to the insertion hole part 52 to fix the holding part 11 in a state of being folded along the center fold 41. More specifically, when a user presses the insertion part 51 while the holding part 11 is in a state of being folded along the center fold 41, the cut 51*a* at the holding part 11*a* is cleaved to deform the insertion part 51 in such a manner as that the insertion part 51 approaches the holding part 11*b*.

When the user presses the insertion part 51 further, the insertion hole part 52 at the holding part 11*b* is pressed with the insertion part 51 to cleave the cut 52*a* at the holding part 11*b*. At this time, the trapezoidal portion 52*b*, the upper rectangular portion 52*e*, and the lower rectangular portion 52*f* of the insertion hole part 52 curl up to form a hole (hereinafter may be called a "cleavage hole"). The cleavage hole has a length in the y axis direction of up to the distance R25 to pass the insertion part 51 through the cleavage hole. As the user releases a hand from the insertion part 51, the trapezoidal portion 52*b* tries to restore its original shape by elasticity to press the insertion part 51. By doing so, the upper end and the lower end of the wide portion 51*b* of the insertion part 51 are engaged with the engagement regions 52*c* and 52*d* of the holding part 11*b* respectively. This makes the insertion part 51 unlikely to come off the cleavage hole to fix the holding part 11 in a state of being folded along the center fold 41.

As shown in FIGS. 4 to 9, the holding part 11 is configured to be held by the user during use. The head supporting part 31 and the holding part 11 are configured to be deformed elastically to bias the razor head 61 toward the skin of the user when the user brings the razor head 61 into contact with the skin. The razor head 61 is configured to be removable from the head supporting part 31 after use. More specifically, the user hooks fingers on the protrusions 61*a* and 61*b* and strips the razor head 61 from the rectangular part 32, thereby separating the razor head 61 and the head supporting part 31 from each other.

<Wrapping>

The razor 1 is wrapped individually with paper, for example. Two or more razors 1 may be wrapped together with paper. Wrapping the razor 1 with paper in this way facilitates carriage of the razor 1 for business trip or travel, for example. Wrapping paper and the body 40 can be disposed of together under the category of "paper."

<2. Modifications>

First to sixth modifications of the embodiment of the present invention will be described next. These modifications differ from the embodiment in terms of the shape of the body, etc. In the following, differences from the embodiment will be described and description of a configuration common to that of the embodiment will be omitted. In the drawings, a corresponding or similar part is given the same sign and will not be described repeatedly.

<(1) First Modification>

Figure 12:
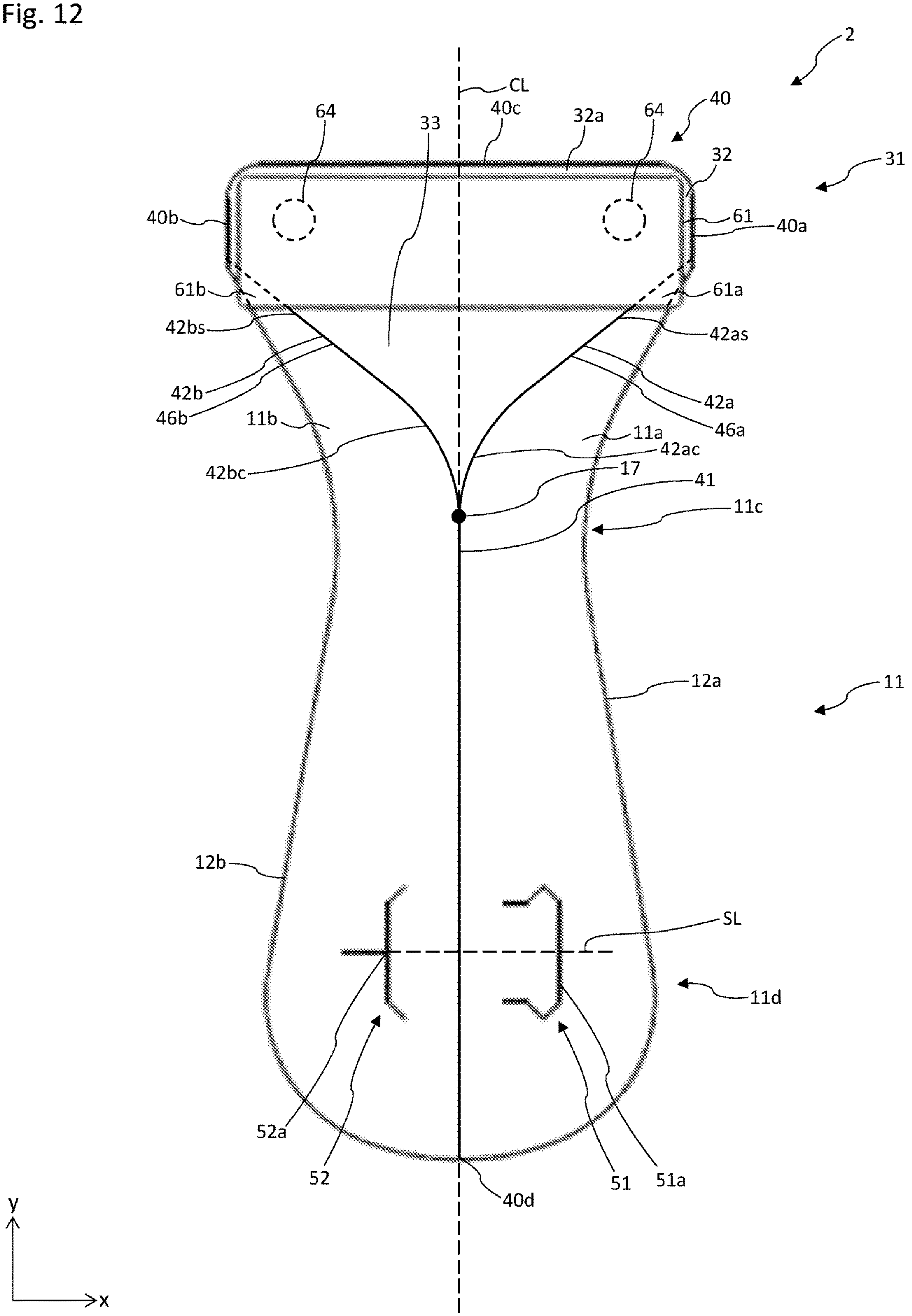
FIG. 12 is a plan view from a front side showing a razor at completion of manufacture according to a first modification of the embodiment.

FIG. 12 is a plan view from a front side showing a razor at completion of manufacture according to a first modification of the embodiment. In comparison to the razor 1 shown in FIG. 1, a razor 2 according to the first modification of the embodiment has a different outer shape of the holding part 11 not including the folding parts 14*a* and 14*b*. As a result of the absence of the folding parts 14*a* and 14*b*, the razor 2 as a finished good shown in FIG. 12 is formed by connecting the body 40 and the razor head 61 to each other. This configuration without the folding parts 14*a* and 14*b* reduces folding process to achieve simplified manufacture, allowing reduction in manufacturing cost for the razor 2. Furthermore, the amount of use of paper can be reduced to allow reduction in material cost for manufacturing the razor 2.

The holding part 11 of the razor 2 is formed into an outer shape loosely curved on a lower side entirely. This configuration can lessen a stimulus to be applied to a hand of a user when the lower side of the holding part 11 abuts on the hand of the user. This makes it possible to reduce the likelihood that the user using the razor 2 will experience a feel of discomfort.

<(2) Second Modification>

Figure 13:
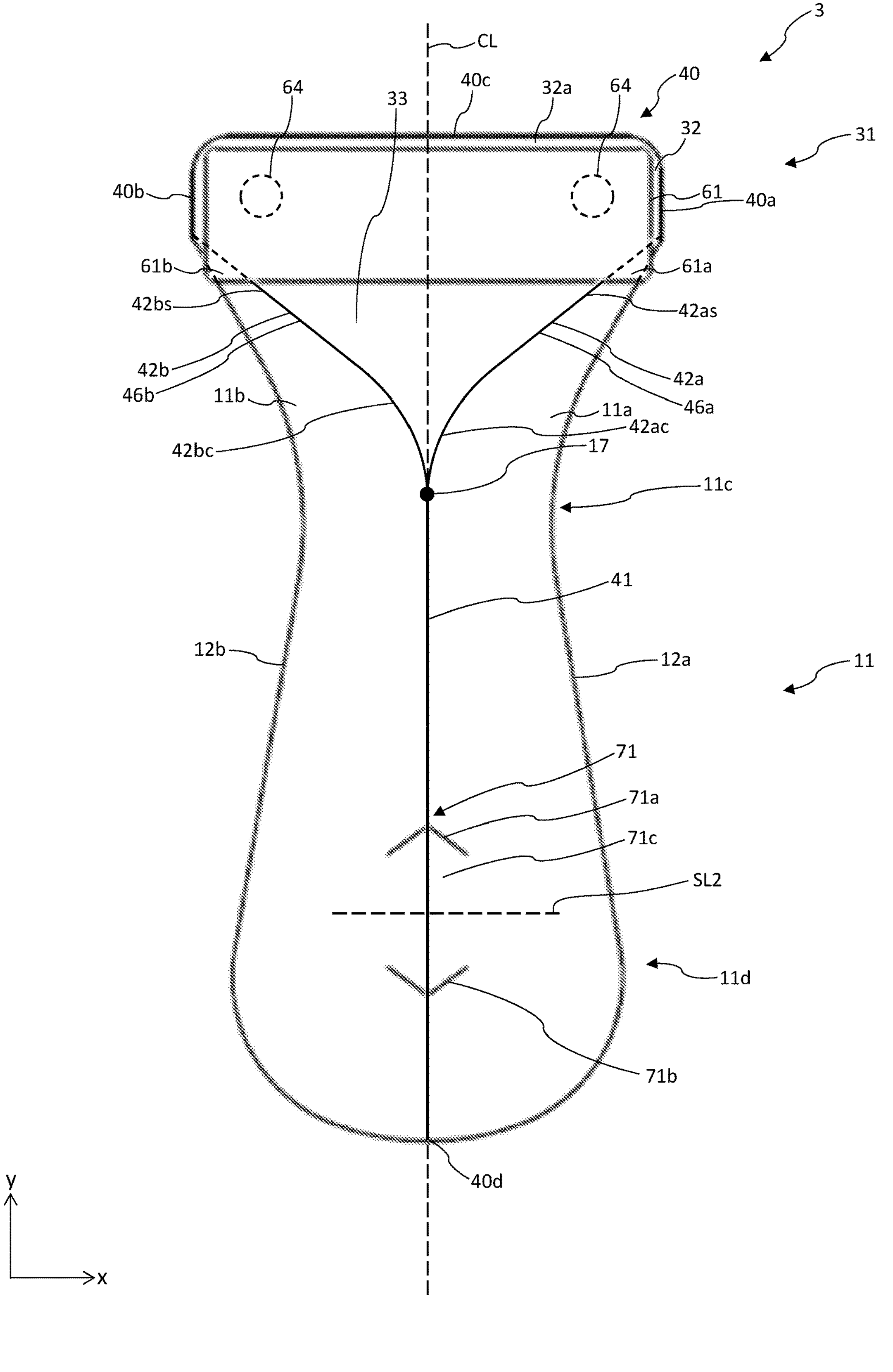
FIG. 13 is a plan view from a front side showing a razor at completion of manufacture according to a second modification of the embodiment.
Figure 14:
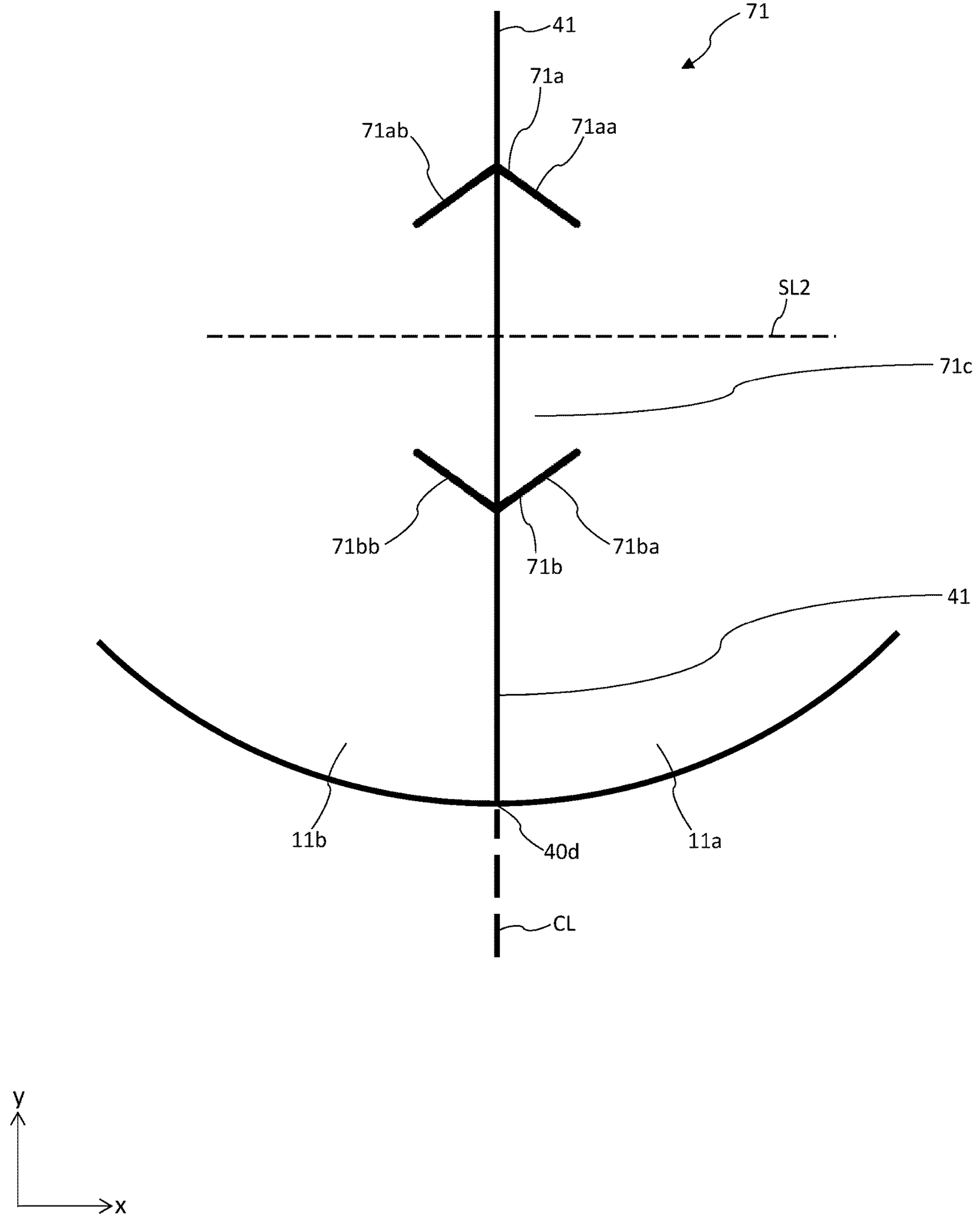
FIG. 14 is an enlarged view showing a cut portion and its vicinity of the razor shown in FIG. 13.

FIG. 13 is a plan view from a front side showing a razor at completion of manufacture according to a second modification of the embodiment. FIG. 14 is an enlarged view showing a cut portion and its vicinity of the razor shown in FIG. 13. As shown in FIGS. 13 and 14, in comparison to the razor 1 shown in FIG. 1, a razor 3 according to the second modification of the embodiment has a different outer shape of the holding part 11 including a cut portion 71 provided instead of the folding parts 14*a* and 14*b*, the insertion part 51, and the insertion hole part 52. As a result of the absence of the folding parts 14*a* and 14*b*, the razor 3 as a finished good shown in FIG. 13 is formed by connecting the body 40 and the razor head 61 to each other. This configuration without the folding parts 14*a* and 14*b* reduces folding process to achieve simplified manufacture, allowing reduction in manufacturing cost for the razor 3. Furthermore, the amount of use of paper can be reduced to allow reduction in material cost for manufacturing the razor 3.

The holding part 11 of the razor 3 is formed into an outer shape loosely curved on a lower side entirely. This configuration can lessen a stimulus to be applied to a hand of a user when the lower side of the holding part 11 abuts on the hand of the user. This makes it possible to reduce the likelihood that the user using the razor 3 will experience a feel of discomfort.

<Configuration of Cut Portion 71>

In this embodiment, the cut portion 71 is formed to be bilaterally symmetrical with respect to the center line CL and to be vertically symmetrical with respect to the line of symmetry SL parallel to the x axis.

As shown in FIG. 14, the cut portion 71 has a configuration including a cut 71*a* and a cut 71*b*. The cut 71*a* is bilaterally symmetrical with respect to the center line CL, has a shape projecting upward, and has a configuration including an upper right portion 71*aa* and an upper left portion 71*ab*. The upper right portion 71*aa* is a cut formed at the holding part 11*a* and extending downward and rightward from one point on the center line CL in a plan view of the planar body 40 from a front side. The upper left portion 71*ab* is a cut formed at the holding part 11*b* and bilaterally symmetrical to the upper right portion 71*aa* with respect to the center line CL.

The cut 71*b* is bilaterally symmetrical with respect to the center line CL, has a shape vertically symmetrical to the cut 71*a* with respect to a line of symmetry SL2, and has a configuration including a lower right portion 71*ba* and a lower left portion 71*bb*. The lower right portion 71*ba* is a cut formed at the holding part 11*a* and vertically symmetrical to the upper right portion 71*aa* with respect to the line of symmetry SL2. The lower left portion 71*bb* is a cut formed at the holding part 11*b* and bilaterally symmetrical to the lower right portion 71*ba* with respect to the center line CL.

A region on the lower side of the cut 71*a* and on the upper side of the cut 71*b* is defined as a small piece part 71*c*.

<After Assembly>

Figure 15:
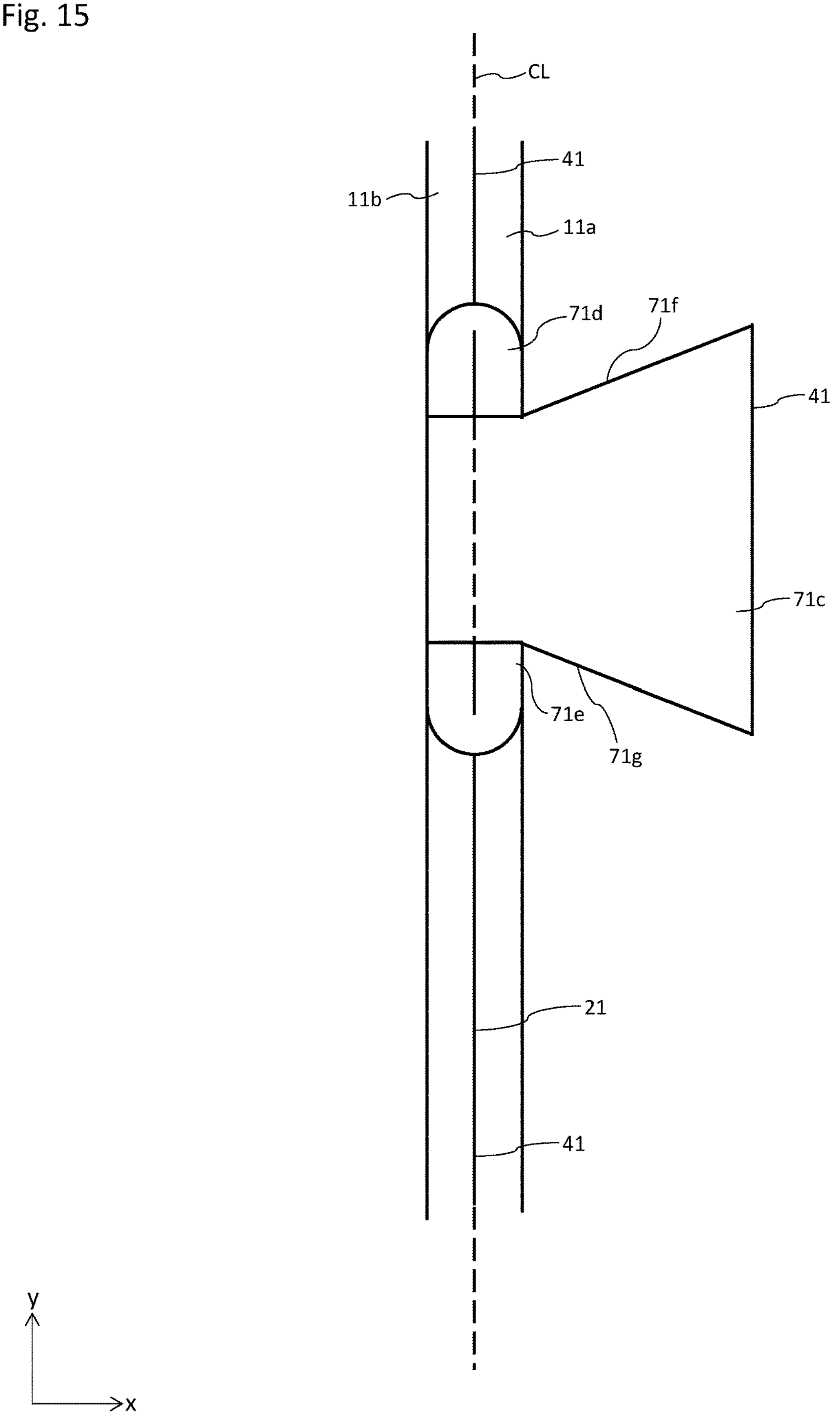
FIG. 15 is an enlarged view from a back side showing the cut portion and its vicinity in a state where a small piece part is folded to the right according to the second modification of the embodiment.

The cuts 71*a* and 71*b* are formed in such a manner as to approach each other while extending from the back part 21 toward the belly parts 22*a* and 22*b* in a state after assembly of the razor 3. FIG. 15 is an enlarged view from a back side showing the cut portion and its vicinity in a state where the small piece part is folded to the right according to the second modification of the embodiment. As shown in FIG. 15, in a state after assembly of the razor 3, for example, a user grasps the small piece part 71*c* with a hand and folds the small piece part 71*c* to the right. In folding the small piece part 71*c*, the cuts 71*a* and 71*b* are cleaved to form a body upper end 71*d* as a cutting end resulting from the cut 71*a* and a body lower end 71*e* as a cutting end resulting from the cut 71*b* at the holding part 11. At the same time, a small piece upper end 71*f* as a cutting end resulting from the cut 71*a* and a small piece lower end 71*g* as a cutting end resulting from the cut 71*b* are formed at the small piece part 71*c*.

When the user releases the hand from the small piece part 71*c*, the small piece part 71*c* is retained in a folded state. In this state, even if the holding part 11 folded along the center fold 41 tries to restore its planar shape in response to elasticity of paper or external force, for example, physical interference is generated between the body upper end 71*d* and the small piece upper end 71*f* and between the body lower end 71*e* and the small piece lower end 71*g*. This inhibits the folded holding part 11 from restoring its planar shape to fix the holding part 11 in a state of being folded along the center fold 41.

While the razor 3 of the second modification described above is configured not to include the folding parts 14*a* and 14*b*, the razor 3 may be configured to include the folding parts 14*a* and 14*b*. In this case, the folding parts 14*a* and 14*b* may be configured not to include the cut-out portions 15*a* and 15*b*.

<(3) Third Modification>

Figure 16:
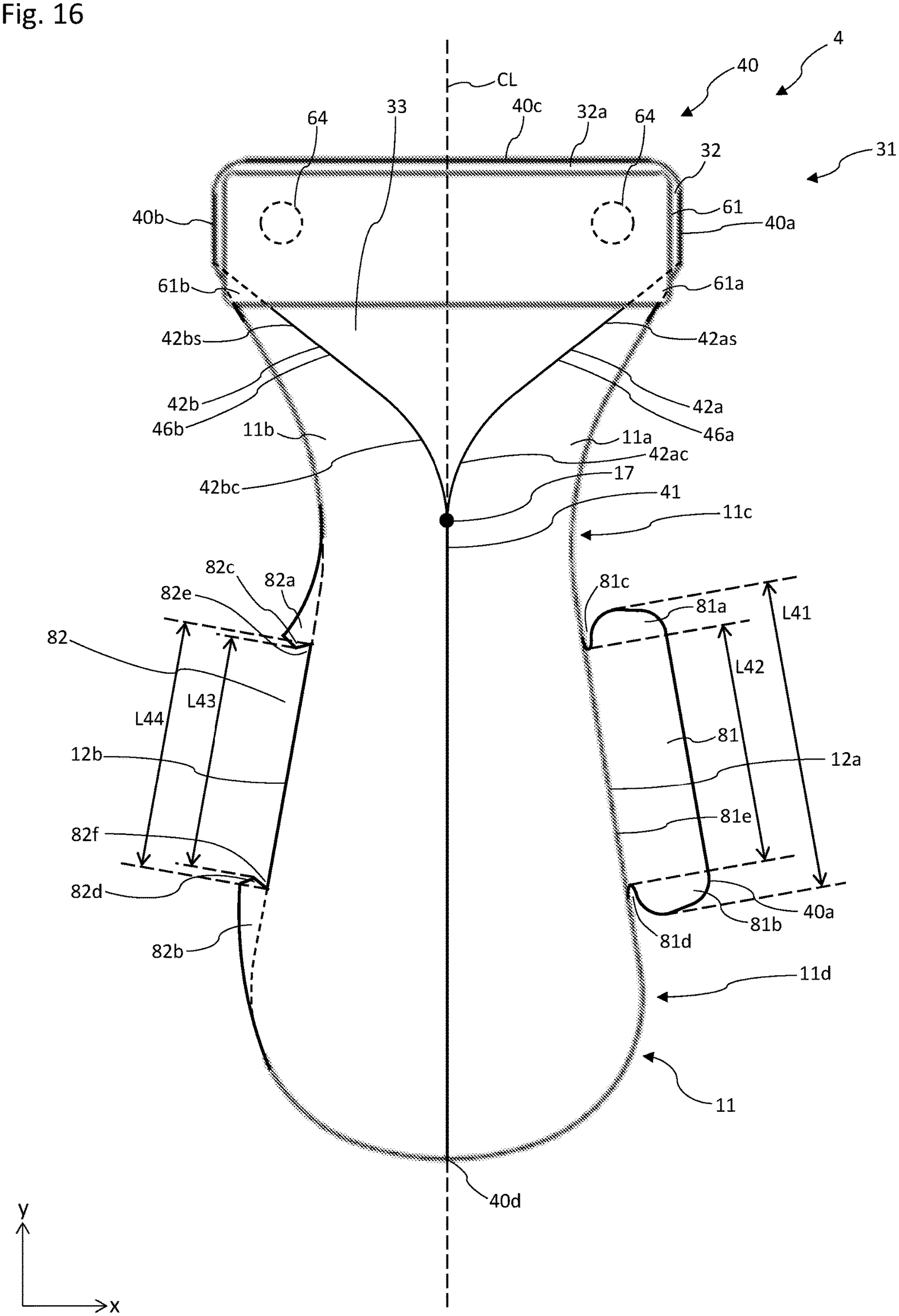
FIG. 16 is a plan view from a front side showing a razor at completion of manufacture according to a third modification of the embodiment.

FIG. 16 is a plan view from a front side showing a razor at completion of manufacture according to a third modification of the embodiment. As shown in FIG. 16, in comparison to the razor 1 shown in FIG. 1, a razor 4 according to the third modification of the embodiment has a different outer shape of the holding part 11 including a right projection 81, an upper left projection 82*a*, and a lower left projection 82*b* instead of the folding parts 14*a* and 14*b*, the insertion part 51, and the insertion hole part 52. As a result of the absence of the folding parts 14*a* and 14*b*, the razor 4 as a finished good shown in FIG. 16 is formed by connecting the body 40 and the razor head 61 to each other. This configuration without the folding parts 14*a* and 14*b* reduces folding process to achieve simplified manufacture, allowing reduction in manufacturing cost for the razor 4. Furthermore, the amount of use of paper can be reduced to allow reduction in material cost for manufacturing the razor 4.

The holding part 11 of the razor 4 is formed into an outer shape loosely curved on a lower side entirely. This configuration can lessen a stimulus to be applied to a hand of a user when the lower side of the holding part 11 abuts on the hand of the user. This makes it possible to reduce the likelihood that the user using the razor 4 will experience a feel of discomfort.

<Configuration of Right Projection 81>

The right projection 81 is formed to project outward from the edge portion 12*a* of the holding part 11. In the embodiment, the right projection 81 extends substantially parallel to the xy plane and is formed integrally with the body 40. More specifically, in a plan view of the planar body 40 from a front side, the right projection 81 has a shape extending rightward from the edge portion 12*a* while forming an upper convex part 81*a* and a lower convex part 81*b*.

The upper convex part 81*a* is located at an upper position of the right projection 81 and has a shape projecting upward. The lower convex part 81*b* is located at a lower position of the right projection 81 and has a shape projecting downward. An upper recess 81*c* having a shape recessed downward is formed between the upper convex part 81*a* and the holding part 11*a*. A lower recess 81*d* having a shape recessed upward is formed between the lower convex part 81*b* and the holding part 11*a*. A fold 81*e* between recesses is formed along the edge portion 12*a* and between the upper recess 81*c* and the lower recess 81*d*.

<Configurations of Upper Left Projection 82*a* and Lower Left Projection 82*b*>

The upper left projection 82*a* and the lower left projection 82*b* extend substantially parallel to the xy plane and are formed integrally with the body 40. A cut-out portion 82 is formed between the upper left projection 82*a* and the lower left projection 82*b*.

More specifically, in a plan view of the planar body 40 from a front side, the upper left projection 82*a* has a shape extending leftward from the edge portion 12*b* while forming an upper convex part 82*c*. The upper convex part 82*c* is located on the lower side of the upper left projection 82*a* and has a shape projecting downward. An upper recess 82*e* recessed upward is formed between the upper convex part 82*c* and the holding part 11*b*.

In a plan view of the planar body 40 from a front side, the lower left projection 82*b* has a shape extending leftward from the edge portion 12*b* while forming a lower convex part 82*d*. The lower convex part 82*d* is located on the upper side of the lower left projection 82*b* and has a shape projecting upward. A lower recess 82*f* recessed downward is formed between the lower convex part 82*d* and the holding part 11*b*.

A length between the upper end of the upper convex part 81*a* and the lower end of the lower convex part 81*b* of the right projection 81 is defined as a length L41 between convex parts. A length between the lower end of the upper recess 81*c* and the upper end of the lower recess 81*d* is defined as a length L42 between recesses.

A length between the lower end of the upper convex part 82*c* and the upper end of the lower convex part 82*d* at the cut-out portion 82 (hereinafter may be called a length L43 between convex parts) is slightly greater than the length L42 between recesses and less than the length L41 between convex parts. A length between the upper end of the upper recess 82*e* and the lower end of the lower recess 82*f* (hereinafter may be called a length L44 between recesses) is greater than the length L43 between convex parts and less than the length L41 between convex parts.

<After Assembly>

Figure 17:
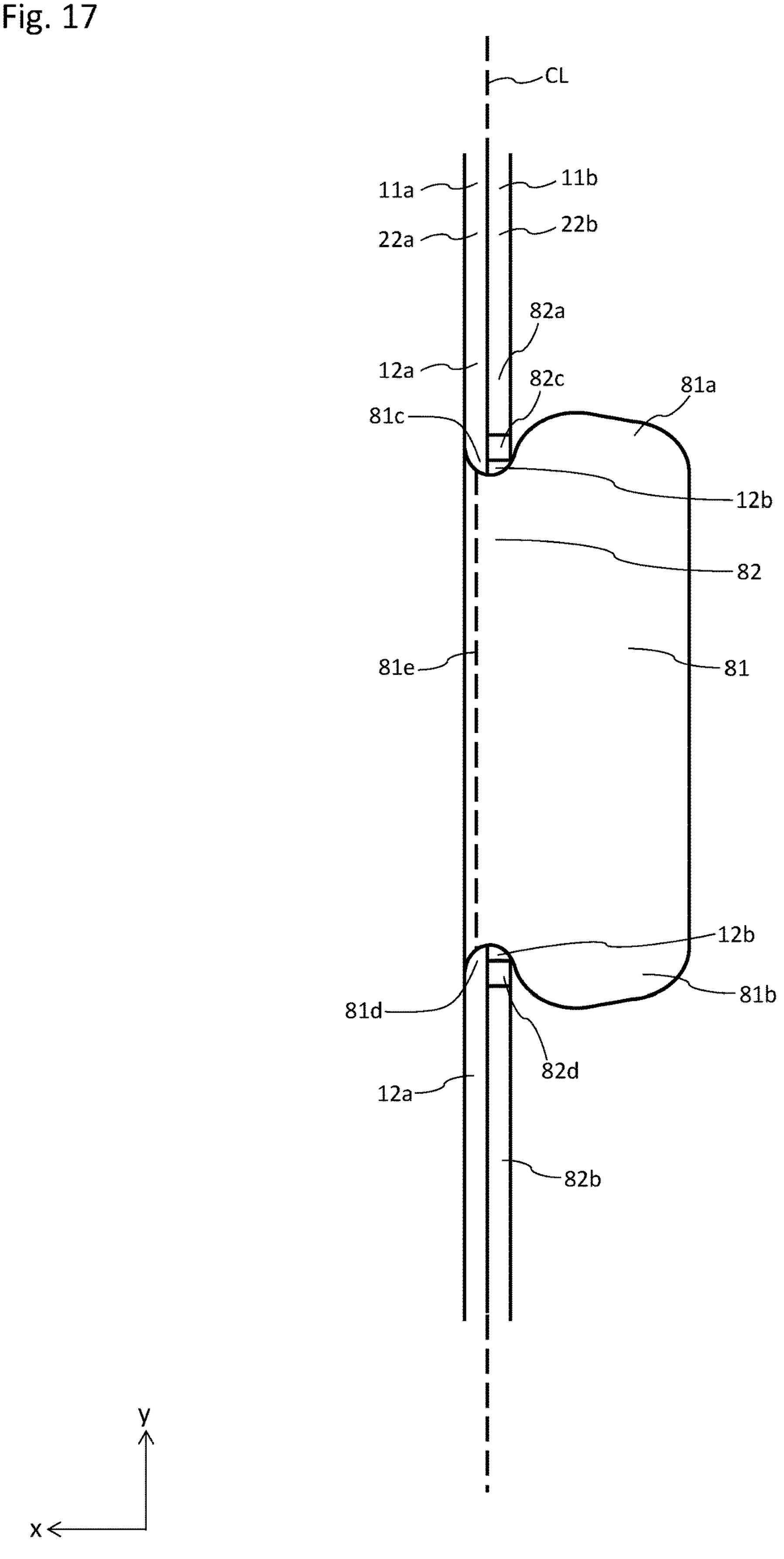
FIG. 17 is an enlarged view from a belly side showing a right projection and its vicinity in a state where the right projection is fitted to a cut-out portion according to the third modification of the embodiment.

In a state after assembly, the right projection 81 is inserted into and fitted to the cut-out portion 82 to fix the holding part 11 in a state of being folded along the center fold 41. FIG. 17 is an enlarged view from the belly side showing the right projection 81 and its vicinity in a state where the right projection 81 is fitted to the cut-out portion 82 according to the third modification of the embodiment. As shown in FIGS. 16 and 17, in a state after assembly of the razor 4, for example, a user folds the right projection 81 to the x axis-side along the fold 81*e* between recesses. In a state where the right projection 81 is folded, the upper recess 81*c* and the lower recess 81*d* of the right projection 81 are located between the upper left projection 82*a* and the lower left projection 82*b* of the cut-out portion 82 (more specifically, between the upper recess 82*e* and the lower recess 82*f* not shown in FIG. 17).

When the user releases a hand from the right projection 81, the right projection 81 is retained in a folded state. In this state, even if the holding part 11 folded along the center fold 41 tries to restore its planar shape in response to elasticity of paper or external force, for example, physical interference is generated between the upper convex part 81*a* of the right projection 81 and the holding part 11*b* and between the lower convex part 81*b* of the right projection 81 and the holding part 11*b*. This inhibits the folded holding part 11 from restoring its planar shape to fix the holding part 11 in a state of being folded along the center fold 41.

As described above, the right projection 81 can be fitted to the cut-out portion 82 by the simple operation of folding the right projection 81. This allows the holding part 11 to be fixed simply in a state of being folded along the center fold 41, compared to the configuration of the embodiment and those of the first modification and the second modification.

While the razor 4 according to the third modification of the embodiment described above is configured not to include the folding parts 14*a* and 14*b*, the razor 4 may be configured to include the folding parts 14*a* and 14*b*. In this case, the folding parts 14*a* and 14*b* may be configured not to include the cut-out portions 15*a* and 15*b*.

The razor 4 according to the third modification of the embodiment described above has a configuration where the right projection 81 projects outward from the edge portion 12*a* and the cut-out portion 82 is formed at the edge portion 12*b*. Alternatively, the razor 4 may have a configuration where the right projection 81 projects outward from the edge portion 12*b* and the cut-out portion 82 is formed at the edge portion 12*a*.

<(4) Fourth Modification>

Figure 18:
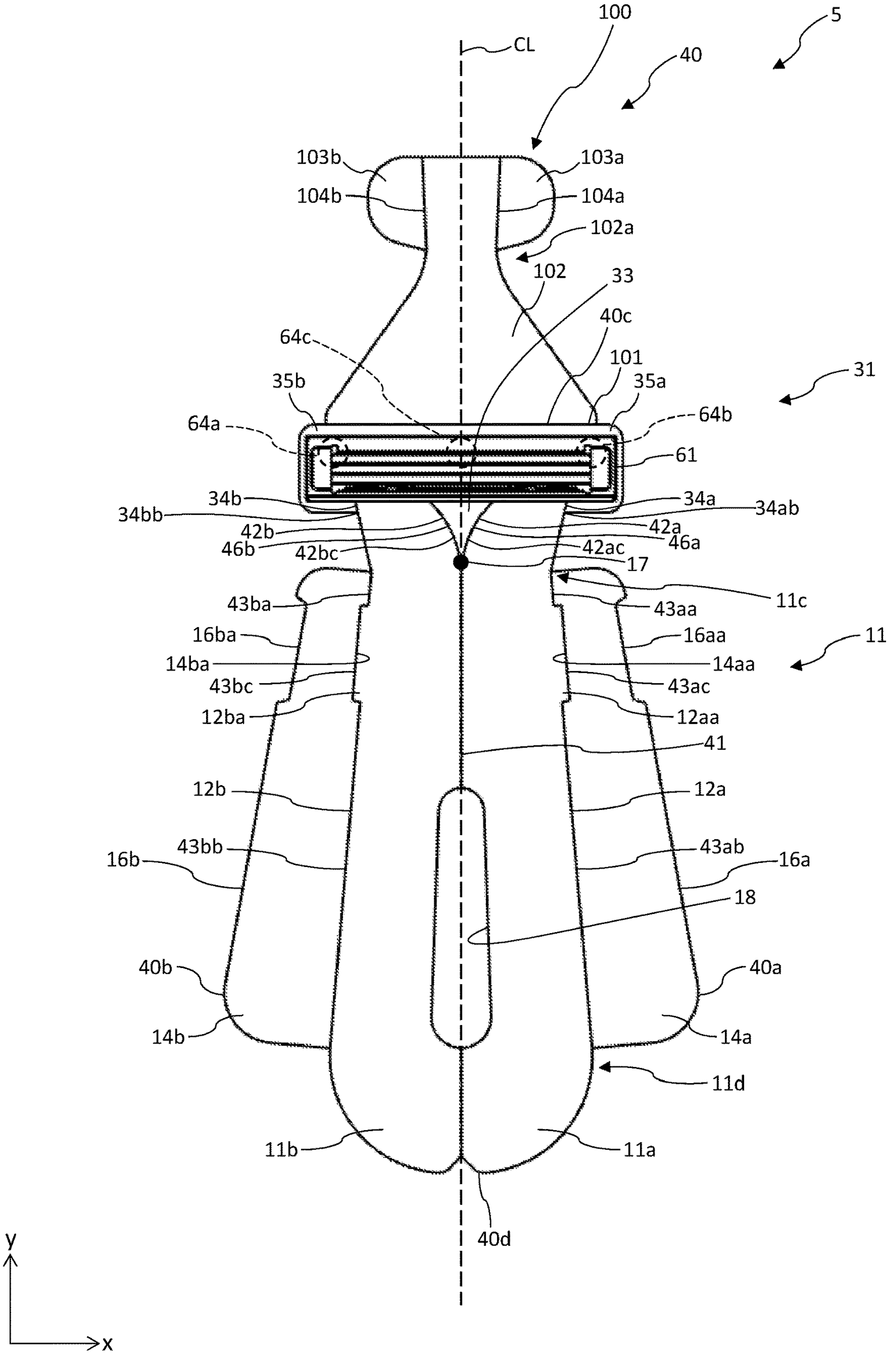
FIG. 18 is a plan view from a front side showing a razor according to a fourth modification of the embodiment.
Figure 19:
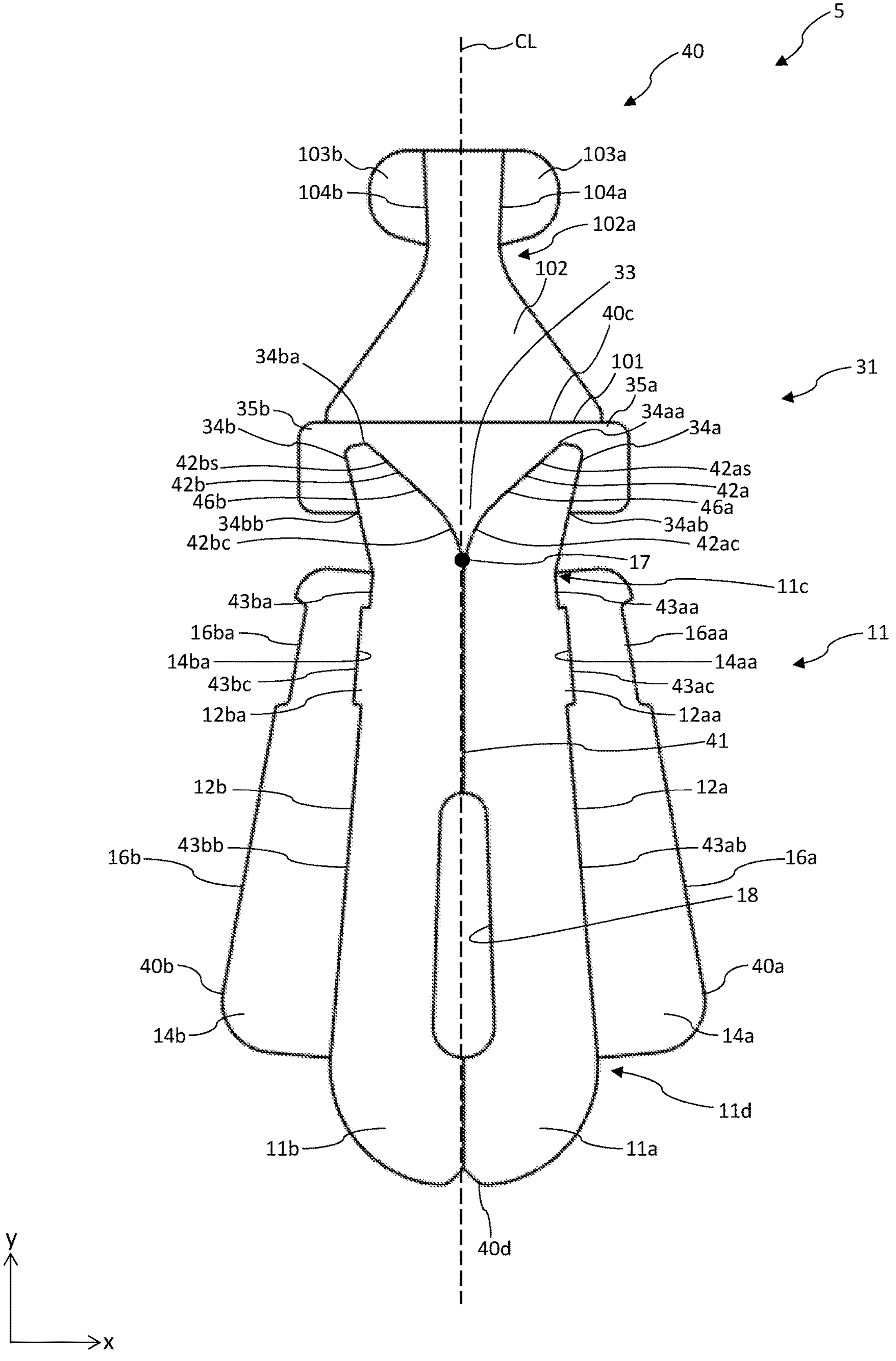
FIG. 19 is a plan view from a front side showing the razor in a state where a razor head is detached according to the fourth modification of the embodiment.
Figure 20:
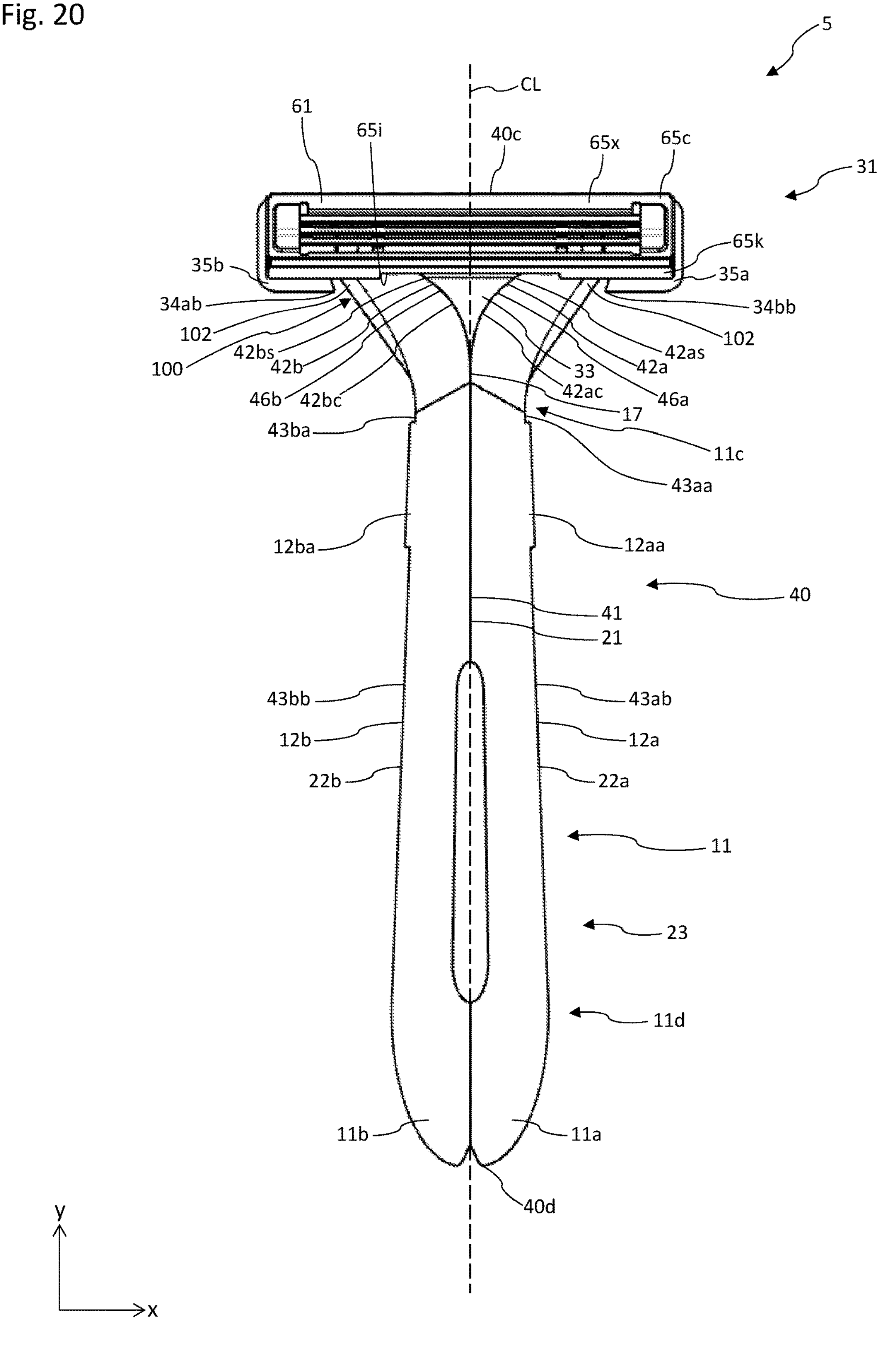
FIG. 20 is a plan view from a front side showing the razor in a state after assembly according to the fourth modification of the embodiment.
Figure 21:
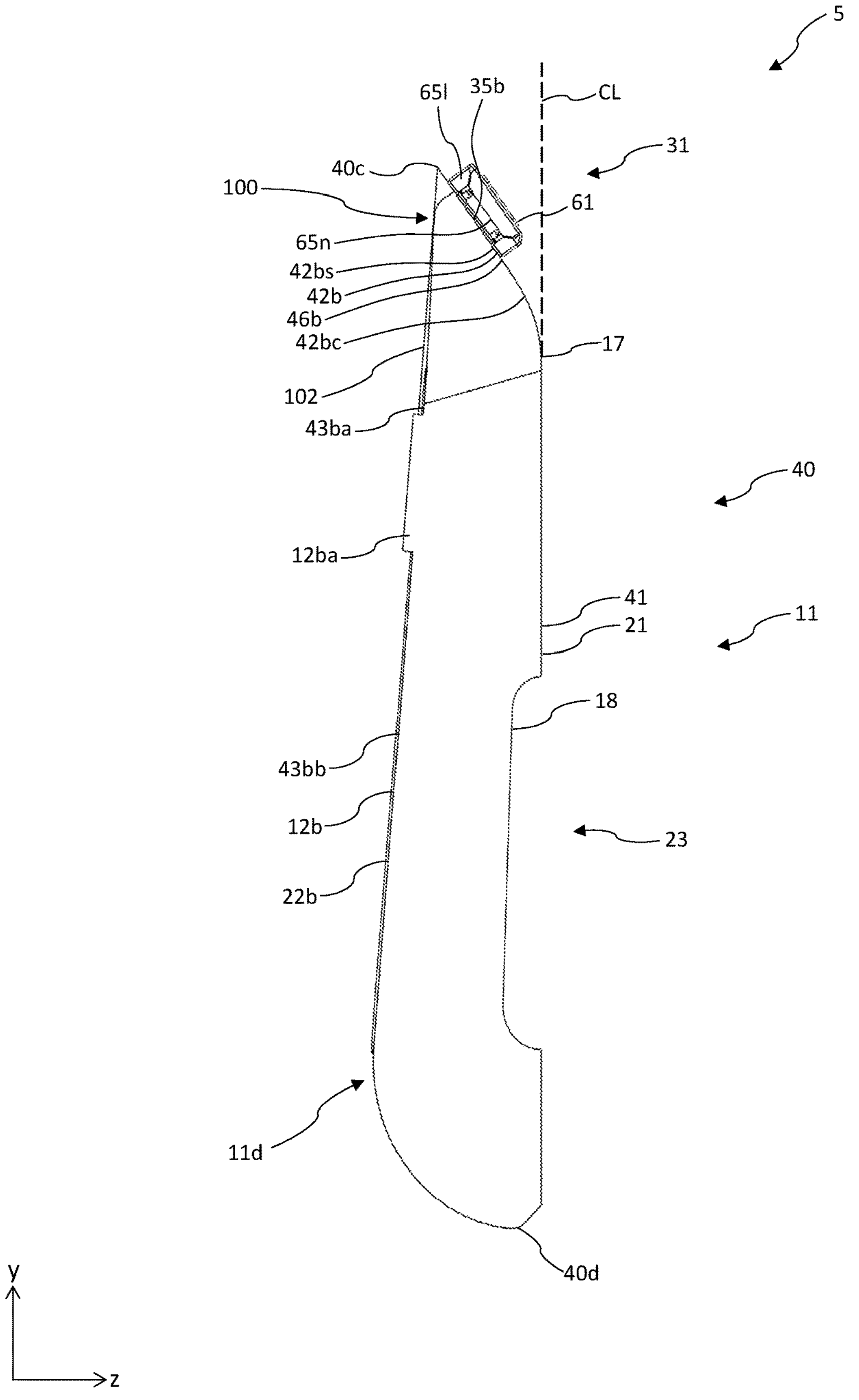
FIG. 21 is a plan view from the width direction showing the razor in a state after assembly according to the fourth modification of the embodiment.
Figure 22:
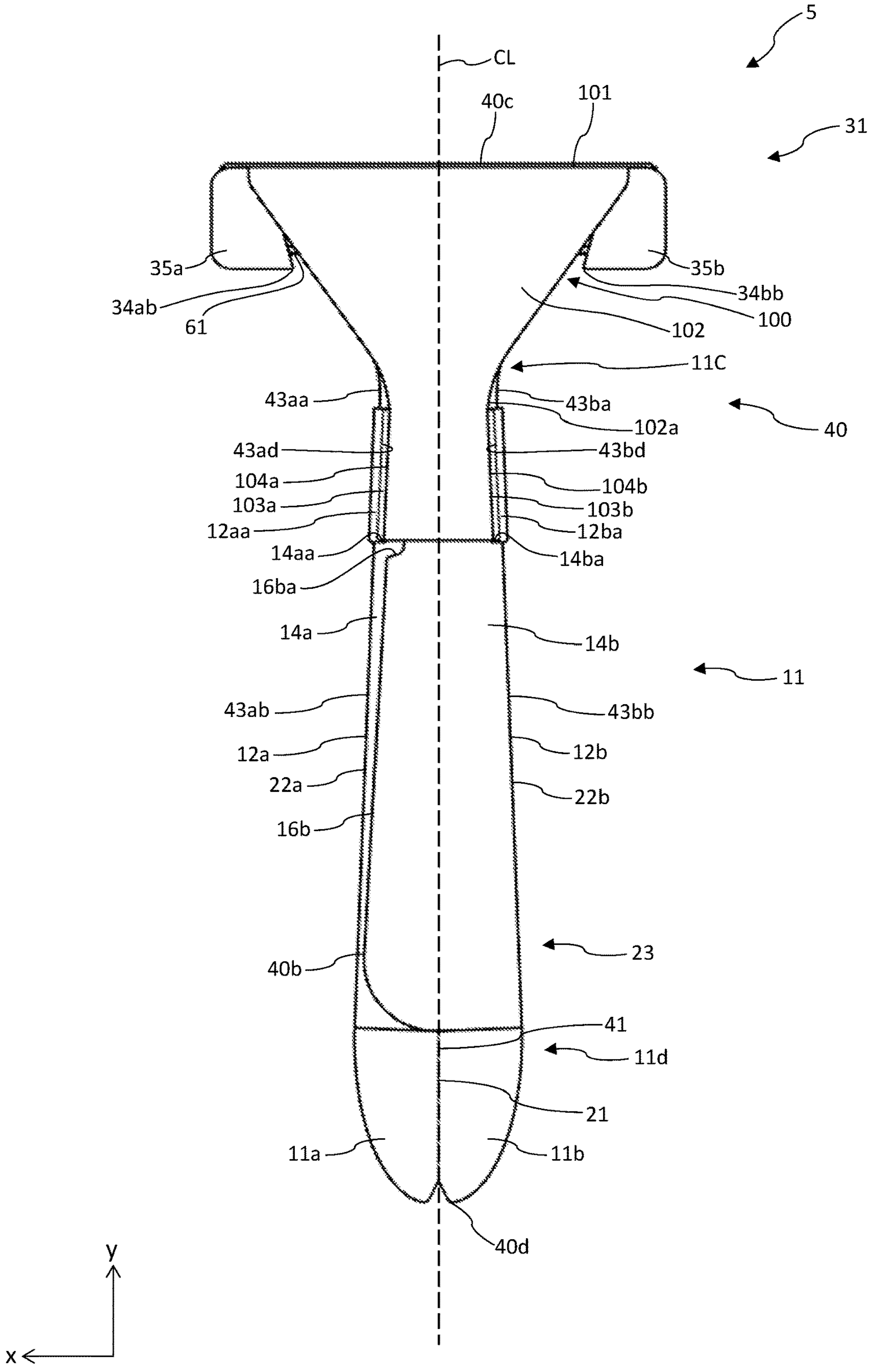
FIG. 22 is a plan view from a back side showing the razor in a state after assembly according to the fourth modification of the embodiment.
Figure 23:
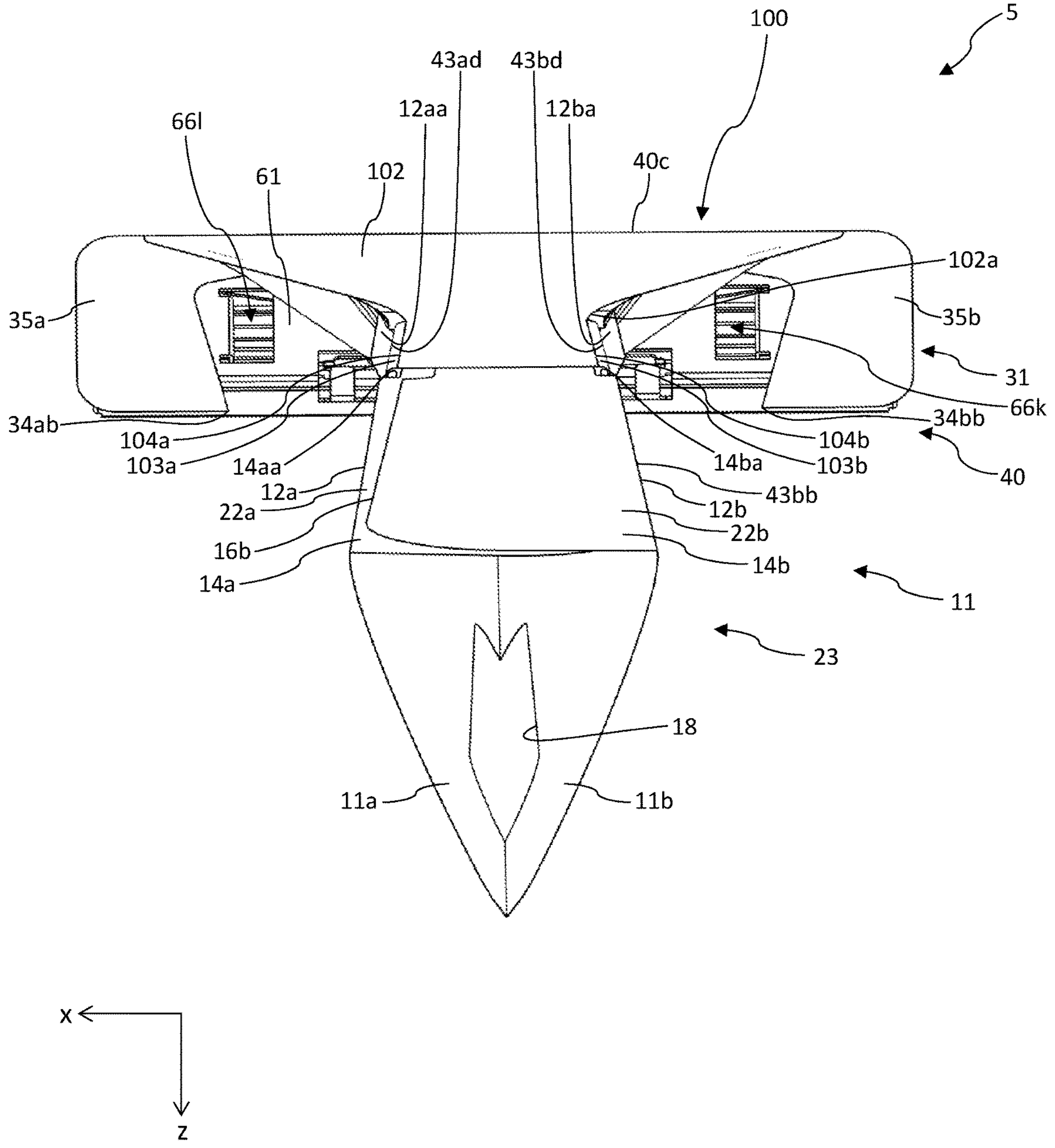
FIG. 23 is a plan view from below showing the razor in a state after assembly according to the fourth modification of the embodiment.
Figure 24:
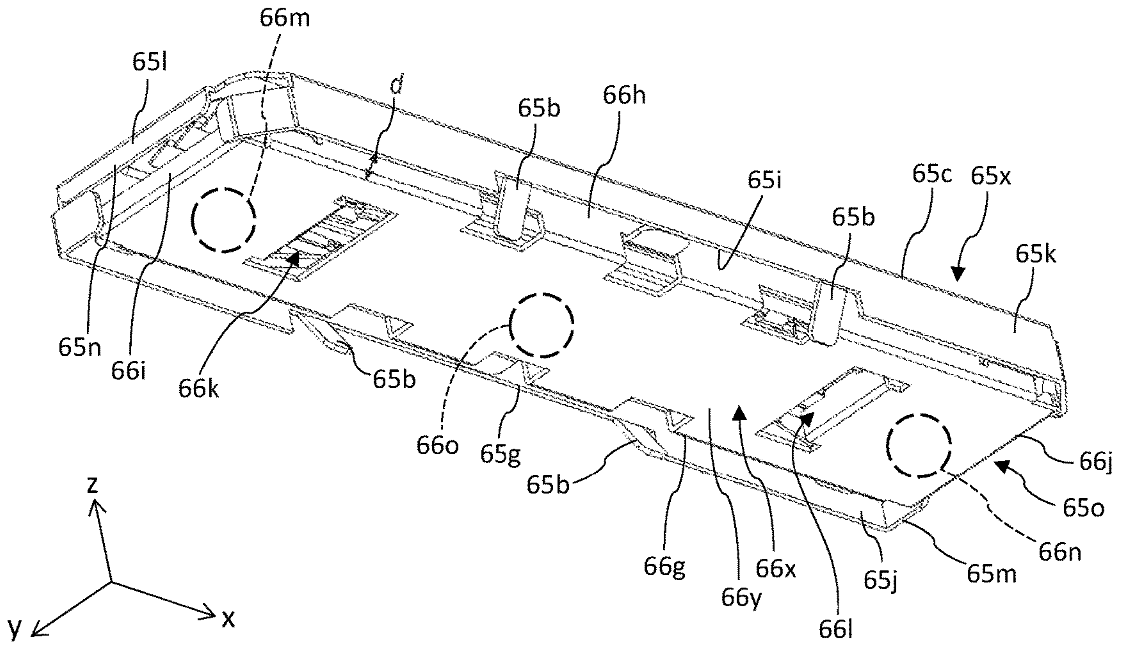
FIG. 24 is a perspective view showing the razor head according to the fourth modification of the embodiment.

FIG. 18 is a plan view from a front side showing a razor according to a fourth modification of the embodiment. FIG. 19 is a plan view from a front side showing the razor in a state where a razor head is detached according to the fourth modification of the embodiment. FIG. 20 is a plan view from a front side showing the razor in a state after assembly according to the fourth modification of the embodiment. FIG. 21 is a plan view from the width direction showing the razor in a state after assembly according to the fourth modification of the embodiment. FIG. 22 is a plan view from a back side showing the razor in a state after assembly according to the fourth modification of the embodiment. FIG. 23 is a plan view from below showing the razor in a state after assembly according to the fourth modification of the embodiment. FIG. 24 is a perspective view showing the razor head according to the fourth modification of the embodiment.

As shown in FIGS. 18 to 24, a razor 5 according to the fourth modification of the embodiment differs from the razor 1 in that a holding part and a folding part form a tube in an assembled state, and the section of this tube viewed from the y axis direction is substantially triangular. The razor head 61 has a configuration differing from that of the razor 1.

The body 40 of the razor 5 has a configuration further including a head fixing part 100. The head fixing part 100 has a configuration including a back lid 102, and a mating part 103*a* and a mating part 103*b*. The head fixing part 100 is provided on the opposite side of the holding part 11 relative to the head supporting part 31.

More specifically, the back lid 102 of the head fixing part 100 is connected to an upper side of the head supporting part 31 and has an outer shape bilaterally symmetrical with respect to the center line CL. In a plan view of the back lid 102 from a front side, the back lid 102 extends downward to a constriction 102*c* while reducing slightly in the width in the width direction, and then extends downward while increasing the width largely in the width direction to be connected to the upper side of the head supporting part 31.

Specifically, the back lid 102 has a shape slightly constricted at the constriction 102*c*. A fold 101 extending in the width direction is formed at a boundary between the back lid 102 and the head supporting part 31.

The mating parts 103*a* and 103*b* are mated with the holding part 11 and the folding parts 14*a* and 14*b* when the head fixing part 100 is folded along the fold 101. More specifically, the mating part 103*a* has a shape projecting rightward from the right edge of the back lid 102 on the upper side of the constriction 102*a* of the back lid 102. The mating part 103*a* and the back lid 102 are continuous with each other, and a fold 104*a* is formed at a boundary between the mating part 103*a* and the back lid 102.

The mating part 103*b* has a shape symmetrical to the mating part 103*a* with respect to the center line CL and has a shape projecting leftward from the left edge of the back lid 102 on the upper side of the constriction 102*a* of the back lid 102. The mating part 103*b* and the back lid 102 are continuous with each other and a fold 104*b* is formed at a boundary between the mating part 103*b* and the back lid 102.

At the holding part 11, a long hole part 18 having a shape bilaterally symmetrical with respect to the center line CL and a shape extending long in the longitudinal direction in a state before assembly is formed on the lower side of the vertex 17.

The holding part 11*a* includes a convex part 12*aa* that is a part of the edge portion 12*a* projecting in a direction of going away from the center line CL, namely, rightward. The convex part 12*aa* is located between an upper inversion fold 43*aa* and a lower inversion fold 43*ab*. The convex part 12*aa* has a length in the longitudinal direction that is greater than the length of the left end of the mating part 103*a* in the longitudinal direction, namely, the length of the fold 104*a* in the longitudinal direction. A distance between the convex part 12*aa* and the fold 101 is substantially the same as a distance between the fold 104*a* and the fold 101.

An upper edge, a right edge, and a lower edge of the convex part 12*aa* form a cut 43*ac*. When the holding part 11*a* and the folding part 14*a* are folded along the inversion folds 43*aa* and 43*ab*, the convex part 12*aa* cannot be folded for the presence of the cut 43*ac* while a recess 14*aa* is formed between the inversion fold 43*aa* and the inversion fold 43*ab* at the folding part 14*a*. A long hole 43*ad* having a shape extending long in the longitudinal direction is formed between the recess 14*aa* and the holding part 11*a* (see FIGS. 22 and 23).

The holding part 11*b* includes a convex part 12*ba* having a shape symmetrical to the convex part 12*aa* with respect to the center line CL. Specifically, the convex part 12*ba* projects in a direction of going away from the center line CL, namely, leftward. The convex part 12*ba* is located between an upper inversion fold 43*ba* and a lower inversion fold 43*bb*.

An upper edge, a left edge, and a lower edge of the convex part 12*ba* form a cut 43*bc*. When the holding part 11*b* and the folding part 14*b* are folded along the inversion folds 43*ba* and 43*bb*, the convex part 12*ba* cannot be folded for the presence of the cut 43*bc* while a recess 14*ba* is formed between the inversion fold 43*ba* and the inversion fold 43*bb* at the folding part 14*b*. A long hole 43*bd* having a shape extending long in the longitudinal direction is formed between the recess 14*ba* and the holding part 11*b* (see FIGS. 22 and 23).

The edge 16*a* of the folding part 14*a* is provided with a relief 16*aa* recessed in a direction of approaching the center line CL. The relief 16*aa* has a length in the longitudinal direction greater than the length of the convex part 12*ba* in the longitudinal direction. The relief 16*aa* has a length in the width direction greater than the length of the convex part 12*ba* in the width direction.

The relief 16*aa* is formed at a position allowing the relief 16*aa* to face the convex part 12*ba* in a state where the holding part 11*a* and the holding part 11*b* are folded along the center fold 41 and then the holding part 11*a* and the folding part 14*a* are folded further along the inversion folds 43*aa* and 43*ab*.

The edge 16*b* of the folding part 14*b* is provided with a relief 16*ba* having a shape symmetrical to the relief 16*aa* with respect to the center line CL.

The relief 16*ba* is formed at a position allowing the relief 16*ba* to face the convex part 12*aa* in a state where the holding part 11*a* and the holding part 11*b* are folded along the center fold 41 and then the holding part 11*b* and the folding part 14*b* are folded further along the inversion folds 43*ba* and 43*bb*.

The head supporting part 31 has a configuration including the triangle part 33, a right end supporting portion 35*a*, and a left end supporting portion 35*b* (mainly see FIGS. 18 and 19). The right end supporting portion 35*a* and the left end supporting portion 35*b* are an example of the "both end supporting portion" of the present invention that supports at least both ends of the razor head 61.

The triangle part 33 is located on the upper side of the connection folds 42*a* and 42*b*. The right end supporting portion 35*a* is provided in such a manner as to be continuous with a part of the triangle part 33 on the upper right side and to sandwich the upper side of the holding part 11*a* together with the triangle part 33. The left end supporting portion 35*b* is provided in such a manner as to be continuous with a part of the triangle part 33 on the upper left side and to sandwich the upper side of the holding part 11*b* together with the triangle part 33. The razor head 61 is adhered to three positions such as the right end supporting portion 35*a*, the left end supporting portion 35*b*, and the triangle part 33 to be fixed to the head supporting part 31. More specifically, as shown in FIG. 18, an adhesive 64*a*, an adhesive 64*b*, and an adhesive 64*c* are provided and the razor head 61 is adhered to the head supporting part 31 at these positions. Regions between the razor head 61 and the head supporting part 31 where these adhesives 64*a*, 64*b*, and 64*c* are arranged are adhesive regions, and a region other than the adhesive regions is an adhesion prohibited region. Specifically, as shown in FIG. 24, an adhesive region 66*m*, an adhesive region 66*n*, and an adhesive region 66*o* are provided at a rear case 66*x* of the frame body forming the razor head 61.

The adhesive regions 66*m*, 66*n*, and 66*o* are each provided at a position closer to an upper end of the razor head 61, not at a central position in the y axis direction. This achieves a configuration where, when a user applies force to the cut-out portion 65*i* with the intention of removing the razor head 61 from the head supporting part 31, the force acting for the removal is transmitted easily. The adhesion prohibited region is provided as a given region other than the adhesive regions 66*m*, 66*n*, and 66*o* such as a region of not smaller than 0.5 mm and not larger than 1 mm, for example, from a periphery portion of the rear case 66*x* forming the frame body. Providing this adhesion prohibited region prevents the periphery portion of the razor head 61 from being adhered to the head supporting part 31, thereby achieving a configuration of facilitating removal of the razor head from the head supporting part. In this modification, the razor head 61 is fixed to the head supporting part 31 so as to prevent a part of the razor head 61 closer to the holding part 11 from projecting from the head supporting part 31 toward the holding part 11. The adhesion prohibited region may be a region of not smaller than 0.5 mm and not larger than 3 mm from the periphery portion of a rear case 66x.

An L-shaped cut 34a is formed at a boundary between the holding part 11a and the right end supporting portion 35a. The cut 34a extends downward and rightward from a position 34aa at the upper end of the connection fold 42a, and then extends downward and leftward to a position 34ab.

A cut 34b having a shape symmetrical to the cut 34a with respect to the center line CL is formed at a boundary between the holding part 11b and the left end supporting portion 35b. The cut 34b extends downward and leftward from a position 34ba at the upper end of the connection fold 42b, and then extends downward and rightward to a position 34bb.

As shown in FIG. 24, while the razor head 61 is similar to the razor head 61 of the embodiment, it has a configuration differing mainly in the following points.

As shown in FIG. 24, the razor head 61 includes the frame body formed of a front case 65x and the rear case 66x. Like in the embodiment, the blade body 62 is housed in internal space of the frame body and exposed at an opening portion 65a of the front case 65x. The front case 65 has a configuration including a main plate 65c, a long-side plate 65j, a long-side plate 65k, a short-side plate 65l, and a short-side plate 65m. The long-side plates 65j and 65k are plates extending backward in the z axis direction (thickness direction) from the upper end and the lower end of the main plate 65c respectively. Each of the long-side plates 65j and 65k includes two projections 65b projecting from back-side ends. The short-side plates 65l and 65m are plates extending backward from the left end and the right end of the main plate 65c respectively.

Like in the embodiment, the long-side plates 65j and 65k are provided with a cut-out portion 65h and a cut-out portion 65i respectively (see FIGS. 20 and 24 to 26). The cut-out portions 65h and 65i are formed at positions including central positions of the long-side plates 65j and 65k in the x axis direction (long-axis direction) respectively, have fixed lengths in the x axis direction, and are formed in such a manner as to extend frontward from the back side. The head supporting part 31 does not position at least at a part of a position facing each of the cut-out portions 65h and 65i. This causes a user to touch the cut-out portion 65h or 65i easily in removing the razor head from the head supporting part. These cut-out portions 65h and 65i have the function of causing body hairs cut by the blade body 62 to pass to reduce the likelihood that such body hairs will remain in the razor head 61. The cut-out portions 65h and 65i each include a force point portion as a force point on which a user hooks a finger, a nail, or a jig for removing the razor head 61 from the head supporting part 31. Specifically, each of the cut-out portions 65h and 65i has both the function of facilitating recycling through sorted disposal and the function of allowing a razor to be used cleanly and comfortably by preventing cut body hairs from remaining in the razor head 61.

The short-side plates 65l and 65m are provided with a cut-out portion 65n and a cut-out portion 65o respectively (see FIGS. 24 and 21). The cut-out portions 65n and 65o are formed at positions including central positions of the short-side plates 65l and 65m in the y axis direction (long-axis direction) respectively, have fixed lengths in the y axis direction, and are formed in such a manner as to extend frontward from the back side. Like the cut-out portions 65h and 65i at the long-side plates 65j and 65k, these cut-out portions 65n and 65o each have the function of causing cut body hairs to pass and a function as a force point to act in removing the razor head 61 from the head supporting part 31.

The rear case 66x has a configuration including a bottom plate 66y, a long-side plate 66g and a long-side plate 66h, and a short-side plate 66i and a short-side plat 66j. While the bottom plate 66y has a similar shape to the bottom plate 66d of the embodiment, it includes two opening portions 66k and 661 instead of the opening portion 66c of the embodiment. As shown in FIG. 23, the opening portions 66k and 661 are provided on a surface on the back side facing the head supporting part 31 and at positions on the surface not faced by the head supporting part 31. This prevents the opening portions 66k and 661 from being blocked with the head supporting part 31 to cause cut body hairs to pass easily through the opening portions 66k and 66l. This reduces the likelihood that cut body hairs will remain in the razor head 61 to allow the razor 5 to be used cleanly and comfortably.

The lower long-side plate 66h of the rear case 66x has a distance of not smaller than 0.5 mm and not larger than 1 mm from the lower long-side plate 65k of the front case 65x. This realizes a configuration that causes a user to touch the cut-out portion 65i easily in removing the razor head 61 from the head supporting part 31. The upper long-side plate 66g of the rear case 66x may have a distance of not smaller than 0.5 mm and not larger than 1 mm from the upper long-side plate 65j of the front case 65x. This configuration causes the user to touch the cut-out portion 65h easily in removing the razor head 61 from the head supporting part 31. A distance d from each of the long-side plates 66h and 66g of the rear case 66x to a corresponding one of the long-side plates 65k and 65j of the front case 65x may be not smaller than 0.5 mm and not larger than 3 mm.

Only one of the cut-out portions 65h and 65i may be provided. Such a configuration still allows cut body hairs to pass and facilitates removal of the razor head 61 from the head supporting part 31. In particular, in this case, a configuration with the cut-out portion 65i is preferable as it provides higher convenience to a user. However, a configuration with both the cut-out portions 65h and 65i is preferable in terms of causing cut body hairs to pass more effectively. If only one of the cut-out portions 65h and 65i is provided, a distance from each of the long-side plates 66h and 66g of the rear case 66x to a corresponding one of the long-side plates 65k and 65j of the front case 65x is preferably defined in an area where the cut-out portion 65h or 65i is provided.

Like in the embodiment, in one configuration, a user may apply force to the cut-out portion 65h in removing the razor head 61 from the head supporting part 31. In this case, the adhesive region may be provided at a position closer to the lower end of the razor head 61, not to the upper end. In a configuration where the razor head 61 includes both the cut-out portions 65h and 65i, the adhesive region may be provided at a position closer to either the upper end or the lower end.

<Assembly>

An exemplary method of assembling the razor 5 will be described. In assembly of the razor 5, a user folds the holding part 11a and the folding part 14a along the inversion folds 43aa and 43ab and folds the holding part 11b and the folding part 14b along the inversion fold 43ba and 43bb in such a manner that the front side becomes convex (first folding step). As described above, the long holes 43ad and 43bd are formed as a result of the first folding step.

Next, the user folds the holding parts 11*a* and 11*b* along the center fold 41 and the connection folds 42*a* and 42*b* in such a manner that the front side becomes convex (second folding step).

In the second folding step, for the presence of the cuts 34*a* and 34*b*, the holding part 11*a* is folded in such a manner as to be separated backward from a surface defined by the right end supporting portion 35*a*, the triangle part 33, and the left end supporting portion 35*b*. Like the holding part 11*a*, the holding part 11*b* is also folded in such a manner as to be separated backward from this surface.

While the folding part 14*b* is on the back side of the folding part 14*a* in FIGS. 22 and 23, the folding part 14*a* may be located on the back side of the folding part 14*b*. The presence of the relief 16*ba* at the folding part 14*b* prevents the long hole 43*ad* from being blocked with the folding part 14*b*. Likewise, the presence of the relief 16*aa* at the folding part 14*a* prevents the long hole 43*bd* from being blocked with the folding part 14*a*.

Next, the user folds the mating part 103*a* backward along the fold 104*a* and folds the mating part 103*b* backward along the fold 104*b* (third folding step).

Next, the user folds the back lid 102 backward along the fold 101. Then, the mating parts 103*a* and 103*b* are mated with the long holes 43*ad* and 43*bd* respectively formed in the first folding step to fit the head fixing part 100 and the holding part 11 to each other (fourth folding step).

The mating parts 103*a* and 103*b* fix a distance between the long hole 43*ad* and the long hole 43*bd* to reduce the likelihood that the holding part 11*a* and the holding part 11*b* will stretch to restore their planar shapes. Furthermore, the back lid 102 presses the folding parts 14*a* and 14*b* to reduce the likelihood that the folding part 14*a* and the holding part 11*a* will stretch to restore their planar shapes and that the folding part 14*b* and the holding part 11*b* will stretch to restore their planar shapes.

The holding parts 11*a* and 11*b* and the folding parts 14*a* and 14*b* in fixed states form a tube 23 extending in the y axis direction. The tube 23 has a section substantially triangular as viewed in the y axis direction (see FIG. 23).

According to the configuration described above, the razor 5 is finished through the first folding step to the fourth folding step. However, performing only the second folding step allows the razor 5 to be used like the razors 1 to 4.

The sectional shape of the tube 23 is not limited to a triangle but it may alternatively be a rectangle or a polygon having more than four corners such as a pentagon.

The long hole part 18 in the above-described configuration has a shape symmetrical with respect to the center line CL. In one configuration, however, the shape of the long hole part 18 may be asymmetrical with respect to the center line CL. Preferably, the long hole part 18 intersects the center line CL in a plan view from above.

The mating parts 103*a* and 103*b* in the above-described configuration are fitted to the holding parts 11*a* and 11*b* and to the folding parts 14*a* and 14*b*. In one configuration, however, the mating parts 103*a* and 103*b* may be fitted to the head supporting part 31.

<(5) Fifth Modification>

Figure 25:
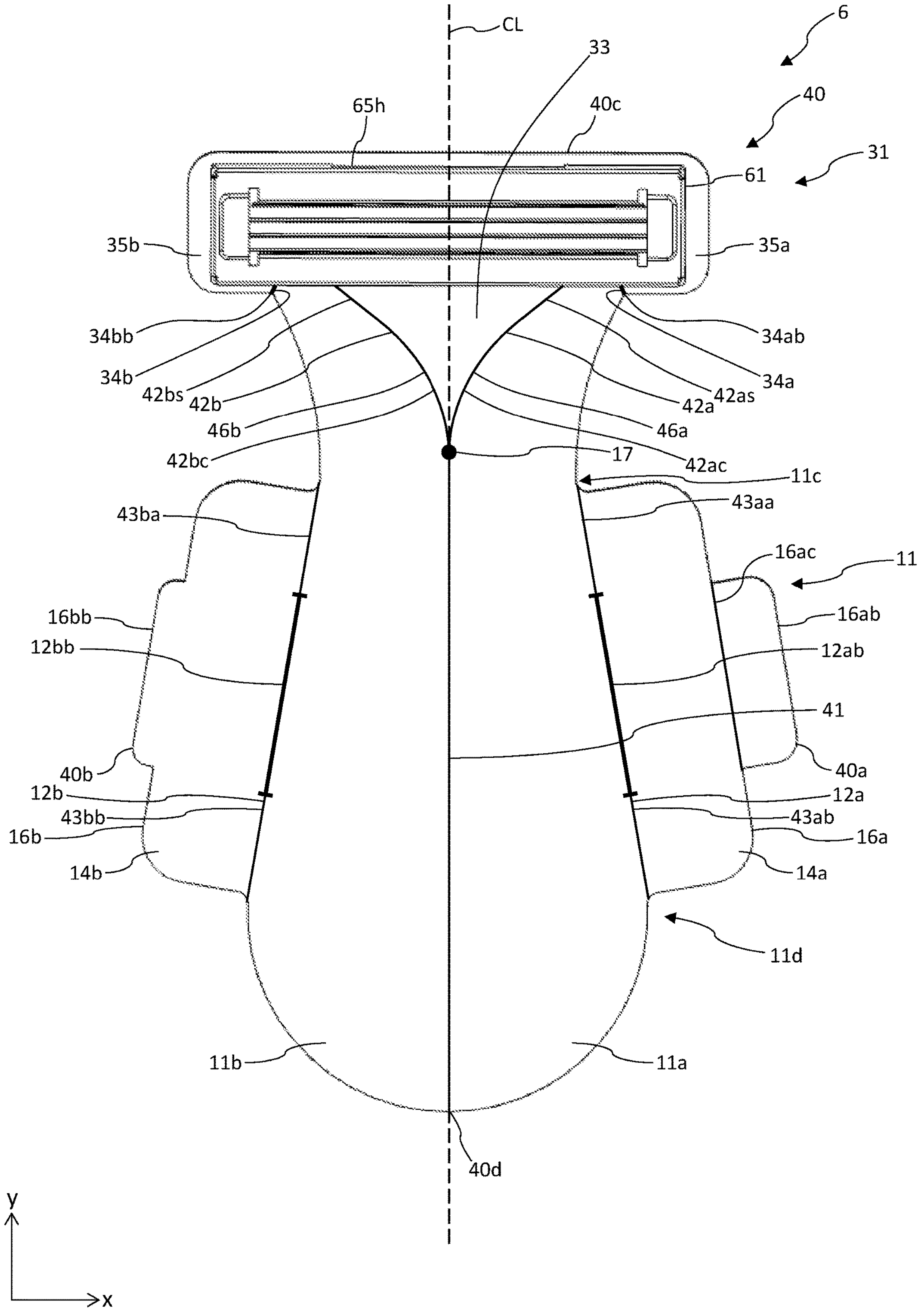
FIG. 25 is a plan view from a front side showing a razor according to a fifth modification of the embodiment.
Figure 26:
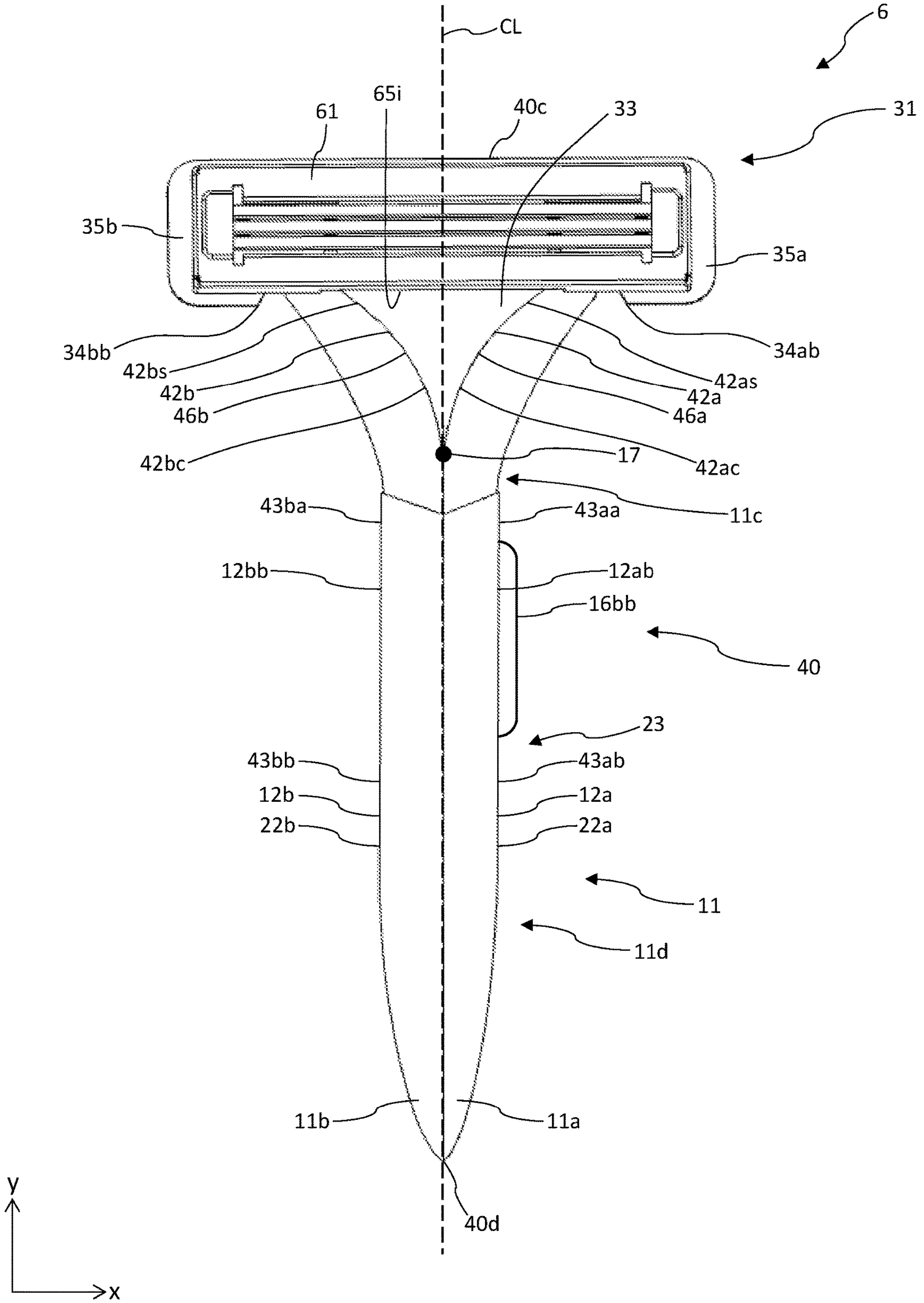
FIG. 26 is a plan view from a front side showing the razor in a state after assembly according to the fifth modification of the embodiment.
Figure 27:
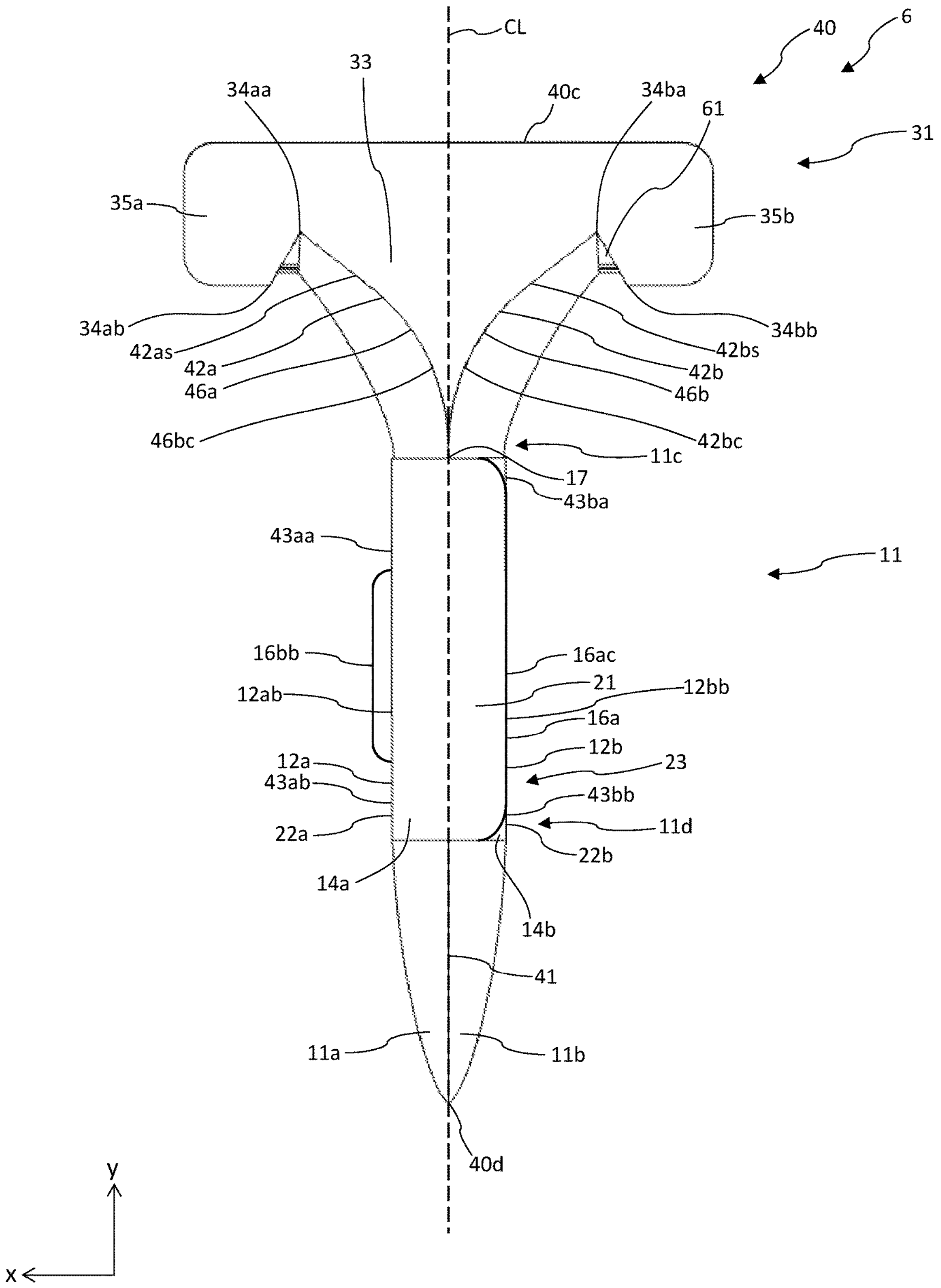
FIG. 27 is a plan view from a back side showing the razor in a state after assembly according to the fifth modification of the embodiment.

FIG. 25 is a plan view from a front side showing a razor according to a fifth modification of the embodiment. FIG. 26 is a plan view from a front side showing the razor in a state after assembly according to the fifth modification of the embodiment. FIG. 27 is a plan view from a back side showing the razor in a state after assembly according to the fifth modification of the embodiment.

As shown in FIGS. 25 to 27, a razor 6 according to the fifth modification of the embodiment differs in a method of fixing the holding part 11 in an assembled state from a method of fixing the holding part 11 of the razor 5 of the fourth modification.

At the right edge portion 12*a* of the holding part 11*a*, a cut 12*ab* is formed between the upper inversion fold 43*aa* and the lower inversion fold 43*ab*. Cuts are formed in the width direction at the upper end and the lower end of the cut 12*ab*. At the left edge portion 12*b* of the holding part 11*b*, a cut 12*bb* having a shape symmetrical to the cut 12*ab* with respect to the center line CL is formed.

The folding part 14*a* includes a convex part 16*ab* that projects from the edge 16*a* in a direction of going away from the center line CL, namely, rightward. The convex part 16*ab* is formed at a position allowing the convex part 16*ab* to face the cut 12*bb* in a state where the holding part 11*a* and the holding part 11*b* are folded along the center fold 41 and then the holding part 11*a* and the folding part 14*a* are folded further along the inversion folds 43*aa* and 43*ab*. The convex part 16*ab* has a length in the longitudinal direction less than the length of the cut 12*bb* in the longitudinal direction.

The folding part 14*b* includes a convex part 16*bb* that projects from the edge 16*b* in a direction of going away from the center line CL, namely, leftward. The convex part 16*bb* is formed at a position allowing the convex part 16*bb* to face the cut 12*ab* in a state where the holding part 11*a* and the holding part 11*b* are folded along the center fold 41 and then the holding part 11*b* and the folding part 14*b* are folded further along the inversion folds 43*ba* and 43*bb*. The convex part 16*bb* has a length in the longitudinal direction less than the length of the cut 12*ab* in the longitudinal direction. The convex part 16*bb* has a length in the width direction less than the length of the convex part 16*ab* in the width direction, for example.

The head supporting part 31 has a configuration including the triangle part 33, the right end supporting portion 35*a*, and the left end supporting portion 35*b* (see FIG. 27). The razor head 61 is adhered to the right end supporting portion 35*a* and the left end supporting portion 35*b* to be fixed to the head supporting part 31. In this modification, the razor head 61 is fixed to the head supporting part 31 in such a manner as to prevent a part of the razor head 61 closer to the holding part 11 from projecting from the head supporting part 31 toward the holding part 11.

A substantially linear cut 34*a* is formed at a boundary between the holding part 11*a* and the right end supporting portion 35*a* (see FIG. 25). The cut 34*a* extends downward and rightward from the position 34*aa* at the upper end of the connection fold 42*a* (see FIG. 27) to a position 34*ab*.

A substantially linear cut 34*b* having a shape symmetrical to the cut 34*a* with respect to the center line CL is formed at a boundary between the holding part 11*b* and the left end supporting portion 35*b* (see FIG. 25). The cut 34*b* extends downward and leftward from the position 34*ba* at the upper end of the connection fold 42*b* to the position 34*bb*.

<Assembly>

An exemplary method of assembling the razor 6 will be described. Regarding the assembly of the razor 6, a difference from the assembly of the razor 5 of the fourth modification will be described in detail and a point common to the assembly of the razor 5 will be described briefly.

First, a user performs the first folding step. Next, the user folds the holding parts 11*a* and 11*b* along the center fold 41 and the connection folds 42*a* and 42*b* in such a manner that the front side becomes convex. At this time, the holding parts 11*a* and 11*b* are folded in such a manner as to locate the folding part 14*a* on the back side of the folding part 14*b* and to insert the convex part 16*bb* of the folding part 14*b* into the cut 12*ab* (second folding step).

Next, the user folds the convex part 16*ab* along a fold 16*ac*. At this time, the convex part 16*ab* is folded in a direction that is a direction of approaching the cut 12*bb* (third folding step).

Next, the user inserts the convex part 16*ab* into the cut 12*bb* to fit the convex part 16*ab* and the holding part 11*b* to each other (fourth folding step).

Inserting the convex part 16*ab* into the cut 12*bb* reduces the likelihood that the holding part 11*a* and the holding part 11*b* will stretch to restore their planar shapes and the likelihood that the folding part 14*a* and the holding part 11*a* will stretch to restore their planar shapes. Furthermore, the folding part 14*b* is pressed with the folding part 14*a* to reduce the likelihood that the folding part 14*b* and the holding part 11*b* will stretch to restore their planar shapes.

The holding parts 11*a* and 11*b* and the folding parts 14*a* and 14*b* in fixed states form the tube 23 extending in the y axis direction. While not shown in the drawings, the tube 23 has a section substantially triangular as viewed in the y axis direction.

According to the configuration described above, the razor 6 is finished through the first folding step to the fourth folding step. However, performing only the second folding step allows the razor 6 to be used like the razors 1 to 4.

<(6) Sixth Modification>

Figure 28:
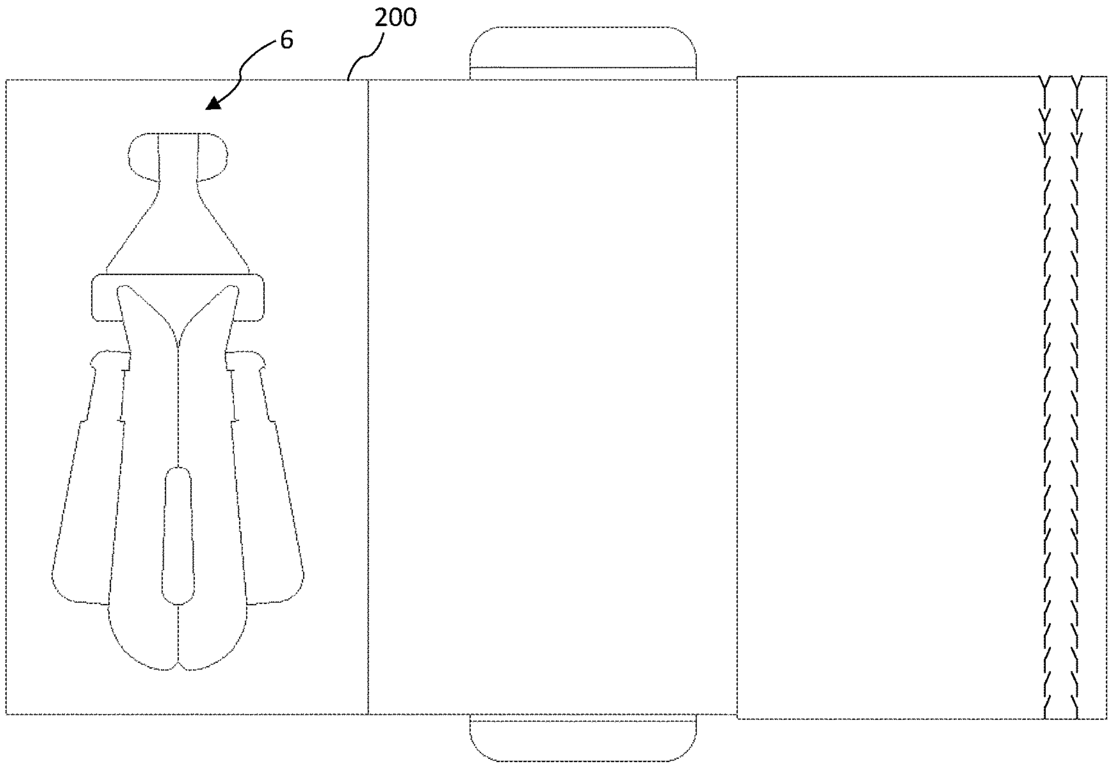
FIG. 28 is a plan view from a front side showing a razor according to a sixth modification of the embodiment.

FIG. 28 is a plan view from a front side showing a razor according to a sixth modification of the embodiment. As shown in FIG. 28, the razor 5 is fitted into a mat 200. The outer periphery of the razor 5 is defined by perforations, for example, to allow the razor 5 to be detached from the mat 200 to be available for use.

As described above, fitting the razor 5 into the mat 200 allows the razor 6 to be wrapped through the simple operation of folding the mat 200 into a bag-like shape. This facilitates carriage and dispatch of the razor 6. The shape of the mat 200 can be determined freely to facilitate display of the razor 5 on a store shelf or facilitate carriage of the razor 5.

The configuration described in this modification is such that the razor 5 is fitted into the mat 200. In one configuration, the razor 1, 2, 3, 4, or 6 may be fitted into the mat 200.

2. Features of the Present Invention

The present invention described by giving the embodiment as an example has the following features.

According to the razor 1 having the above-described configuration where the holding part 11 includes the narrow portion 11*c* and the razor 1 is formed to be expanded in the width direction from the narrow portion 11*c* toward the end 40*d* on the opposite side of the head supporting part 31, the outer shape of the planar razor 1 is not formed into a rectangle but can be formed into a shape with rounded corners. This achieves reduction in the amount of use of paper. Avoiding a rectangular shape as the outer shape of the razor 1 increases a degree of freedom of design to achieve the compact body. Furthermore, while an index finger and a thumb of a user are to be located in the vicinity of the narrow portion 11*c* when the user uses the razor 1, the presence of the narrow portion 11*c* can form a configuration that prevents the finger of the user from coming off the razor downward.

According to the above-described configuration where the center fold 41 is formed along the center line CL from the vertex 17 to the lower end 40*d*, the connection folds 42*a* and 42*b* are formed along the connection parts 46*a* and 46*b* respectively, and a user makes folding along the connection folds 42*a* and 42*b* and the center fold 41 in assembly, folding the holding part 11 along the center fold 41 naturally achieves folding along the connection folds 42*a* and 42*b* further continuous with the center fold 41. Likewise, in assembly, folding the holding part 11 along the connection folds 42*a* and 42*b* naturally achieves folding along the center fold 41 further continuous with the connection folds 42*a* and 42*b*. Specifically, this allows the user to assemble the razor 1 through a single touch, for example, thereby reducing the number of steps required for assembling the razor 1 to facilitate assembly of the razor 1. This achieves a configuration that eliminates the burdensome operation for the user to make the razor 1 ready to use. In folding along the connection folds 42*a* and 42*b*, the head supporting part 31 can be bent smoothly toward the side of the belly parts 22*a* and 22*b*.

According to the razor 1 having the above-described configuration where the lower end 40*d* on the opposite side of the head supporting part 31 is curved, the lower end 40*d* and its vicinity are not formed into a linear shape but can be rounded in a state after assembly. By doing so, if a finger of a user touches the lower end 40*d* and its vicinity or if the user unintentionally grasps the lower end 40*d* and its vicinity depending on a way in which the user holds the razor 1, for example, it is possible to lessen a feel of discomfort of the user. Specifically, a razor avoiding giving of a feel of discomfort to the user can be provided.

According to the above-described configuration where the razor head 61 includes, in the vicinities of both ends in the width direction, the rectangular and substantially planar rectangular-planar parts 66*a* and 66*b*, and these two rectangular-planar parts 66*a* and 66*b* are adhered to the bonding surface 32*a* of the rectangular part 32, it is possible to adhere the razor head 61 and the rectangular part 32 to each other with appropriate strength while consideration is given to ease of stripping. This makes it possible to separate the body 40 and the razor head 61 from each other easily without damaging the razor head 61. This reduces the likelihood that the blade body 62 of the razor 1 will be exposed during the separation, making it possible to provide the razor 1 giving consideration to safety.

According to the above-described configuration where the head supporting part 31 continuous from the back part 21 is bent toward the side of the belly parts 22*a* and 22*b* and the razor head 61 is arranged at the bonding surface 32*a* of the rectangular part 32 closer to the back part 21 in a state after assembly, it is possible to arrange the razor head 61 and the bonding surface 32*a* substantially parallel to each other. This allows a user to press the blade of the razor head 61 against a skin at an angle at which the blade comes into surface contact with the skin in operating the holding part 11. Furthermore, if external force is applied to the blade, the external force can be received along the bonding surface 32*a* unlike in the conventional configuration where the external force is received in a direction substantially orthogonal to a surface of the rectangular part 32 closer to the back part 21. This can reduce the likelihood that the razor head 61 will come off the head supporting part 31 or the body 40 will be damaged partially due to the external force.

According to the above-described configuration where the folding parts 14*a* and 14*b* are formed to project outward along the edge portions 12*a* and 12*b* of the holding part 11 respectively and to be foldable to the side of the center line CL, and the folding part 14*a* and 14*b* each have a width smaller than a width of the holding part 11, the belly parts 22*a* and 22*b* of the holding part 11 are given rounded shapes to make the shape of the holding part 11 easy to hold for a user. Furthermore, the belly parts 22*a* and 22*b* to which a finger of a user is likely to abut on are not given a sharp portion, making it possible to provide a razor giving consideration to safety.

In the above-described razor 5, the head fixing part 100 is provided on the opposite side of the holding part 11 relative to the head supporting part 31, and is folded to be fitted to the head fixing part 100 or the head supporting part 31. As a result of the fit to the head fixing part 100, the rigidity of the holding part 11 or the head supporting part 31 can be increased. This makes it possible to stabilize the position of the razor head 61. Thus, while the razor 5 is formed of paper, the razor 5 can be used with an operational feeling similar to that provided by a different high-rigidity razor using resin or metal, for example, for forming a part corresponding to the holding part 11 or the head supporting part 31.

In the above-described razor 5 and razor 6, the holding part 11 is assembled in such a manner that a section taken at a plane intersecting the longitudinal direction is fixed in a polygonal shape. This suppresses change in the shape of the holding part 11 occurring when the holding part 11 is held, making it possible to stabilize the shape of the holding part 11. This makes the holding part 11 easy to grip. Furthermore, while the razors 5 and 6 are formed of paper, the razors 5 and 6 can be used with an operational feeling similar to that provided by a different high-rigidity razor using resin or metal, for example, for forming a part corresponding to the holding part 11 or the head supporting part 31.

In the above-described razor 5 in a state before assembly, the holding part 11 includes the long hole part 18 extending in the longitudinal direction. Thus, when a side of a finger of a user is placed on the long hole part, friction is generated between the edge of the long hole part and the finger of the user, thereby forming a part on which the user is to hook the finger. This allows the razor to be held more easily while suppressing slippage.

In the above-described razor 1, the protrusions 61*a* and 61*b* of the razor head 61 closer to the holding part 11 project from the rectangular part 32 of the head supporting part 31 toward the holding part 11, and the razor head 61 is removable from the head supporting part 31 after use. Thus, during folding along the connection folds 42*a* and 42*b* in assembly, tapered parts of the holding part 11 branching along the connection folds 42*a* and 42*b* go farther from the protrusions 61*a* and 61*b* to allow the protrusions 61*a* and 61*b* to be exposed. As a result, it is possible to form a part at the razor head 61 on which a user is to hook a finger, so that the user can remove the razor head 61 from the razor 1 safely with fingers hooked on the protrusions 61*a* and 61*b*. According to the configuration where, after the removal, the razor head 61 is entirely formed of metal and the holding part 11 and the head supporting part 31 are integrally formed of paper, it is possible to separate the razor 1 after use into the metal material and the paper material through a single operation of removing the razor head 61 from the razor 1. This facilitates separation between materials and achieves implementation of recycling in a simple and economical way. Specifically, it is possible to provide a razor allowing the razor after use to be recycled effectively and giving consideration to the safety of a user trying to remove the body 40 and the razor head 61 from each other for recycling.

According to the configuration where the protrusions 61*a* and 61*b* of the razor head 61 closer to the holding part 11 are adhered to the rectangular part 32 of the head supporting part 31 in such a manner as to project from the rectangular part 32 toward the holding part 11, the razor head 61 can be located near the vertex 17 of the triangle part 33. When external force acting in a bending direction is applied to the head supporting part 31, the amount of deformation is reduced in the vicinity of the vertex 17 of the triangle part 33. Thus, in a state after assembly, flexure of the head supporting part 31 in the bending direction bent toward the belly parts 22*a* and 22*b* is restricted appropriately, so that the position of the razor head 61 in the bending direction can be stabilized.

In the above-described razor 1, when a user makes the razor head 61 touch a skin, the head supporting part 31 and the holding part 11 are deformed elastically in such a manner that the razor head 61 is biased toward the skin of the user. This provides appropriate elasticity to the holding part 11 and the head supporting part 31 formed of paper to prevent application of excessive pressure to the skin.

In the above-described razor 1, the insertion part 51 is formed on one side relative to the center line CL and is deformed by being pressed, and the insertion hole part 52 is formed at a position on the opposite side relative to the center line CL at which the insertion hole part 52 faces the insertion part 51 in a state after assembly and is deformed by being pressed. In a state after assembly, the insertion part 51 is inserted into and fitted to the insertion hole part 52 to fix the holding part 11 in a state of being folded along the center fold 41. By doing so, in a state after assembly, the fit between the insertion part 51 and the insertion hole part 52 makes it possible to reduce the likelihood that the holding part 11 will unintentionally stretch at the belly parts 22*a* and 22*b* in response to the elasticity of paper around the center fold 41, so that the holding part 11 can be retained in a shape easy to hold for a user. It is also possible to reduce the likelihood that the bending of the head supporting part 31 will unintentionally return toward the back part 21 to allow the head supporting part 31 to be retained in a state bent appropriately relative to the holding part 11.

In the above-described razor 3 of the second modification, in a state after assembly, the cut portion 71 is formed in such a manner as to extend from the back part 21 toward the belly parts 22*a* and 22*b*, and the holding part 11 is fixed in a state of being folded along the center fold 41 by folding the cut portion 71. By doing so, in a state after assembly, it becomes possible to reduce the likelihood that the holding part 11 will unintentionally stretch on the belly side in response to the elasticity of paper around the center fold 41, so that the holding part 11 can be retained in a shape easy to hold for a user. It is also possible to reduce the likelihood that the bending of the head supporting part 31 will unintentionally return toward the back part 21 to allow the head supporting part 31 to be retained in a state bent appropriately relative to the holding part 11.

In the above-described razor 4 of the third modification, in a state before assembly, the right projection 81 is formed in such a manner as to protrude outward from one edge portion that is one of the edge portions 12*a* and 12*b*, and the cut-out portion 82 is formed at the other edge portion. In a state after assembly, the right projection 81 is inserted into and fitted to the cut-out portion 82 to fix the holding part 11 in a state of being folded along the center fold 41. By doing so, in a state after assembly, it becomes possible to reduce the likelihood that the holding part 11 will unintentionally stretch on the belly side in response to the elasticity of paper around the center fold 41, so that the holding part 11 can be retained in a shape easy to hold for a user. It is also possible to reduce the likelihood that the bending of the head supporting part 31 will unintentionally return toward the back part 21 to allow the head supporting part 31 to be retained in a state bent appropriately relative to the holding part 11.

3. Supplementary Note

The embodiment and the modifications of the present invention have been described in detail above. The foregoing description is given merely for describing exemplary configurations and exemplary operations. The scope of the present invention is not limited to these embodiment and modifications but should be interpreted widely to cover a range graspable by a person skilled in the art on the basis of a comparable technical thought.

INDUSTRIAL APPLICABILITY

The razor of the present invention is applied preferably as a razor contributing to environmental protection.

REFERENCE SIGNS LIST

1, 2, 3, 4, 5, 6 . . . Razor
11*a*, 11*b* . . . Holding part
11*c* . . . Narrow portion
11*d* . . . Wide portion
12*a*, 12*b* . . . Edge portion
14*a*, 14*b* . . . Folding part
15*a*, 15*b* . . . Cut-out portion
16*a*, 16*b* . . . Edge
17 . . . Vertex
18 . . . Long hole part
21 . . . Back part
22*a*, 22*b* . . . Belly part
31 . . . Head supporting part
32 . . . Rectangular part
32*a* . . . Bonding surface
33 . . . Triangle part
35*a* . . . Right end supporting portion
35*b* . . . Left end supporting portion
40 . . . Body
40*d* . . . Lower end
41 . . . Center fold
42*a*, 42*b* . . . Connection fold
43*a*, 43*b* Inversion fold
46*a*, 46*b* . . . Connection part
51 . . . Insertion part
52 . . . Insertion hole part
61 . . . Razor head
61*a*, 61*b* . . . Protrusion
62 . . . Blade body
64 . . . Adhesive
65, 65*x* . . . Front case
65*h*, 65*i* . . . Cut-out portion
66, 66*x* . . . Rear case
71 . . . Cut portion
81 . . . Right projection
82 . . . Cut-out portion
100 . . . Head fixing part
101 . . . Fold
102 . . . Back lid
102*a* . . . Constriction
103*a*, 103*b* . . . Mating part
104*a*, 104*b* . . . Fold
200 . . . Mat

What is claimed is:

1. A razor assembled by folding, the razor comprising:
a holding part that is held by a user;
a head supporting part that is formed integrally with the holding part; and
a razor head, comprising:
a blade body, and
a frame body provided on the head supporting part and housing the blade body,
wherein an entirety of the holding part and the head supporting part is formed of paper,
wherein an entirety of the razor head is formed of metal,
wherein the frame body comprises a front case and a rear case, the rear case adjacent the head supporting part, and the front case opposite the rear case defining at least a part of a periphery of the razor head,
wherein the frame body comprises a cut-out through which body hairs cut by the blade body can pass, and
wherein the cut-out comprises a force point configured to receive a force for removing the razor head from the head supporting part.

2. The razor according to claim 1, wherein the head supporting part is spaced from the cut-out, such that a gap is formed between the head supporting part and the cut-out.

3. The razor according to claim 1,
wherein the frame body comprises an opening portion through which body hairs cut by the blade body can pass,
wherein the opening portion is provided on the rear case of the frame body, and
wherein the head supporting part is configured to expose the opening portion.

4. The razor according to claim 1, further comprising an adhesive disposed on the frame body to adhere the frame body to the head supporting part.

5. The razor according to claim 1,
wherein the front case comprises an opening portion from which the blade body is exposed and the cut-out,
wherein the front case and the rear case are connected to each other to form the frame body defining an internal space,
wherein the front case is arranged to cover the rear case, and
wherein a distance between an edge of the front case having the cut-out and an edge of the rear case facing the edge of the front case having the cut-out is in a range from 0.5 mm to 3 mm.

6. The razor according to claim 1, wherein the frame body comprises an adhesive region where an adhesive for adhesion to the head supporting part is provided and an adhesion prohibited region where the adhesive is not provided, wherein the adhesion prohibited region is provided on a periphery of the rear case of the frame body.

7. The razor according to claim 6, wherein at least a part of the adhesive region of the frame body is planar.

* * * * *